L. F. DIETER.
METHOD OF AND APPARATUS OR MILL FOR ROLLING OR FORMING DISHED CAR WHEELS OR OTHER DISHED CIRCULAR BODIES.
APPLICATION FILED OCT. 11, 1917.
1,319,143. Patented Oct. 21, 1919.
9 SHEETS—SHEET 1.
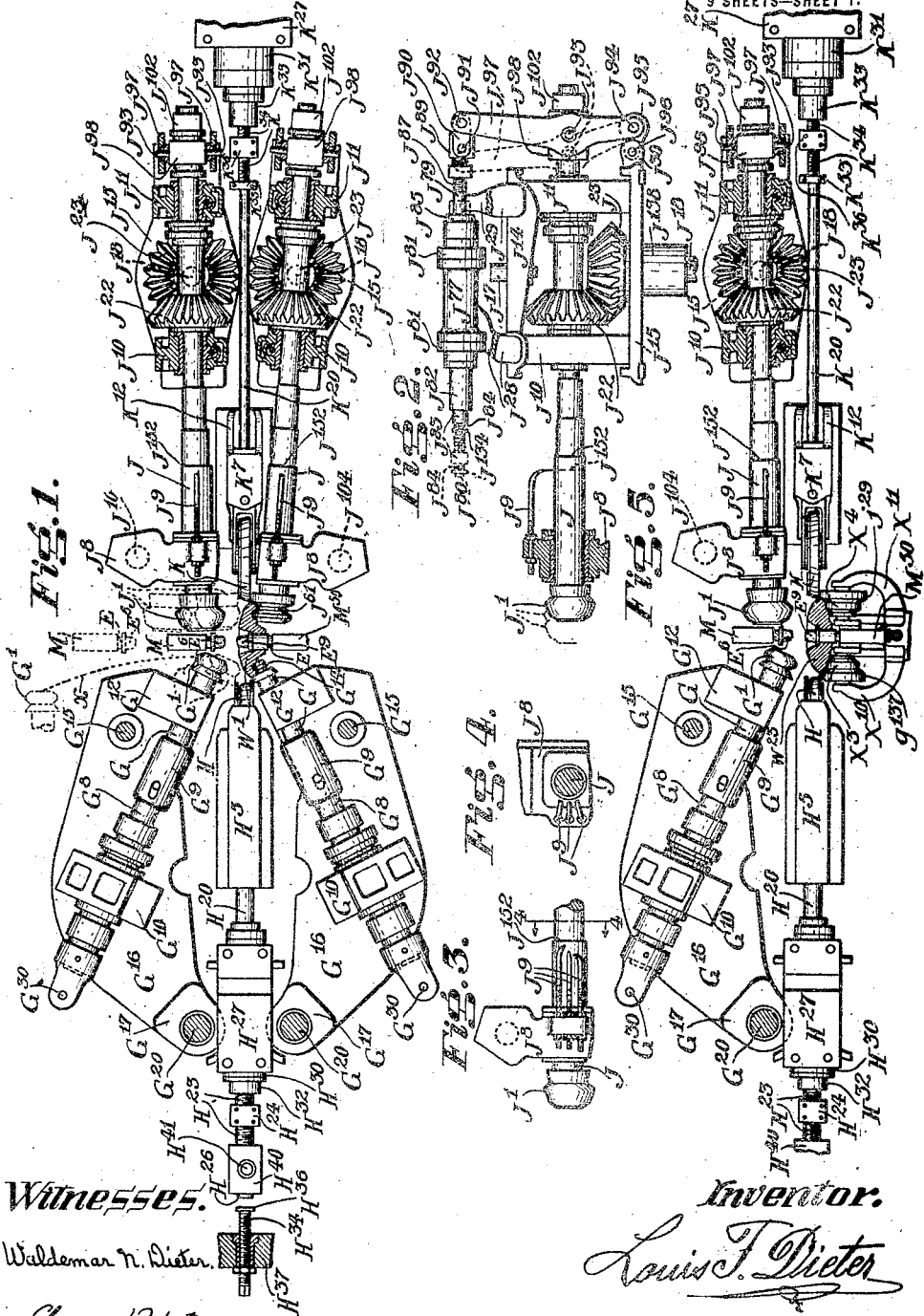
Witnesses.
Waldemar N. Dieter.
Lucy Dieter.
Inventor.
Louis F. Dieter.

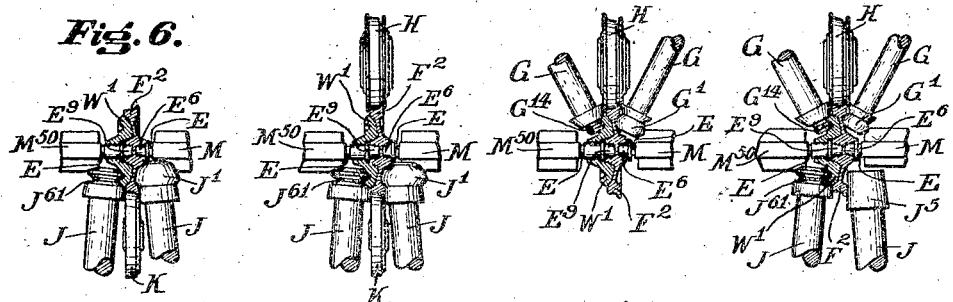
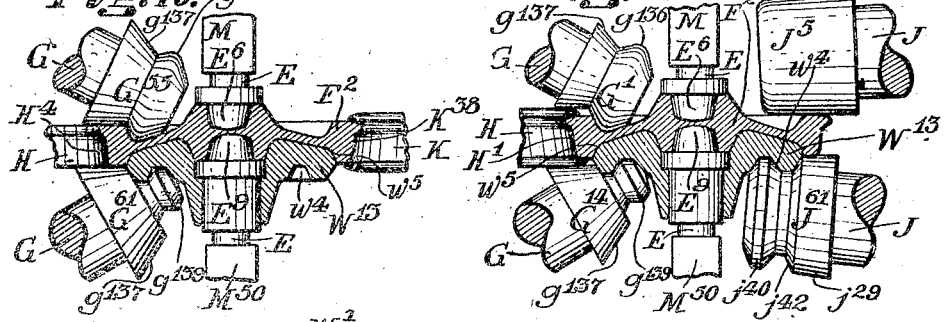
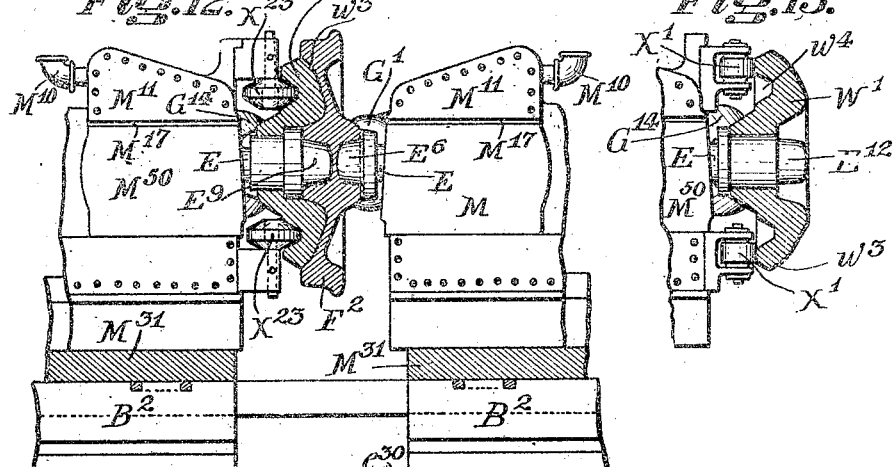
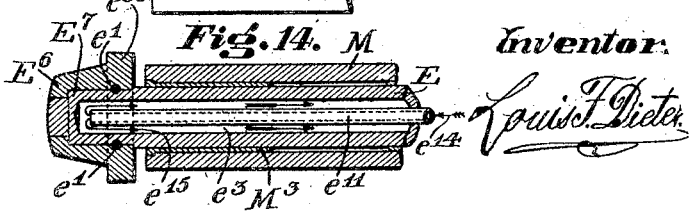

L. F. DIETER.
METHOD OF AND APPARATUS OR MILL FOR ROLLING OR FORMING DISHED CAR WHEELS OR OTHER DISHED CIRCULAR BODIES.
APPLICATION FILED OCT. 11, 1917.
1,319,143.
Patented Oct. 21, 1919.
9 SHEETS—SHEET 3.
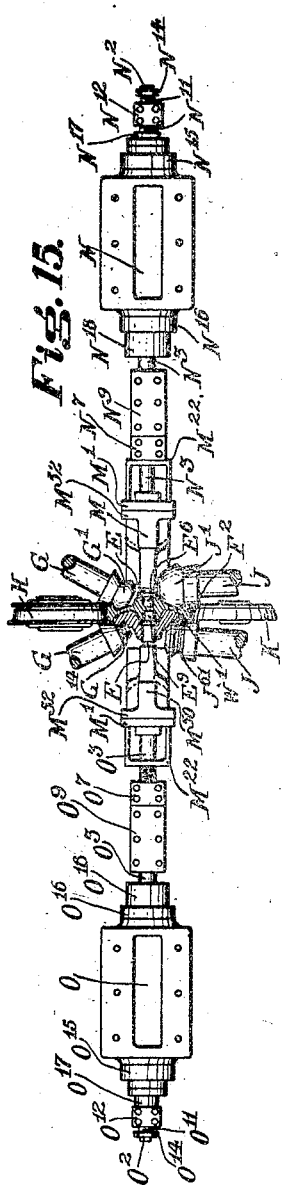
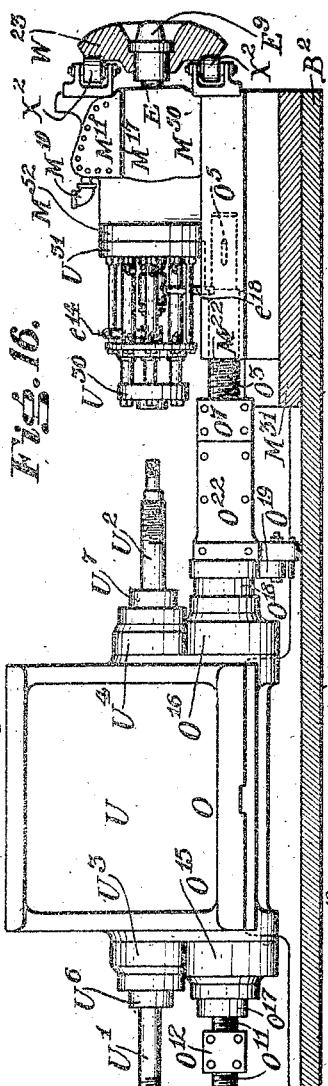
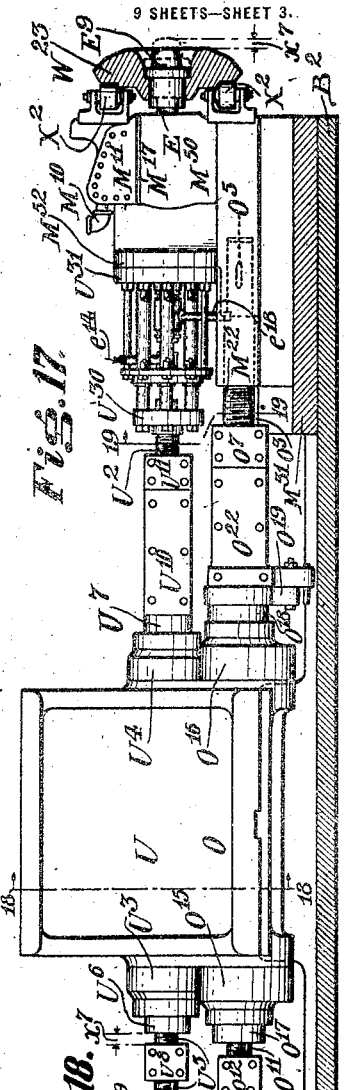
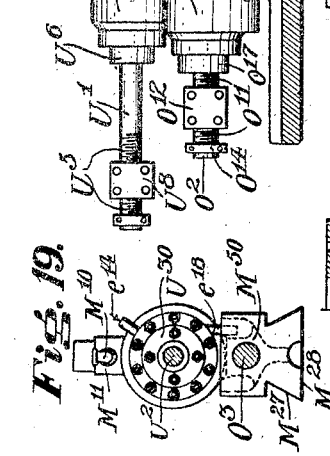
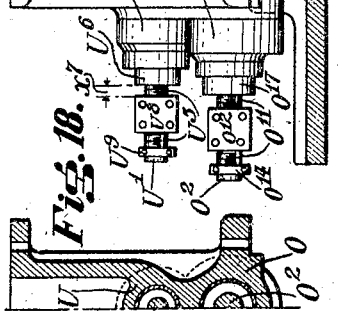
Witnesses.
Waldemar N. Dieter
Lucy. Dieter.
Inventor:
Louis F. Dieter

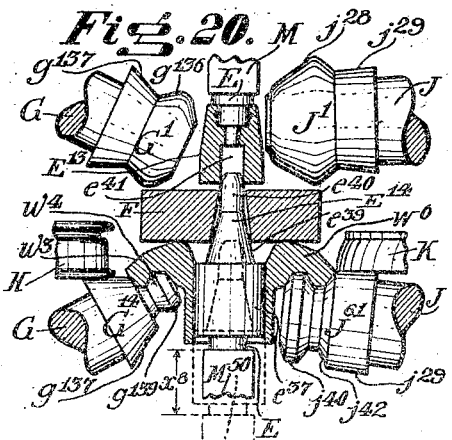
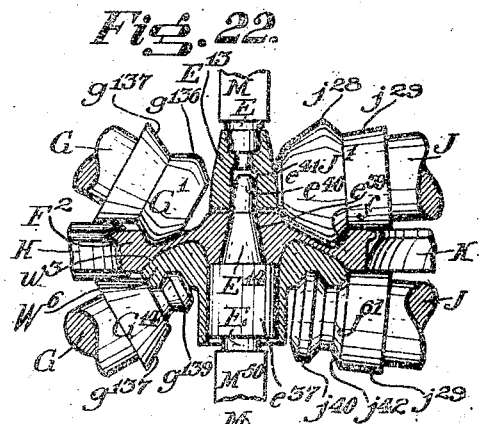
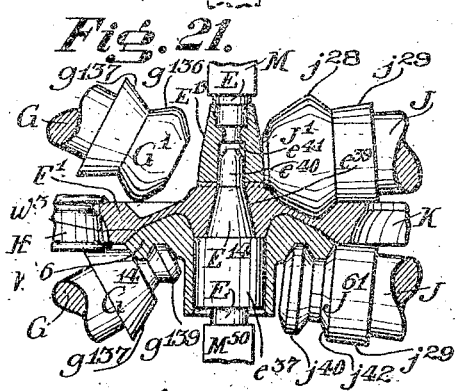
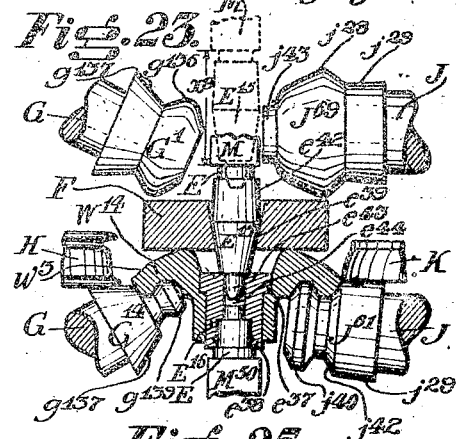
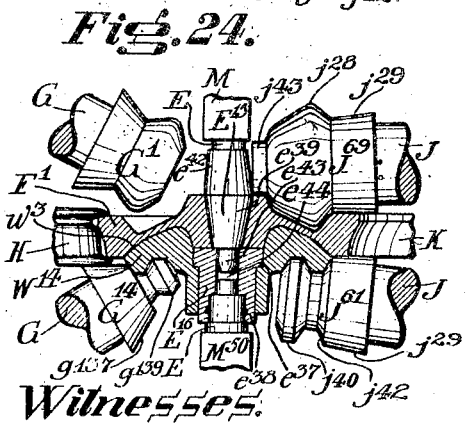
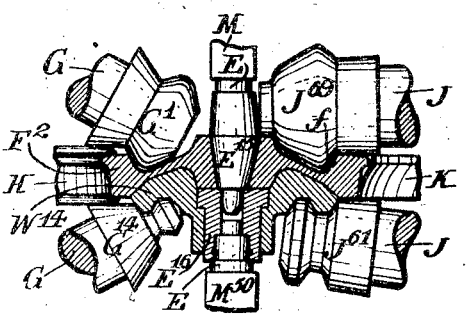

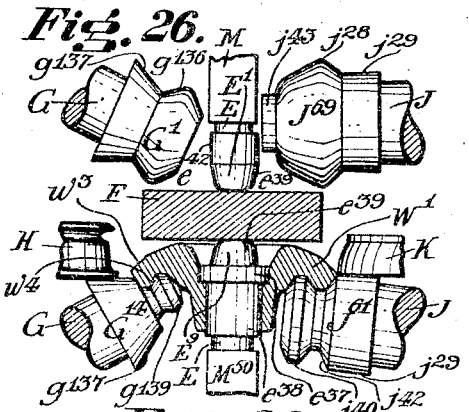
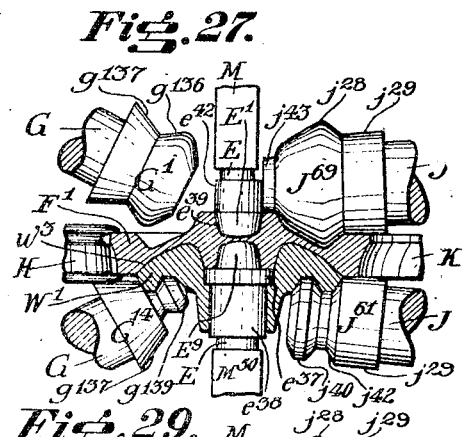
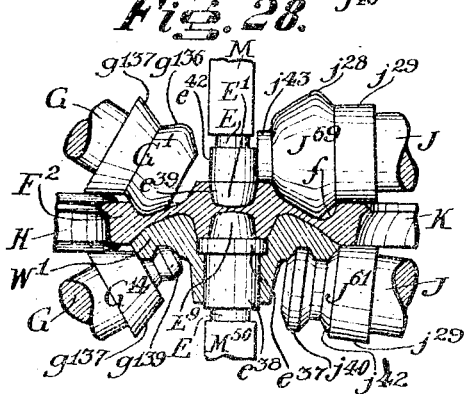
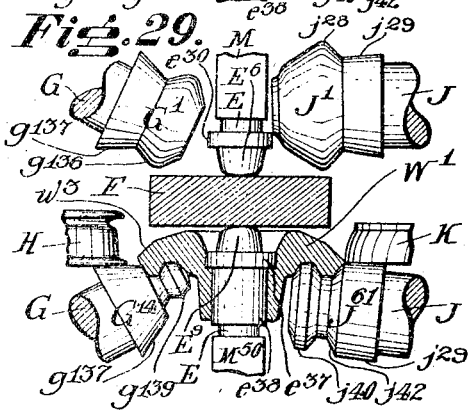
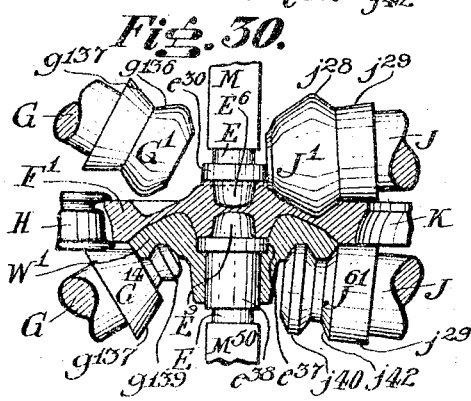
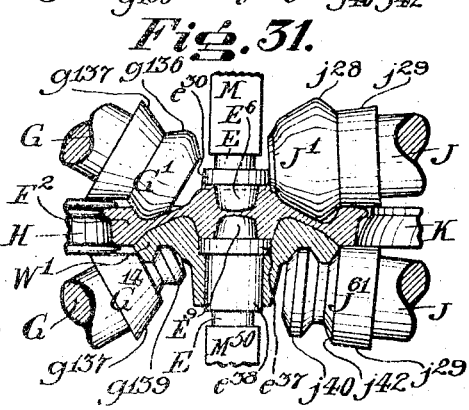

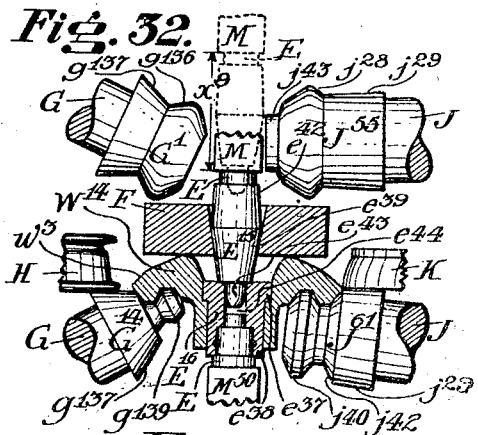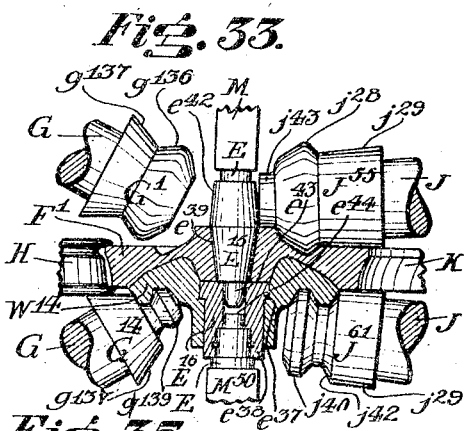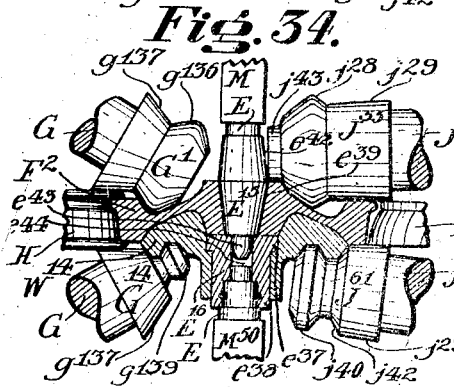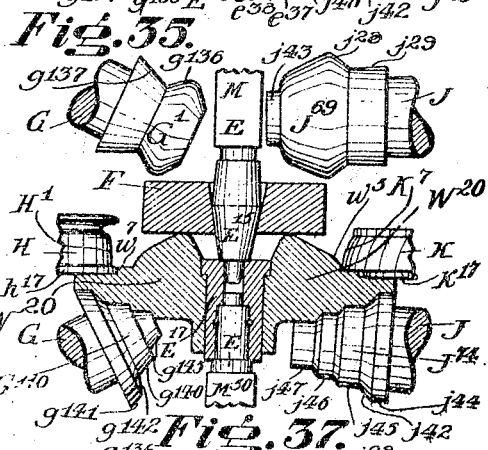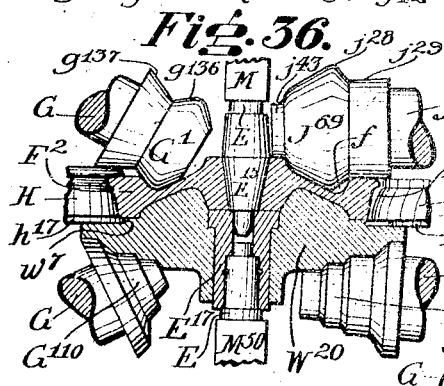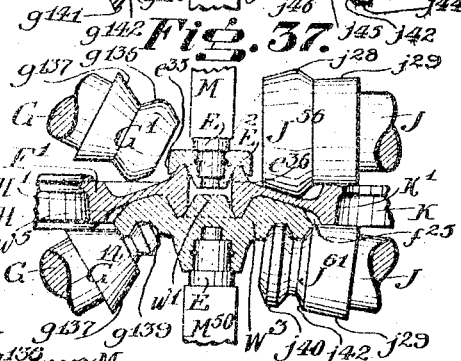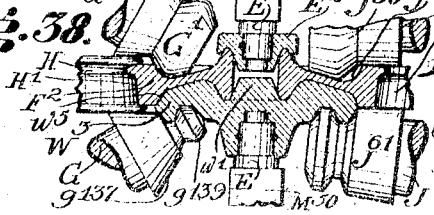

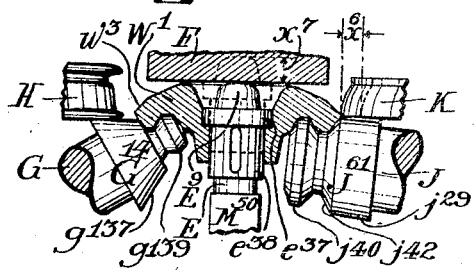
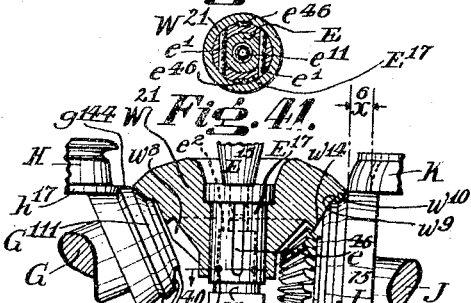
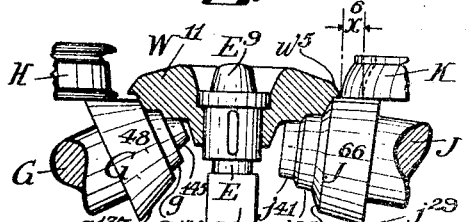
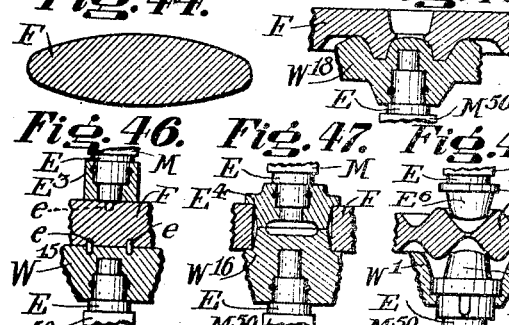
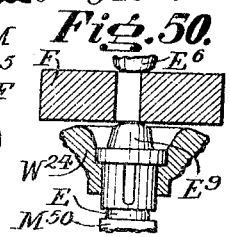
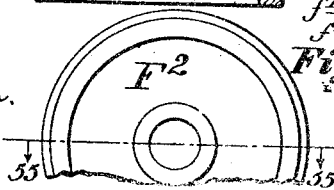

L. F. DIETER.
METHOD OF AND APPARATUS OR MILL FOR ROLLING OR FORMING DISHED CAR WHEELS OR OTHER DISHED CIRCULAR BODIES.
APPLICATION FILED OCT. 11, 1917.

1,319,143.

Patented Oct. 21, 1919.
9 SHEETS—SHEET 8.

Witnesses.
Waldemar N. Dieter.
Lucy Dieter.

Inventor.
Louis F. Dieter.

L. F. DIETER.
METHOD OF AND APPARATUS OR MILL FOR ROLLING OR FORMING DISHED CAR WHEELS OR OTHER DISHED CIRCULAR BODIES.
APPLICATION FILED OCT. 11, 1917.

1,319,143.

Patented Oct. 21, 1919.
9 SHEETS—SHEET 9.

Witnesses:
Waldemar N. Dieter.
Lucy Dieter.

Inventor:
Louis F. Dieter

UNITED STATES PATENT OFFICE.

LOUIS F. DIETER, OF BUFFALO, NEW YORK.

METHOD OF AND APPARATUS OR MILL FOR ROLLING OR FORMING DISHED CAR-WHEELS OR OTHER DISHED CIRCULAR BODIES.

1,319,143. Specification of Letters Patent. Patented Oct. 21, 1919.

Application filed October 11, 1917. Serial No. 195,922.

*To all whom it may concern:*

Be it known that I, LOUIS F. DIETER, a citizen of the United States, residing at Buffalo, in the county of Erie and State of New York, have invented a novel and useful Method of and Apparatus or Mill for Rolling or Forming Dished Car-Wheels or other Dished Circular Bodies, of which the following is a specification accompanied by nine sheets of drawings forming part of this specification.

The features of my invention claimed herein are related to the invention of my original application for patent filed June 15, 1911, Serial No. 633,343, Patent No. 1,243,050. This application is a continuation of my said original application, and, for carrying out my invention I prefer to use an apparatus or mill such for instance as shown and described in my said original application with the exception of the modifications in operations and parts thereof herein shown and described, otherwise the connecting parts of such an apparatus or mill shown in the accompanying drawings are illustrative of parts of my said original application.

The subject matter of this invention is also partly described in and certain features of the invention herein described, but not herein claimed, are claimed in my following applications, viz: said original application for patent filed June 15, 1911, Serial No. 633,343, Patent No. 1,243,050; application for patent filed October 10, 1916, Serial No. 124,921, Patent No. 1,243,051; application for patent filed November 20, 1916, Serial No. 132,372, Patent No. 1,243,052; application for patent filed November 22, 1916, Serial No. 132,815, Patent No. 1,243,053 application for patent filed January 10, 1917, Serial No. 141,558, Patent No. 1,246,067; application for patent filed June 22, 1917, Serial No. 176,333; application for patent filed October 9, 1917, Serial No. 195,637; application for patent filed November 9, 1917, Serial No. 201,036; and application for patent filed November 9, 1917, Serial No. 201,155.

This invention relates to a novel and useful method or process and means for the manufacturing or the making of rolled dished car wheels, rolled dished disk-wheels, or other rolled dished circular bodies from properly heated ingots, blooms, blanks or other work-pieces.

In my said original application, the car wheel or other circular body is centrally pierced or penetrated or centered and is rolled or formed by rolls operating against the opposite sides and against the peripheral face of the work-piece and is dished while the work-piece is rotated by said side rolls.

Applicant is aware that heretofore it has been proposed to roll car wheels on a forming-die shaped to conform to the center of the hub part, the web part and the rim part at one entire side of the car wheel to be formed and also to conform to the outer or peripheral face of the car wheel, the car wheel being rolled on its other side only; that is, at one side of its web and at one side of the edge of its rim. During such rolling action, a work-piece of a given diameter will be rolled to much larger diameter and to the form of a car wheel, such larger diameter being determined and governed by said forming-die. With such an arrangement, the metal in the work-piece is not worked at its outer peripheral face and therefore will be extended instead of being compressed; thus producing incipient cracks in the tread or outer peripheral face of the rim of the car wheel.

In my said application for patent filed October 9, 1917, Serial No. 195,637, the car wheel or similar article is formed first into undished form by combined roll-forging and die-forging means, it being pierced or centered or penetrated, and rolled at one side, thereby forcing metal of the work-piece against the forming-die, against or over a center or piercer passed axially through said forming-die or formed integral with said die, and into the depressed portion or portions of said die and also over and beyond the peripheral edge of said die; the actual forming portion of the preferred forming-die reaching only to the inner peripheral face of the rim of the car wheel or other article at one side thereof when finished and being shaped to conform to the center or hub part, the web part and the inner peripheral or inner circumferential face of the rim portion of the finished rolled or formed undished car wheel or other circular undished body at one side thereof; all other portions or surfaces of the car wheel or other body being rolled or formed directly by rolls and the car wheel or other circular body being dished while the same revolves, or left undished, all as and in the manner shown and described in said application filed October 9, 1917, Serial No. 195,637. During the entire rolling or operating process the metal at the peripheral face of the work-piece is worked by a roll or rolls, whereby the metal in the whole rim portion is rolled or worked to uniform and maximum density, or practically so.

In this invention the car wheel or similar circular article is formed directly into dished form by combined roll-forging and die-forging means; it being pierced, or centered, or penetrated, and rolled at one side, thereby forcing metal of the work-piece against the forming-die, against or over a center or piercer passed axially through said forming-die or formed integral with said die, and into the depressed portion or portions and against and over the forming edge of said die, the actual forming portion of the preferred forming-die reaching only to the inner peripheral face of the rim of the car wheel or other article at one side thereof when finished and being shaped to conform to the center or hub part, the dished web part and the inner peripheral or inner circumferential face of the rim portion of the finished rolled or formed dished car wheel or other circular dished body at one side thereof; all other portions or surfaces of the car wheel or other body being rolled or formed directly by rolls, all as and in the manner hereinafter shown and described. During the entire rolling or operating process the metal at the peripheral face of the work-piece is worked by a roll or rolls, whereby the metal in the whole rim portion is rolled or worked to uniform and maximum density, or practically so.

Another object of my invention is to provide for the manufacture of car-wheels and the like in an economical, commercial, expeditious and efficacious manner, whereby the whole dished car wheel may be completely rolled or formed from a properly heated ingot, bloom, blank or other work-piece, including the piercing, or penetrating, or forming at the opposite sides of the work-piece of a rudimentary bore, or a part or parts thereof, in a simple and thoroughly practicable manner with the same heat and before the finished rolled or formed wheel is removed from the apparatus or mill, while at the same time securing a uniform and maximum density and homogeneity in the metal therein, which contributes materially to the strength and durability thereof. For instance, the metal, when being rolled or formed from a blank or other work-piece into a car wheel or other circular object according to my invention, is not expanded radially, especially is this avoided in the tread and flange or rim portion, and therefore there is no possibility of the formation of incipient cracks in the tread and flange portion or in the peripheral face of the rim. With my invention the metal in the work-piece is truly rolled or formed and increases in density with increased working, thus giving to the metal both its due maximum strength and maximum resistance to wear. In other words, this invention of rolling or forming produces the same effect in the metal of the rim portion as if the web portion of the wheel were not in existence and the rim portion rolled or formed its total width on its inner peripheral surface or surfaces, as is done on its outer peripheral surface consisting of the tread and flange.

A further object of my invention is to provide method and means as hereinafter described by which a properly heated ingot, bloom, blank or other work-piece may be centered, or pierced, or penetrated and centered, or both centered and pierced or penetrated at one or both sides and also supported, and therefrom, with the same heat and in the same apparatus or mill, a dished car wheel or other circular dished article may be completely rolled or formed. By such means and method as herein shown and described, the time required in so producing dished car wheels or other dished circular articles is much lessened and the cost of making such dished wheels is enormously reduced.

In carrying out my invention I employ a continually and automatically clamping process or method and means to prevent the work-piece from becoming loose between its supporting means, such as or similar to the process, for instance, fully described in my said original application; that is to say, for instance, the metal in a properly heated work-piece is very soft in comparison with the metal in its normal or cold condition and therefore has not the required resistance, which is absolutely necessary for firmly supporting the work-piece, and on which account the work-piece will become loose between or on its supporting means during the operating process against the work-piece if the work-piece would be centrally supported or held by means of screws or similar mechanism. To avoid this, I put the work-piece automatically into continually clamped condition between its supporting means, by applying pressure centrally against the work-piece, which pressure acts continually and automatically against the work-piece from opposite sides, as more fully described in my said original application. The work-piece or wheel, while centrally supported by its supporting means, is therefore also automatically put into clamped condition, which prevents the hub or center portion of the work-piece from becoming loose on its supporting means and from being forced out of its true axial or central and desired lateral positions with respect to the rim portion of the work-piece or wheel during the rolling or operating processes, &c. Said constant clamping force or constant clamping pressure automatically and continually remains during said operating processes, all as hereinafter described and more fully described in my said original application.

Another object of my invention is the provision of a novel method and means for completely centering or piercing or penetrating and supporting properly heated ingots, blooms, blanks or other work-pieces and rolling or forming the work-piece directly to desired dished form while so supported; for rolling, forming or shaping a hub on a work-piece whereby the hub is formed smooth on all its surfaces to its desired form or shape without leaving a raised portion or fin which would have to be removed afterward by turning or other costly means; for rolling or forming the inner peripheral face or faces of the marginal or rim portion of a work-piece or wheel sufficiently inclined outwardly toward the outer peripheral face of the work-piece or wheel, as and for the purpose hereinafter described and also as described in my said original application; for rolling of the total peripheral face of the work-piece or wheel first to beaked form, as and for the purpose hereinafter described and also described in my said original application, and then rolling the so beaked peripheral face to desired finished form without leaving a raised portion or fin which would have to be removed afterward by turning or other costly means.

Another object of my invention is to provide a novel method and means for rolling or forming dished car wheels or other circular objects; for rolling metal from the rim portion onto the web portion during the rolling process; for centering a work-piece and sizing and compressing the hub portion thereof while in properly heated condition; and for decreasing the diameter of the bore in a car wheel or other circular work-piece by diametrically compressing the metal of the hub portion of the work-piece.

Further objects of my invention are to provide a novel method and means for rolling or forming a car wheel or other circular, or approximately circular, work-piece so as to cause metal in the same to flow in lateral and radial lines, or substantially so, for the purpose of forming the dished web, the hub and the rim of said car wheel or other work-piece; for limiting the lateral flow of metal at the hub and at the marginal or rim portion; for rolling the peripheral face or flanged tread of the rim portion of said car wheel or other work-piece to true circular form and thereby also uniformly condensing the metal in said rim portion to maximum, and for rerolling, reforming or reworking a car wheel or other similar object.

A still further object of my invention is to provide a method and an apparatus or mill wherein means or devices are systematically arranged, whereby dished car wheels, dished gear wheel blanks, dished disk wheels, dished pipe flanges or other circular or similar bodies or articles may be rolled or formed directly into dished form either with use of the forming-die and all the rolls, or for instance with use only of the forming-die, the herein named edging and web rolling roll, the edging and die-supporting roll and the tread or face rolling roll; or, with the use only of the forming-die, the herein named edging and web rolling roll, the edging and die-supporting roll, the tread or face rolling roll and tread or face finishing roll; or, with the use only of the forming-die, the herein named web finishing roll, the herein named die-supporting roll, and the tread or face finishing roll; or, with the use only of the forming-die, the herein named web finishing roll, the herein named die-supporting roll, the tread or face finishing roll, the herein named edging and web rolling roll and the edging and die-supporting roll; and, wherein the rolls and their various devices or means for operating them, are so arranged for carrying out the rolling or forming with either the forming-die and all the rolls, or only with the forming-die and any of the combination of rolls above mentioned. The various parts are so arranged that said apparatus or mill actually consists, for instance, of two mills made in one, each of which may be operated and used separately or independently of the other mill, which other mill will not, in such case be used. Said two mills are located one at each side of the axes or extended axes of the piercers or work-supporting centers. One of said mills is herein named the roughing mill or the roughing side of the apparatus or mill, although dished car wheels, dished disk-wheels, dished pipe flanges or other dished articles may be rolled or formed therewith to the finish, and it consists of the forming-die, the herein named edging and web rolling roll, the edging and die-supporting roll and tread or face roughing roll. The other of said two mills is herein named the finishing mill or finishing side of the apparatus or mill and consists of the forming-die, the herein named web finishing roll, the die-supporting roll and tread or face finishing roll. The centering or piercing or penetrating and work-supporting device and also the raising, lowering and retaining device shown and described in my said original application are all located at the center and between said two mills and may all be used with either of said two mills or with the whole apparatus or mill, as the case may be.

In the manufacture of dished car wheels or other circular objects according to my invention, the cost of operation is greatly reduced. The production of dished car wheels and the like is thereby greatly cheapened, the output increased, and the metal, for instance, in the tread and flange or the peripheral face and the whole rim portion of the dished car wheels is rolled and is thereby uniformly condensed to its maximum or substantially so, thereby giving the metal in said peripheral face and rim portion its due maximum and uniform strength and its due maximum and uniform resistance to wear, and thereby the said peripheral face and rim portion of the car wheel is also rolled smooth on all its surfaces to the desired form or shape without leaving a raised circular portion or fin which would have to be removed afterward by turning or other costly means.

It is, of course, understood that the various steps herein described may all be performed, in accordance with my invention, in the same apparatus or mill with one heat, or each of said steps may be effected with a separate heat treatment of the work-piece and separate operation, as for instance described in my said original application. It will, however, be apparent that any step or operation may be completed to partly roll or form the work-piece and later be operated upon in the performance of any other step or steps, as may be required, but it is to be understood that all the steps of my method herein described are necessary in the manufacture of a complete car wheel or other similar body to embody therein all the advantages of my invention.

Further objects of the invention will hereinafter appear.

My invention consists in the novel method or process herein described and more particularly pointed out in the claims; and it also consists in the novel means, in the arrangement thereof, in the novel features of construction and in the arrangement and combination of parts herein described and more particularly pointed out in the claims.

I prefer to carry out my invention with an apparatus or mill of the type or kind as for instance described and claimed in my aforesaid original application and in applications filed by me and having the hereinbefore mentioned serial numbers and filing dates, as will be made clear hereinafter.

In the accompanying drawings, in which I illustrate my invention together with the devices or means I prefer to employ in carrying out my invention:

Figure 1 is a sectional plan view illustrating the main operating parts of one form of an apparatus or mill such as I prefer to employ for rolling or forming dished car wheels or other circular bodies, and such as for instance shown and described in my aforesaid original application, with the exception for instance of said forming-die and the edging and web rolling roll and of the modifications of one or both work-supporting heads and of rolls which also support said forming-die and of the modifications of details and of the modifications of operations, etc., all as hereinafter more fully shown and described. The work-piece is not shown in said Fig. 1, but the work-piece at commencement of operation will be placed near or against said forming-die and between the piercers or work-supporting centers as hereinafter fully shown and described.

Fig. 2 is a side elevation of one form of one of the oscillating frames; that is, the oscillating frame for the roll shaft having the edging and web rolling roll shown in Fig. 1 and hereinafter fully described, and shows the manner of supporting, guiding, positioning and driving said shaft.

Fig. 3 is a plan view of a portion of the said edging and web rolling roll shaft with its roll, a portion of its supporting means, and the gage rods, of which in this figure three are shown, whereby the radial positions of said roll with respect to the work-piece are determined, as hereinafter described and also described in my said original application.

Fig. 4 is a cross-section taken on line 4—4, Fig. 3, looking in the direction of the arrows at said line.

Fig. 5 is a sectional plan view of a modified form of the main operating parts of the apparatus or mill shown in Fig. 1. The work-piece is not shown in Fig. 5, but the work-piece at commencement of operation will be placed near or against said forming-die and between the piercers or work-supporting centers, as hereinafter fully shown and described.

Figure 58:
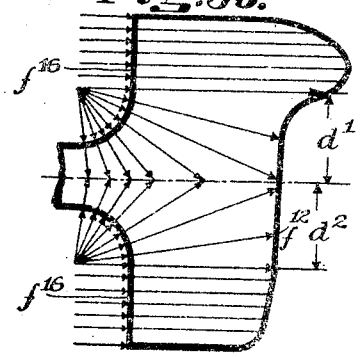

Figs. 6, 7, 8 and 9 inclusive, for instance, illustrate somewhat modified forms of the apparatus or mill illustrated in Figs. 1, 5 and 15, as hereinafter described.

Fig. 10, shows in sectional view a car wheel rolled or formed with the forming-die, one of the herein named web finishing rolls, one of the herein named die-supporting rolls, a face rolling roll, and a face finishing roll as shown and as hereinafter described.

Fig. 11 is a similar sectional view; in this figure is shown a rolled or formed car wheel similar to Fig. 9. Said car wheel is rolled or formed with the forming-die, one of the herein named edging and web rolling rolls formed wholly conical as shown, one of the herein named edging and die-supporting rolls, one of the herein named web finishing rolls, one of the herein named die-supporting rolls, and a face finishing roll.

Fig. 12 is a sectional side elevation, on enlarged scale, showing the adjacent ends of the supporting heads, the piercers or centers supported thereby, the forming-die supported on one of said piercers or centers, and some of the rolls; therein is also shown a work-piece rolled or formed to the finished rolled form of the car wheel shown at F²; therein is also shown one of the supporting heads provided with roller-supports formed as shown and acting against or in contact with the forming-die as shown.

Fig. 13 is a similar sectional side elevation, showing one of the supporting heads provided with roller-supports acting against or in contact with the marginal portion of the forming-die as shown.

Fig. 14 is a horizontal section through part of the supporting axle and the inner end of one of the supporting heads as shown and described in my said original application.

Fig. 15 is a sectional plan view of a portion of one form of the apparatus or mill showing my method and device for centering or for piercing or penetrating and centering, and for rolling or forming, for instance, dished flange car wheels; wherein an ingot, bloom, blank or other work-piece may also be centered or pierced or penetrated and centered and rolled with the use of the forming-die and with all the rolls of the apparatus or mill as shown and as hereinafter more fully described.

Figs. 16 to 19 inclusive illustrate on enlarged scale, the device for longitudinally moving or operating one of the supporting axles together with its piercer or center independent of its supporting head, or for moving said supporting head together with the supporting axle and its piercer or center, as hereinafter described in brief and, fully described in my application for patent filed October 9, 1917, Serial No. 195,637.

Figs. 20 to 36 show sectional views illustrating various combinations and different forms of rolls, piercers or centers, and forming-dies. These figures illustrate in accordance with my invention, certain piercing or centering or supporting steps and forming or rolling and forming steps for producing the car wheel shown for instance in the Fig. 22, 25, 28, 31, 34 or 36, or other figures as hereinafter described.

Figs. 37 and 38 illustrate, for instance, certain steps according to my invention for reworking or rerolling a dished car wheel, including the reworking of its hub portion.

Fig. 39 shows the forming-die and a portion of a work-piece in diametral section and illustrates the operation of piercing or penetrating the side of the portion of a work-piece next to the forming-die during the operating process, as hereinafter more fully described.

Fig. 40 is a transverse section taken on line 40 Fig. 41.

Fig. 41 is a sectional view showing a different combination of rolls, combined with a different form of forming-die. Therein is shown the forming-die driven by gear teeth formed thereon meshing with the teeth formed on the edging and die-supporting roll which is positively driven from its shaft.

Fig. 42 is a similar sectional view as Fig. 39 and shows a different form of the forming-die and rolls associated with the forming-die.

Fig. 43 is a sectional view showing the forming-die and the work-piece or finished product in diametral sections. In this figure is shown for instance a rolled or formed disk-wheel, or gear blank, or a center such as used for instance in some tired car wheels; otherwise this illustration is similar to the illustration in Fig. 6. Said disk-wheel or center is rolled or formed with the forming-die, one of the herein named edging and web-rolling rolls, one of the herein named edging and die-supporting rolls, one of the herein named die-supporting rolls, and a single face roll as shown. The die-supporting roll shown in this Fig. 43 may in some cases be omitted as in Fig. 6.

Fig. 44 shows a diametral section of an additional form of an ingot, bloom, blank, or work-piece, the same may be solid as shown, or may either be provided with a central impression at opposite sides, or with a central hole.

Fig. 45 is a sectional view showing, for instance, a work-piece previously formed as shown and placed on the forming-die as shown. Therein is shown only the central portion of both the work-piece and forming-die.

Fig. 46 is a sectional view showing, for instance, a portion of another form of forming-die and the centering supporting means. The work-piece is not provided with a central hole, but the forming-die and center are provided with pins which pierce or penetrate the work-piece as shown. Therein is shown only the center portion of both the work-piece and forming-die.

Fig. 47 is a sectional view showing, for instance, the central portion of the workpiece provided with a large central opening and still another form of centering means in which the centering element at one side of the work-piece is integral with the forming-die as shown. Therein is also shown only the central portion of the forming-die.

Fig. 48 is a sectional view showing the central portion of the workpiece previously formed as shown and provided with central depressions or pockets into which the piercers or centers are to be penetrated or entered, one of said piercers or centers being shown slidable within the forming-die. Therein is also shown only the central portion of the forming-die.

Fig. 49 is a sectional view showing the central portion of the work-piece provided with an axial or approximately axial opening and showing different forms of centering elements at opposite sides of the work-piece, the centering element at one side being in the form of a piercer or center as shown and the other being in the forming-die which also serves in forming a hub portion onto the work-piece and which forming-die is keyed or otherwise securely fastened to the work-supporting axle. Therein is also shown only the central portion of the forming-die.

Fig 50 is a sectional view showing, for instance, a work-piece provided with an opening somewhat off center and illustrating the method of piercing or penetrating the work-piece centrally, regardless of the position of the opening therein.

Figs. 51, 52 and 53, show diametral sections of various additional forms of ingots, blooms, blanks or other work-pieces.

Fig. 54 shows diametral sectional view of a car wheel rolled or formed in accordance with my invention, the same being shown with the hub bored.

Fig. 55 shows a diametral section of a completely rolled or formed dished car wheel taken on line 55—55, Fig. 57, the same being shown with the hub bored, showing the inner peripheral surface of the rim, at one side thereof, formed to a different angle than the inner peripheral surface of the rim at the other side thereof.

Fig. 56 shows a diametral section of a dished car wheel completely rolled or formed in accordance with my invention, and showing the inner peripheral face of the rim at one side of the car wheel formed to the same angle as the inner peripheral face of the rim at the other side thereof, the same being shown with the hub bored.

Fig. 57 shows a fragmentary plan view of a car wheel, rolled or formed in accordance with my invention.

Figure 59:
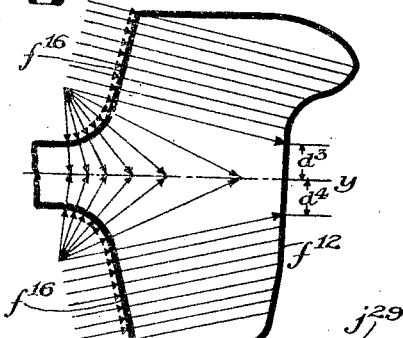

Figs. 58 and 59 illustrate diagrammatically improper flow of metal resulting from improper working of the metal in the rim portion of a car wheel or other circular object having a web, during the forming of said rim portion, all of which is avoided by my invention, as hereinafter described and also described in my said original application.

Figure 60:
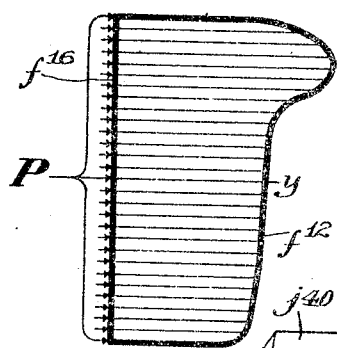

Fig. 60 illustrates, for instance, the proper flow of metal during the forming of a tire having no hub, such as used for some tired car wheels, as hereinafter described and also described in my said original application.

Figure 61:
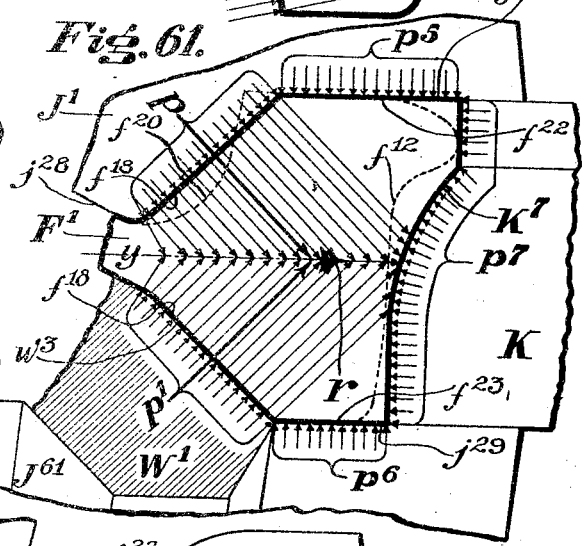
Figure 62:
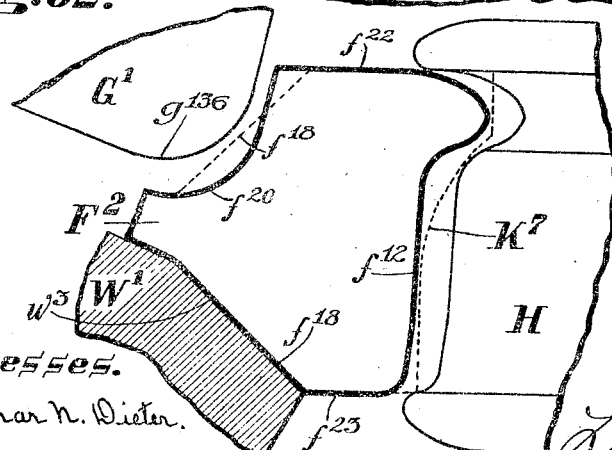

Figs. 61 and 62 are diagrammatic illustrations showing the result of the rolling or forming of the rim of a car wheel in accordance with my invention as hereinafter described, and also described in my said original application.

Figure 63:
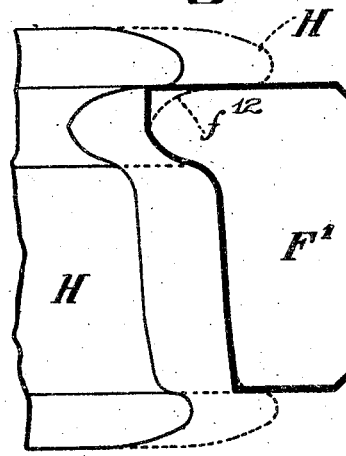
Figure 64:
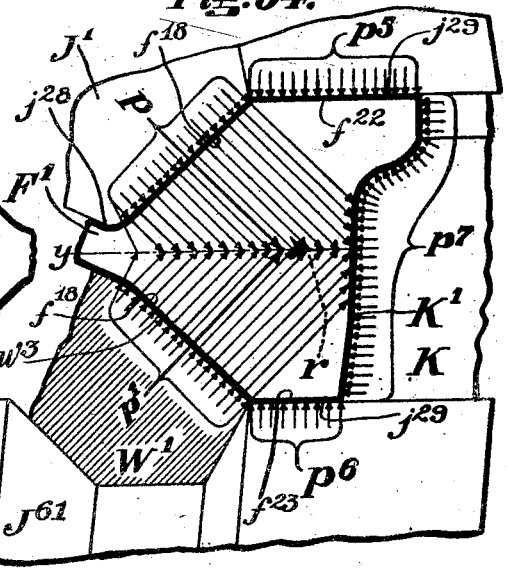
Figures 66, 67:
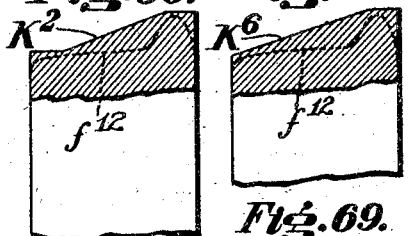
Figure 69:
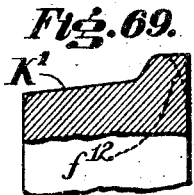
Figure 68:
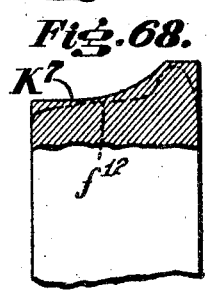
Figure 65:
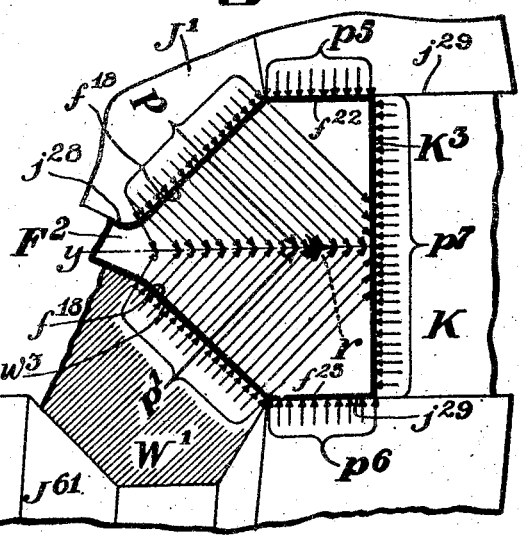

Figs. 63, 64 and 65 are similar diagrammatic illustrations showing the result of the rolling or forming of the rim of a car wheel or other circular body directly to finished form in accordance with my invention herein described. Fig. 64 shows the rim portion rolled with its flanged tread direct to finished form with the exception of rounding the outer corners of the flange and tread, and Fig. 63 shows said corners rounded with a separate finishing roll. Fig. 65 shows the rim portion having a straight peripheral face rolled direct to finished form.

Figs. 66 to 69 inclusive, show the flange and tread portions of car wheels and are diagrammatic views illustrating for instance a few shapes or ways of "beaking," as herein named and as hereinafter described and also described in my said original application.

It is, of course, to be understood that I do not intend to limit myself to the use of the particular parts herein shown nor the use of the remaining parts of the apparatus or mill shown and described in my said original application, as other means may hereafter be devised for carrying out my invention in a practical manner.

Similar characters of reference indicate corresponding parts throughout the several views and, the parts of my said original application herein shown and not changed in this application have the same characters of reference as in my said original application.

$B^2$ designates part of the bed-plate which forms part of a suitable frame or foundation for carrying or supporting the various parts of my apparatus or mill as fully shown and described in my said original application.

E, E are the herein named work-supporting axles which may be made of different lengths and may be formed and constructed differently to suit the various purposes for which they are intended, as hereinafter described. These axles are rotatably supported in supporting heads M, M$^{50}$ and are arranged in alinement; one with its supporting head M being arranged at one side of the work-piece when the same is positioned in the apparatus or mill and the other with its supporting head M$^{50}$ being arranged at the other side of said work-piece or at one side of the forming-die, as shown in the drawing. These axles in addition to serving to support the work-piece also serve other purposes as herein shown and described and they are longitudinally movable as hereinafter fully described.

One of said axles E, E, that is the one which is supported in the supporting head M, has one of the herein named piercers or supporting centers detachably secured to its inner or operating end, as shown. The other axle which is supported in the supporting head M$^{50}$ has one of the herein named piercers or supporting centers detachably secured to its inner or operating end and which piercer or center is passed through the forming-die, as for instance shown, or is formed integral with the forming-die, as for instance shown. Said axles are interchangeable for different lengths or differently formed axles, as may be required. Although so named, these piercers or centers also serve other purposes as hereinafter described, and are longitudinally moved or operated as hereinafter described.

Said piercers or supporting centers for the axle in the supporting head M are interchangeable, either on said axle or with said axle, and may have many different forms or shapes, as for instance E$^1$ in Fig. 26 or 43; E$^2$ in Fig. 37; E$^3$ in Fig. 46; E$^4$ in Fig. 47; E$^5$ in Fig. 49; E$^6$ in Fig. 1, 5, 6, 7, 8, 9, 10, 11, 12, 14, 15, 29 or 48; E$^{13}$ in Fig. 20; or as for instance E$^{15}$ in Fig. 23, 32, 35 or 41, &c. There is practically no limit to the forms or shapes that said piercers or supporting centers may have, as will appear from the matter hereinafter described.

Said piercers or supporting centers with the forming-die for the axle in the supporting head M$^{50}$ are interchangeable, either on said axle or with said axle, and may have many different forms or shapes, as for instance: E$^9$ in Fig. 1, 5, 6, 7, 8, 9, 10, 11, 12, 15, 16, 17, 26, 29, 39, 42, 43, or 50; E$^{12}$ in Fig. 13; E$^{14}$ in Fig. 20; E$^{16}$ in Fig. 23 or 32, E$^{17}$ in Fig. 35 or 41; or as for instance E$^{18}$ in Fig. 48, &c. There is practically no limit to the forms or shapes that said piercers or centers may have, as will appear from the matter hereinafter described.

Said piercer or supporting center for the axle in the supporting head M$^{50}$ has one of the herein named forming-dies, for instance W$^1$, W$^3$ or W$^6$ &c., which forming-dies may have many different forms or shapes, as for instance: W$^1$ in Fig. 1, 6, 7, 8, 9, 12, 13, 15, 26, 29, 39, 43, 48, 61, 62, 64, or 65; W$^3$ in Fig. 37; W$^6$ in Fig. 20; W$^{11}$ in Fig. 42; W$^{13}$ in Fig. 10 or 11; W$^{14}$ in Fig. 23 or 32; W$^{15}$ in Fig. 46; W$^{16}$ in Fig. 47; W$^{17}$ in Fig. 49; W$^{18}$ in Fig. 45; W$^{20}$ in Fig. 25; or as for instance W$^{21}$ in Fig. 41 which has a bevel gear formed at one of its sides which meshes with a bevel gear driven from shaft J, as shown, and whereby said forming-die is positively driven or rotated; or as for instance W$^{23}$ in Fig. 5, 16, or 17; or as for instance W$^{24}$ in Fig. 50 &c. Said forming-die is supported by said piercer or center in such manner that while it is rotated by rolls or the work-piece, or by both rolls and the work-piece, during the operating process, as hereinafter described, it also rotates said piercer or center together with the axle to which said piercer or center is secured, by means as for instance shown and described with reference to Fig. 39 to 50 inclusive. Said forming-dies may also be supported and rotated as for instance hereinafter described. Each forming-die, in preferred form, is of a diameter which reaches only to the inner peripheral face of the rim at one side of the finished car wheel or other finished circular object and is shaped to conform to the center or hub and web part and the inner peripheral or inner circumferential face of the rim portion of the finished car wheel or other circular body at one side thereof. The forming-die is shaped to conform with the shape or form which the finished dished car wheel or other finished dished object is to have at said one side inside of said inner peripheral face of the finished rim portion, as shown. All other portions or surfaces of the work-piece are rolled directly by rolls, as hereinafter more fully described. During the entire rolling or operating process, the metal at the peripheral face of the work-piece is worked directly by a roll or rolls.

Said forming-dies are each formed to provide the work-piece at one side thereof with a hub portion, a dished web portion and an inner peripheral face of a marginal or rim portion, or they are formed as and for the purpose hereinafter described.

F, F$^1$ and F$^2$ designate the work-piece from some of the various forms or shapes it may have when put into the apparatus or mill to some of the many various forms or shapes which the finished article or product may have. For instance, F designates the ingot, bloom, blank or other work-piece in a few of the many various forms or shapes it may have when put into the apparatus or mill, either solid, as for instance F in Fig. 26, 29, 39, 44 or 46, or it may be previously formed, or pierced, as for instance F in Fig. 20, 23, 32, 35, 45, 47, 49, or 50; or it may have a central hole, as for instance F in Fig. 47, 52, or 53; or as F$^1$ in the Fig. 37; or previously formed into form or shape, as for instance F in Fig. 48, 51, 52 or 53; or previously cast into any suitable form or shape, as for instance F in the Fig. 48, 51, 52 or 53; or it may be previously formed or rolled car wheel or other previously formed body to be reworked or rerolled, as for instance the car wheel or work-piece shown at $F^1$ in Fig. 37, which is shown reworked or rerolled to the form or shape shown at $F^2$ in Fig. 38. Such previously rolled or otherwise formed car wheel or other article to be rerolled or reworked in my apparatus or mill may also have any of the forms or shapes shown for instance at $F^2$ in Fig. 38, 43 or 54, or as shown at $F^1$ in Fig. 30, 33 or 37. There are a great many forms or shapes that the ingot, bloom, blank or other work-piece, or previously finished article may have when put into the apparatus or mill, as will appear from the matter hereinafter more fully described; or, as for instance $F^2$, which represents the finished article or finished product from my apparatus or mill.

J, J designate the roll shafts, one of which has at its inner or operating end one of the herein named edging and web rolling rolls, and the other has at its inner or operating end one of the herein named edging and die-supporting rolls. Although so named, these rolls also serve other purposes, as hereinafter described.

Said edging and web rolling rolls are interchangeable and may have many different forms or shapes, as for instance $J^1$ in Fig. 1, 2, 5, 6, 7, 15, 20 or 29; $J^5$ in Fig. 9 or 11; $J^{55}$ in Fig. 32; $J^{56}$ in Fig. 37; or as for instance $J^{69}$ in Fig. 23, 26, 35 or 43, &c. Said edging and web rolling rolls may be either removably attached to its shaft in such a way that the whole roll may be driven by its shaft, or only a part of the roll may be driven by its shaft and the other part or parts be permitted to turn loose; or the whole may be permitted to turn loose on a journal formed on its shaft or on a journal removably fastened to its shaft, all as described in my said original application. There is practically no limit to the forms or shapes that these rolls may have, as will appear from the matter hereinafter described.

Said edging and die-supporting rolls are interchangeable and may have many different forms or shapes, or for instance $J^{61}$ in Fig. 1, 6, 7, 9, 11, 15, 20, 23, 26, 29, 32, 37, 39 or 43; $J^{66}$ in Fig. 42; or as for instance $J^{75}$ in Fig. 41, which roll $J^{75}$ has at its one end, for instance, a bevel gear $j^{49}$ driven by its shaft J and meshing with a bevel gear $w^8$ formed with or attached to the forming-die $W^{21}$ and therewith driving said die $W^{21}$ as shown; or as for instance $X^4$ in Fig. 5, which roll $X^4$ turns loose for instance on a journal pin or spindle. Said edging and die-supporting roll for instance $J^{61}$ or $J^{66}$, may be either removably attached to its shaft in such a way that the whole roll may be driven by its shaft, or only part of the roll may be driven by its shaft and the other part or parts be permitted to turn loose; or the whole roll may be permitted to turn loose on a journal or journals formed on its shaft, or on a journal or journals removably fastened to its shaft, as shown and described in my said original application. There is practically no limit to the forms or shapes that these rolls may have, as will appear from the matter hereinafter described.

G, G designate the roll shafts, one of which has at its inner or operating end one of the herein named web finishing rolls, and the other has at its inner or operating end one of the herein named die-supporting rolls. Although so named, these rolls also serve other purposes as hereinafter described.

Said web finishing rolls may have many different forms or shapes, as for instance $G^1$ in Fig. 1, 5, 8, 9, 11, 15, 20, 23, 26, 29, 32, 35 or 37; or as for instance $G^{55}$ in Fig. 10 &c. Said web finishing rolls are interchangeable, as described in my said original application. There is practically no limit to the shape that these rolls may have, as will appear from the matter hereinafter described.

Said die-supporting rolls are interchangeable and may have many different forms or shapes, as for instance $G^{14}$ in Fig. 1, 8, 9, 11, 15, 20, 23, 26, 29, 32, 37, 39 or 43; $G^{48}$ in Fig. 42; $G^{61}$ in Fig. 10; $G^{110}$ in Fig. 35; $G^{111}$ in Fig. 41, or as for instance $X^3$ in Fig. 5, which roll $X^3$ turns loose for instance on a journal pin or spindle. Said die-supporting roll for instance $G^{14}$, $G^{48}$, $G^{61}$ or $G^{110}$ may be either removably attached to its shaft in such a way that the whole roll may be driven by its shaft, or only part of the roll may be driven by its shaft and the other part or parts may be permitted to turn loose; or the whole roll may be permitted to turn loose on a journal or journals formed on its shaft, or on a journal or journals removably fastened to its shaft. There is practically no limit to the forms or shapes these rolls may have, as will appear from the matter hereinafter described.

K designates the herein named tread or face rolling roll which is adapted to act against the peripheral face of the work-piece to roll said face to a beaked or rudimentary form, or to partly finished or to completely finished form and which roll during the rolling process is moved toward, against or away from the peripheral face of the work-piece. The said movements of said roll are limited or controlled by adjustable stops provided in the mechanism for causing said movements, as hereinafter described, and by means of said stops the radial distance or distances of said roll from the axis of the supported work-piece may be adjusted or controlled so as to suit any requirement and whereby said roll may be stopped and retained at any desired radial distance from the axis of the supported work-piece. Said tread or face rolling roll may also be supported so as to permit lateral movement of the same. The peripheral face of said roll may have also various different shapes as for instance described in my said original application and as hereinafter more particularly set forth, and said face roll may also serve other purposes; there being practically no limit to the shapes which the peripheral portion of said tread or face roll may have, or to the purpose for which said face roll may be used.

H designates the herein named tread or face finishing roll which is adapted to act against the peripheral face of the work piece. This roll, during the rolling process, is adapted to be moved toward, against or away from the peripheral face of the work-piece and the movements of said roll are limited or controlled by adjustable stops provided in the mechanism for causing said movements, as hereinafter described, whereby the radial distance or distances of said roll from the axis of the supported work-piece may be governed to suit the exact diameter of the car wheel when finished. After the car wheel has been rolled to its finished diameter, said roll acts as a rolling stop against the peripheral face of the work-piece, car wheel or other article, and maintains said finished diameter during any further operations against said work-piece, wheel or other article. The peripheral face of said roll may have also many different shapes, as for instance described more fully in my said original application, and as hereinafter more particularly set forth, and said face roll may also serve other purposes; there being practically no limit to the shapes which the peripheral portion of said tread or face finishing roll may have, or to the purpose for which said face roll may be used.

Said face rolls H and K may also be moved toward, against or away from the peripheral face of the supported work-piece, either together or independently of each other, as and in the manner hereinafter described and also as described in my said original application.

In rolling or forming for instance car wheels or other circular articles having each a hub, a dished web and a marginal or rim portion, the lateral thickness or width of said face roll K, in most cases, is the same as is the lateral thickness or width which the outer or rim portion of the car wheel or other article is to have when finished, as is shown for instance at K in the Figs. 6, 7, 15, 21, 22, 24, 25, 27, 28, 30, 31, 33, 34, 36, 37, 38 and 43. As shown in said figures the opposite side faces of said face roll K are therefore adapted to act for gaging the lateral thickness or width which the marginal or rim portion of the car wheel or other circular article is to have when finished. In some cases, said face roll K may be formed and be used as a face finishing roll, as for instance shown at K in Fig. 10, and in other cases said face roll may not be operating against the peripheral face of the work-piece but may serve other purposes. Said face finishing roll H, in some cases, may have a lateral thickness or width which is the same as is the lateral thickness or width which the outer or rim portion of the car wheel or other circular article is to have when finished, as shown for instance at H in Fig. 10, in which case the opposite side faces of said face roll H serve to act for gaging the lateral thickness or width which the marginal or rim portion of the car wheel or other circular article is to have when finished; and in other cases said face roll H may not be operating against the peripheral face of the work-piece, but may serve other purposes.

*Positioning, or raising, lowering and retaining device.*

I prefer to employ a positioning, or raising, lowering and retaining device, such as for instance shown and described in my said original application, for taking the finished article or product out of the apparatus or mill, for putting the properly heated ingot, bloom, blank or other work-piece into the apparatus or mill and retaining the same in a position wherein its outer portion or periphery is central or coaxial, or approximately so, with the piercers or work-supporting centers and also central with said forming-die arranged on one of said piercers or centers to permit of its being centered or pierced or penetrated with said piercers or centers in the center, or approximately in the center, of its outer portion or periphery and when said work-piece is so pierced or penetrated or centered, it will also be central with said forming-die, and for lowering the supporting member of said device away from said work-piece, either after said work-piece is so centered or pierced or penetrated or during said centering or piercing or penetrating process, and for retaining the supporting member of said device in said lowered position away from said work-piece, until said work-piece or said finished article or product is to be taken out of the apparatus or mill, as and in the manner shown and described in my said original application.

With reference, for instance, to Figs. 1, 2, 3, 4 and 15 illustrating the main operating parts of one form of my said apparatus or mill; the work-piece is not shown in Fig. 1, but will be placed between the piercers or centers, for instance $E^6$ and $E^9$. Fig. 2 is a side elevation of one of the oscillating frames for one of the shafts, J, J, that is, the oscillating frame for the shaft J having the roll $J^1$ shown in Fig. 1. In Fig. 3 is shown in plan view the end portion of one shaft J having, for instance, the roll $J^1$ and also the journal and guide piece $J^8$ shown in Fig. 1, but in Fig. 3 are shown three gage rods $J^9$, $J^9$, $J^9$. Fig. 4 is a sectional end view through line 4—4, Fig. 3, looking in the direction of the arrows. In said figures, M, $M^{50}$, are the herein named work-supporting heads; although so named, they also serve other purposes, as will be observed from matters hereinafter described. One of the herein named work-supporting heads M, $M^{50}$, that is the herein named work-supporting head M with its axle E and piercer or center, for instance $E^6$, is adapted to be moved by the pressure in its pressure cylinder N operatively connected therewith, as for instance illustrated in Fig. 15, forward or backward or in the same direction with the other piercer or center, for instance $E^9$, as the case may require, its maximum back-movement being indicated by the dotted lines for said head M, axle E and piercer or center $E^6$ (see Fig. 1). The distance of the maximum back-movement of the other herein named work-supporting head $M^{50}$ with its axle E, may be the same as for said head M, but such back-movement is in the opposite direction. The movements of head $M^{50}$, axle E, piercer or center, for instance $E^9$, and forming-die, for instance $W^1$ (see Fig. 1), take place as and in the manner and for the purpose hereinafter described. The shafts J, J, are each located and operated as illustrated in Fig. 1. One of said shafts J, J has at its inner or operating end one of the herein named edging and web rolling rolls, for instance $J^1$, which roll may be moved inward laterally from the position shown in solid lines to the position shown by the dotted lines for $J^1$, in which latter position it is in contact with the face roll K, as shown, and it may also be moved laterally in the opposite direction to the position shown by the other dotted lines for $J^1$; said two positions of said roll $J^1$ shown in dotted lines indicating approximately the extreme lateral range of movement of said roll $J^1$ and said roll, when operating against work-pieces to be rolled or formed into different articles, will have its axis either parallel or inclined to the side of the supported work-piece or to a plane at right angles to the axis of the work-supporting means, depending on the thickness and shape of the article.

The other of said shafts J, J has at its inner or operating end one of said herein named edging and die-supporting rolls, for instance $J^{61}$, which, in said Fig. 1, is shown with its die-supporting portion in contact with the forming-die, for instance $W^1$, and with its edging roll part in contact with the face roll K as shown. During the operating process, said face roll K is continually in contact with or is operating upon the peripheral face of the work-piece and as the work-piece increases in diameter, said face roll moves with the enlargement of said diameter and the edging roll part of said roll $J^{61}$ will roll against or in contact with the edge or side of the marginal or rim portion of the work-piece, as and in the manner hereinafter fully described. The forming-die, for instance $W^1$ shown in Fig. 1, is provided at one side thereof with a circular track or groove and the die-supporting portion of said roll $J^{61}$ is correspondingly shaped to fit said track or groove and support said forming-die during the operating process. The piercer or center, for instance $E^9$ at the end of the work-supporting axle E in said supporting-head $M^{50}$ is passed axially through said forming-die $W^1$, as shown, and serves also to centrally support said forming-die and it is adapted to be moved longitudinally with its work-supporting axle E, independent of said forming-die, as hereinafter more fully described. In said Fig. 1, the other piercer or work-supporting center $E^6$ is shown located with its axle E and head M at one side of said forming-die $W^1$, but during the operating process against a work-piece it is located at one side of the blank or work-piece and preferably revolves with the work-piece and forming-die. With reference to Fig. 1; before a work-piece is placed into the apparatus or mill, said forming-die $W^1$, die-supporting roll for instance $G^{14}$, edging and die-supporting roll for instance $J^{61}$, and the piercer or center, for instance $E^9$, with its axle E and supporting-head $M^{50}$ are moved into the proper positions, as for instance shown, and they are retained in such positions during the operating process. During the operation, the work-piece or wheel remains automatically axially clamped firmly between said piercers or centers $E^6$, $E^9$, as and for the purpose hereinafter fully described and also shown and described in my said original application. During the piercing or penetrating or centering process, with reference to Fig. 1, the piercer or center, for instance $E^6$, is moved longitudinally toward the other while said other piercer or center $E^9$ and the forming-die supported thereby are retained in fixed rotatable positions, or it may be otherwise moved as for instance hereinafter described with reference to Fig. 39.

*Oscillating frames for the herein named edging and web rolling roll and edging and die-supporting roll.*

In Fig. 1 are shown the two oscillating frames $J^{15}$, $J^{15}$ for said roll shafts J, J, each shown in horizontal sectional plan through the axis of its roll shaft J; said roll shafts and parts connected therewith being shown in plan. In Fig. 2, the oscillating frame for the shaft J having the roll $J^1$ shown in Fig. 1, is shown in side elevation and illustrates the shifting or adjusting and driving arrangements for said roll $J^1$. The driving mechanism for driving said roll is connected to the shaft $J^{18}$.

Each of said oscillating frames $J^{15}$, $J^{15}$ is oscillated or swung forward and backward laterally on its lower trunnion $J^{138}$ and its upper trunnion $J^{17}$ by the power or pressure in its coöperating power or pressure cylinder, the piston of which is operatively connected to the journal pin $J^{104}$ located in the bearing and guide piece $J^8$, one cylinder and piston being provided for each roll for giving the same its lateral movements, as and in the manner for instance fully shown and described in my said original application. The lower frame part of the oscillating frame $J^{15}$ is formed or provided with the trunnion part $J^{138}$ as shown. Said lower trunnion $J^{138}$ with its inner sides forms a bearing or bearings for the vertical shaft $J^{18}$. The housings $J^{10}$ and $J^{11}$ of each of said oscillating frames are adjustably fastened with their lower ends to the lower frame part of their oscillating frame $J^{15}$, and with their upper ends they are adjustably fastened to the upper part $J^{14}$ of said oscillating frame. Each of said trunnions $J^{17}$, $J^{17}$ of said oscillating frames is fitted and fastened to the upper part $J^{14}$ of its oscillating frame, as shown, and its axis is in line with the axis or extended axis of said vertical shaft $J^{18}$, as more fully described in my said original application.

Each of said shafts J, J is provided with feathers between said housings $J^{10}$ and $J^{11}$, and a bevel gear $J^{22}$ is slidably fastened to each shaft by means of said feathers. Each bevel gear is formed at its inner end with a long hub, as shown, which has a sliding fit over its shaft J and over said feathers. By means of said feathers said shaft is driven or rotated by said bevel gear $J^{22}$. Between the inner sides of said housings $J^{10}$ and $J^{11}$ and the ends of said bevel gear $J^{22}$ may be placed ball thrust bearings whereby said bevel gear is kept in its proper position endwise between said housings $J^{10}$ and $J^{11}$, and in proper mesh with a bevel gear $J^{23}$ secured to its shaft $J^{18}$, as fully described in my said original application. To each of the upper parts $J^{14}$, $J^{14}$ of the oscillating frames, one being provided for each oscillating frame, are fitted and bolted the supporting brackets $J^{28}$, $J^{28}$ and $J^{29}$, $J^{29}$ for its shifting cylinder $J^{77}$, as shown. Each of said shifting cylinders $J^{77}$, $J^{77}$, of which one is provided for each roll, is firmly but longitudinally and adjustably held by said supporting brackets and supported thereby.

Each of said shafts J, J is provided with one of said shifting cylinders $J^{77}$, $J^{77}$ as shown in the Fig. 2, wherein is shown the shaft with its said roll $J^1$ and the piston rod $J^{79}$ of the shifting cylinder $J^{77}$, which rod, by means of the double lever $J^{97}$, $J^{97}$, is adapted to move or adjust said roll shaft J with its said roll $J^1$ longitudinally forward and backward to the positions for instance indicated for said roll $J^1$ by the dotted lines thereof in Fig. 2. Each cylinder $J^{77}$ has a piston with a piston-rod $J^{79}$ and a piston rod $J^{80}$ passing through the cylinder heads $J^{81}$, $J^{81}$ at both ends of the cylinder $J^{77}$. The piston rod $J^{80}$ at its outer end has firmly fastened thereto the collar $J^{134}$ and from there it is provided with a long thread $J^{84}$, over which is fitted a threaded adjustable nut $J^{83}$ which is made in halves and when adjusted is firmly held together and to the piston rod $J^{80}$. This nut $J^{83}$ can be adjusted from one end to the other end of said thread $J^{84}$, and with the end of the extension $J^{82}$ of the packing box gland forms a stop for the piston stroke at this end of the cylinder. By adjusting said nut $J^{83}$ forward or backward, such as the case may require, the forward stroke of the piston is regulated and thereby the desired position of said edging and web rolling roll away from the center part and toward the rim part or periphery of the work-piece, wheel or other article is regulated or adjusted. To the outer end of the piston rod $J^{79}$, the cross head $J^{89}$ is fastened with a transverse key, or other suitable means, and from there said piston-rod is provided with a long thread $J^{87}$ over which is fitted the threaded adjustable nut $J^{86}$ which is made in halves and when adjusted is firmly held together and to the piston-rod. This nut $J^{86}$ can be adjusted from one end to the other of said thread $J^{87}$, and with the end of the extension $J^{85}$ of the packing box gland forms a stop for the piston stroke at this end of the cylinder. By adjusting said nut $J^{86}$ forward or backward, such as the case may require, the return stroke of the piston is regulated and thereby the desired position of said edging and web rolling roll toward the center or hub part of the work-piece, wheel or other article is regulated or adjusted. Said cross-head $J^{89}$, at both its outer sides is formed or provided with trunnions $J^{91}$. Links $J^{90}$ are connected with one of their ends to said trunnions $J^{91}$, and with their other ends to the journal pin $J^{92}$ as shown, said links being located at the upper ends of said double levers $J^{97}$, $J^{97}$ and connecting the upper ends of said double lever $J^{97}$, $J^{97}$ with the cross-head $J^{89}$ as shown. Lugs $J^{30}$ are formed with the lower frame part of said oscillating frame $J^{15}$ at one end thereof, as shown, and are provided with bearings for the journal pin $J^{96}$ at one end of the link $J^{95}$. At its other end, said link $J^{95}$ is provided with a bearing for its other journal pin $J^{94}$. At each of the outer sides of said link $J^{95}$, the end parts of said journal pin $J^{94}$ are fitted or fastened to the lower ends of said double lever $J^{97}$, $J^{97}$, as shown: said double lever consisting of the like parts or levers $J^{97}$, $J^{97}$, as shown in Figs. 1 and 2. Each roll shaft $J$ at its outer end is provided with a thread over which is fitted the threaded adjustable nut $J^{102}$ which is made in halves and when adjusted is firmly held together and to the shaft $J$. Fitted to said shaft $J$ between said nut $J^{102}$ and a shoulder provided on the shaft, are the cross-head $J^{98}$ and thrust bearings located at each end of said cross-head $J^{98}$, as fully described in my said original application. Said cross-head $J^{98}$ is provided at two of its opposite sides with the journals or trunnions $J^{93}$, $J^{93}$, whereby said cross-head $J^{98}$ is connected with the double lever $J^{97}$, $J^{97}$, as shown. Said cross-head does not revolve with shaft $J$ and any end play or wear is taken out or adjusted by said nut $J^{102}$. Each roll shaft $J$, is as before said, supported in the bearing of said guide piece $J^8$, and in the bearings of said housings $J^{10}$ and $J^{11}$, and is shifted or adjusted longitudinally with said double lever $J^{97}$, $J^{97}$ by the pressure of its said shifting cylinder $J^{77}$, in the bearings of said parts $J^8$, $J^{10}$ and $J^{11}$ and in said bevel gear $J^{22}$, forward or backward, such as the case may require.

Each of said guide pieces $J^8$, one for each roll, see Figs. 1 and 2, is formed at its upper side with a lug to which is lengthwise adjustably attached the gage rod $J^9$, as shown, or two or more such gage rods may each be so adjustably attached to such lug or lugs, as shown for instance in Figs. 3 and 4, in which figures for instance three such gage rods are shown. Said gage rod $J^9$ is formed at one end with a long thread which is provided with the nuts as shown, and its other pointed end is bent down, as shown. Each of said shafts $J$, $J$ is provided with a circumferential mark or shoulder $J^{152}$ as shown. In Fig. 2, the roll $J^1$ is shown in a position corresponding with the adjustable nut $J^{83}$ while against the end $J^{82}$ of the extension of the packing box and the one end of cylinder $J^{77}$. The outer dotted lines for the roll $J^1$ show said roll when moved into the position corresponding with that of the adjustable nut $J^{86}$ when against the end $J^{85}$ of the extension of the packing box at the other or lever end of cylinder $J^{77}$, as is shown by the dotted lines for said nut $J^{86}$, and the corresponding position of said double lever $J^{97}$, $J^{97}$ is also shown by dotted lines. When the gage rod $J^9$ is adjusted, for instance, to its position shown in Fig. 2, then in such case, the roll $J^1$ is shifted until said mark or shoulder $J^{152}$ on said shaft $J$ has reached the point of said gage $J^9$, as illustrated in Fig. 2, by the dotted line for $J^{152}$, and in said position the roll $J^1$ will be, for instance, approximately in the position between said extreme positions indicated by the dotted lines for part of said roll $J^1$, in which position the operation of the said roll $J^1$ against the work-piece may commence. Said gage rod or rods $J^9$ are adapted to be adjusted to any desired position or positions between said shifting limits to indicate a predetermined point or points from the center of the supported work-piece. Such gage rod or rods may also be provided for said edging and die-supporting roll, for instance, $J^{61}$, if such be desired. The nuts on said gage rods $J^9$, $J^9$ &c. can be adjusted to the ends of the thread forward or backward, such as the case may require, whereby the points of said gage rods $J^9$, $J^9$ &c, can be adjusted to any desired position or positions of said rolls between their shifting limits.

Said edging and web rolling roll, for instance $J^1$, and said edging and die-supporting roll, for instance $J^{61}$, may be shifted or adjusted longitudinally independently of each other; for instance, in such a way that said edging and die-supporting roll $J^{61}$ is retained in contact with the forming-die, for instance $W^1$, as shown, or in any other position between its shifting limits, as for instance may be required for other formed forming-dies herein illustrated; or said rolls $G^{14}$, $J^{61}$ with their shafts $J$, $G$ may be substituted by rolls that do not move longitudinally, as for instance the rolls $X^3$ and $X^4$ in Fig. 5, and said edging and web rolling roll, for instance $J^1$, while operating on the work-piece, may be shifted or adjusted forward and backward, such as may be desired. In Fig. 20, the edging and die-supporting roll for instance $J^{61}$ is adjusted to and is retained in contact with the forming-die for instance $W^6$ as shown, and the work-piece during the rolling process is pressed against said forming-die $W^6$, which is supported by the edging and die-supporting roll $J^{61}$ with practically the same pressure with which the edging and web rolling roll, for instance $J^1$, may be pressed laterally against the work-piece, as shown for instance in Fig. 21. During the rolling process, the said roll J¹ with its web reducing part j²⁸ operates on the web, hub and inner rim parts, and with its said edging roll part j²⁹ operates upon the portion of the work-piece between said web reducing part j²⁸ of said roll J¹ and the periphery of the work-piece at one side thereof. During the time the roll J¹ is moved or forced laterally from the position shown in Fig. 20 to the position shown in Fig. 21 by the pressure in its other coöperating cylinder (the piston of which cylinder is operatively connected to the journal-pin J¹⁰⁴ located in said guide piece J⁸ in Fig. 1) the edging roll part j²⁹ of the edging and die-supporting roll, for instance J⁶¹, is operating against the edge or side of the rim portion, and with the aid of the face roll K forms the hub, the web, and the rudimentary rim portion of the work-piece as shown in Fig. 21.

Said edging and web rolling roll, for instance J⁶⁹ in Fig. 24, 27, 36 or 43, or for instance J⁵⁵ in Fig. 33, is formed as shown; that is, each consists of an edging roll portion j²⁹, a web rolling or web reducing portion j²⁸, and a hub end-face rolling portion j⁴³, and with its said hub rolling portion j⁴³ has rolled or formed the hub to its desired finished length and with its said edging roll portion j²⁹ it has rolled or formed the rim to its desired finished lateral width and with its web rolling portion j²⁸ it has rolled or formed the web portion in Fig. 24, 27, 36 or 43 to its desired thickness and form and, the roll J⁵⁵ in Fig. 33 has rolled or formed with its web rolling portion j²⁸ the central portion of the web to its desired thickness and form, as shown; that is to say, when the edging roll portions j²⁹, j²⁹ of the rolls J⁶⁹, J⁶⁹ in Fig. 24, 27 or 43; or the edging roll portions j²⁹, j²⁹ of the rolls J⁵⁵, J⁶¹ in Fig. 33, are against or in contact with the opposite sides of the face roll K as shown, said hub rolling portion j⁴³ has rolled or formed the hub to its desired finished length and the web rolling portion j²⁸ has rolled or formed the said web portion to its desired thickness. From this it will be observed that with said edging roll portion j²⁹ as a basis, the diameters of said other portions j²⁸ and j⁴³ are made to suit the length of the hub and the thickness of the web.

The edging and web rolling roll, for instance J¹, in Figs. 29 and 30 is formed similar to the edging and web rolling roll J⁶⁹ last above referred to, with the exception that it has the hub end-face rolling portion j⁴³ omitted. The web rolling or web reducing portion j²⁸ is, however, similarly related to the edging roll portion j²⁹ and with said edging roll portion rolling in contact with the face roll K, the extent to which the thickness of the web is reduced is governed as described, for instance, with reference to Fig. 24, 27, 36 or 43.

*Oscillating frames for the hereinnamed web finishing roll and die-supporting roll.*

In Fig. 1 are also shown, in plan view with their upper parts removed, the two swinging or oscillating frames G¹⁶, G¹⁶ on which are mounted in bearings G¹⁰ and G¹² the roll shafts G, G. One of said shafts G, G has at one of its ends one of the herein named web finishing rolls, for instance G¹, and the other shaft G has at one of its ends one of the herein named die-supporting rolls, for instance G¹⁴. Said shafts G, G consist each of the two sections G and G⁸ and have for instance their rolls G¹, G¹⁴ at their outer ends, adjacent or near the oscillating or free ends of said oscillating frames. Each of said shafts G, G is provided at its other or outer end with the coupling part G³⁰ which is connected to a driving mechanism for said roll. Such driving mechanism is not shown herein but is shown and described in my said original application. Said shaft section G is interchangeable with other similar shaft sections and is removably fitted into the socket portion G⁹ of the shaft section G⁸. Said roll G¹ with its said shaft sections is longitudinally adjustable or movable in said bearings G¹⁰ and G¹², the distance indicated, for instance, by the dotted portion of the lateral apex of said roll G¹ for said longitudinal movements, and during the operating process it is also laterally movable from the position of said roll G¹ shown in solid lines to its position next thereto shown in dotted lines, in which latter position it is in contact with the face finishing roll H, as shown. Said roll G¹ may also be moved laterally from its said position shown in solid lines to its extreme position shown in dotted lines and indicated by its path shown by the curve dotted line x, as and for the purpose described in my said original application. Each of said oscillating frames swing or oscillate on a bearing or bearings provided in its hub shaped end, for instance G¹⁷, and when for instance said web finishing roll G¹ is moved or oscillated toward or against or away from the work-piece, it travels, therefore, in a circular path which has its center on the axis of the journal or pivot G²⁰, as shown in Fig. 1; that is, the circular path described by each of said rolls for instance G¹, G¹⁴, is concentric with the axis of said bearing or bearings provided in said hub-shaped end G¹⁷. Thereby is also produced the proper direction of pressure against the work-piece; this being one of the main purposes for locating the axis of said journal or pivot G²⁰ a proper suitable distance away from the axis or extended axis of its roll shaft G, as for instance shown and all as and for the purpose more fully shown and described in my said original application.

Tread or face rolls H and K.

With reference to Fig. 1; the face finishing roll H with its supporting or slide head $H^5$ is located between said shafts G, G and their rolls, for instance $G^1$, $G^{14}$, and is moved in guide or slide bearings at right angles with the axis of the work-piece, as shown, toward and against or away from the work-piece, such as the case may require, by means of pressure in the cylinder $H^{27}$, or by any other suitable means. Said cylinder $H^{27}$ is bolted to the bed plate, as shown and described in my said original application. The said pressure cylinder $H^{27}$ has a piston with a front piston-rod $H^{20}$ which projects from the front end of the cylinder and a rear piston-rod which passes through the cylinder head at the rear end of said cylinder. The front piston-rod $H^{20}$ is firmly attached at its outer end to said head $H^5$ and the rear piston-rod is firmly attached near its end $H^{26}$ to the cross-head $H^{40}$. From the cross-head $H^{40}$, the piston-rod is provided with a long thread $H^{23}$ over which is fitted a threaded adjustable nut $H^{24}$ made in halves and firmly held together and to the piston-rod by means of screws. This nut $H^{24}$ can be adjusted from one end to the other end of said thread $H^{23}$ and with the end of the extension $H^{32}$ of the packing box gland forms a stop for the forward stroke of the piston in said cylinder $H^{27}$. By adjusting said nut $H^{24}$ forward or backward, as the case may require, the forward stroke of the piston in cylinder $H^{27}$ is regulated and thereby the limit of the forward movement of the tread or face finishing roll H is adjusted. At a suitable distance from the end $H^{26}$ of said rear piston-rod is located an adjusting screw $H^{34}$ which is formed at its end with the enlargement $H^{36}$ forming a stop to limit the movement of the finishing roll H away from the work-piece, and near its outer end said screw $H^{34}$ is provided with a lock nut. Said screw $H^{34}$ is firmly supported by the cross-piece $H^{37}$ which is firmly connected with the cylinder $H^{27}$ by means of upper and lower distance rods, as shown and described in my said original application. The end $H^{36}$ of said screw $H^{34}$ forms with said end $H^{26}$ of said rear piston-rod a stop for the pull-back stroke of the piston in cylinder $H^{27}$, and by adjusting said screw $H^{34}$ forward or backward, as the case may require, the pull-back stroke of the piston in cylinder $H^{27}$ is regulated and thereby the limit of the return or pull-back movement of the tread or face finishing roll H is adjusted.

Tread or face rolls H and K, movements, and pressure equalizing device, &c.

The said cross-head $H^{40}$ is formed at each of its lower and upper sides with a trunnion $H^{41}$, as and for the purpose fully shown and described in my said original application. A cross-head similar to the cross-head $H^{40}$ is firmly attached to the rear end of the piston-rod of the piston in the pressure cylinder $K^{27}$ for the herein named tread or face rolling roll K, as and for the purpose fully described in my said original application.

With further reference to Fig. 1; the herein named tread or face rolling roll K with its supporting or slide head $K^{12}$ is located between said shafts J, J and between the said edging and web rolling roll, for instance $J^1$, and the said edging and die-supporting roll, for instance $J^{61}$, and is moved forward and backward, as the case may require, in a guide or slide bearing at right angles with the axis of the work-piece or at right angles with the axes of the piercers or centers, for instance $E^6$, $E^9$, as shown, such movements being effected by means of the pressure in the pressure cylinder $K^{27}$, or by any other suitable means. To the said supporting or slide head $K^{12}$ is firmly attached the piston-rod $K^{20}$ of the cylinder $K^{27}$.

The said cylinder $K^{27}$ is firmly bolted to the main bed-plate parts and has a piston with a front piston-rod $K^{20}$ and a rear piston-rod passing through the cylinder heads at both ends of cylinder $K^{27}$, as more fully shown and described in my said original application. The front piston-rod $K^{20}$ is firmly connected at its outer end with said head $K^{12}$ and near the cylinder end is provided as shown in Fig. 1 with a long thread $K^{34}$, over which is fitted a threaded adjusting nut $K^{36}$ which is made in halves and firmly held together and to the piston-rod by means of the screws, as shown. The nut $K^{36}$ can be adjusted from one end to the other end of said tread $K^{34}$, and with the end of the extension $K^{33}$ of the packing box gland forms a stop for the pull-back stroke of the piston in cylinder $K^{27}$. By adjusting said nut $K^{36}$ forward or backward, as the case may require, the pull-back stroke of the piston in cylinder $K^{27}$ is regulated and thereby the limit of the pull-back movement of the tread or face rolling roll K is adjusted. The rear piston-rod (not shown herein) is firmly fitted and fastened near its end to a cross-head which is similar to the cross-head $H^{40}$, and from there the piston-rod is provided with a long thread over which is fitted a threaded adjustable nut which is similar to and serves the same purpose as said nut $H^{24}$ and which can be adjusted from one end to the other of the threaded portion of its piston-rod. Said adjustable nut, with the end of the extension of its packing box gland at the outer end of said cylinder $K^{27}$, forms a stop for the forward stroke of the piston in cylinder $K^{27}$, and by adjusting said nut forward or backward, as the case may require, the forward stroke of the piston in cylinder $K^{27}$ is regulated and thereby the limit of the forward movement of the tread or face rolling roll K is adjusted; all as more fully shown and described in my said original application.

Said tread or face rolling roll K is connected with the said herein named tread finishing roll H by an equalizing mechanism, for instance, such as shown and described in my said original application and which is adapted to equalize the movements and the pressures of said tread or face rolling roll and said tread or face finishing roll against the work-piece. Said equalizing mechanism may be connected with or be disconnected from said face rolls, for instance K and H, without disconnecting said face rolls from their pressure means; that is, with said equalizing mechanism connected, said tread or face rolls H and K may be moved toward and against or away from the work-piece together, that is, each the same distance. For some rolls or articles it is required that each one of said rolls H and K be moved toward, against, or away from the work-piece independently of each other; or, one of said rolls H and K may be used only, and in such cases, said equalizing mechanism will be disconnected, as for instance shown and described in my said original application. By this means, said tread or face finishing roll H and said tread of face rolling roll K, may be worked, either together or independently of each other.

By the driving means shown and described in my said original application, the roughing side of the apparatus or mill, having the said edging and web rolling roll, may be either connected to or be disconnected from the main driving shaft of the apparatus or mill for the purpose described in my said original application, or may be made to run in either direction, or at such various speeds, as and for the purpose described in my said original application.

Fig. 5 illustrates for instance such rolling or operating process with only such rolls as shown; that is rolls H, K, $J^1$ and $G^x$, together with their operating parts and mechanism are, for instance, the same as the ones shown in Fig. 1 and may also be operated as for instance described with reference to Fig. 1. But in the illustration shown in Fig. 5, the rolls $J^{61}$ and $G^{14}$ together with their operating parts and mechanism shown in Fig. 1 are omitted and in place thereof the work-supporting head $M^{50}$ is provided with the edging and die-supporting rolls, for instance $X^3$ and $X^4$ which, in the illustration shown, turn loose on their journals or spindles and operate as fully described in my application for patent filed October 9, 1917, Serial No. 195,637.

In this arrangement, the whole work-supporting head $M^{50}$ together with said rolls, for instance $X^3$, $X^4$, the forming-die, for instance $W^{23}$, and the piercer or center, for instance $E^9$, may be moved forward or backward and adjusted to their proper positions, as for instance shown in Fig. 5, by the pressure in its pressure cylinder O (see for instance Fig. 15) the piston of which is operatively connected with said work-supporting head $M^{50}$ and may be adjusted so that the edging roll part $g^{137}$ of said die-supporting roll $X^3$ is in contact with said face roll H and, the edging roll part $j^{29}$ of said edging and die-supporting roll $X^4$ is in contact with said face roll K as shown. At the commencement of the rolling operation, said face roll K, is moved toward and against or in contact with the forming-die $W^{23}$, as shown in Fig. 5, and said face roll H is moved a proper radial distance from the axis of said piercers or centers $E^6$, $E^9$. In some cases, said face rolls K and H may be moved toward or against and away from the peripheral face of the work-piece in unison; that is, each face roll will be moved the same distance; or said face rolls K and H may each be moved into a position which is a certain radial distance from the axis of said piercers or centers $E^6$, $E^9$ and be retained in said radial position until the work-piece or wheel is finished, as hereinafter more fully described.

*Piercers or work-supporting centers, and work-supporting heads, or supporting heads, &c.*

In Fig. 15 I have illustrated the device I prefer to use for centering or piercing or penetrating and centering ingots, blooms, blanks or other work-pieces, for supporting the same, and also for putting the work-pieces at their hubs or center portions, while so supported by said work-supporting centers or by said work-supporting centers and said forming-die, in clamped condition laterally or axially between said piercers or work-supporting centers and automatically keeping said hub or center portion in clamped condition by constant pressure during the operating process as hereinafter more fully described and also described in my said original application; said device coacting with the forming-die for such purpose as will be hereinafter described.

The herein named work-supporting heads, M, $M^{50}$, although so named also serve other purposes, as will be observed from the following:

The work-supporting axle E of said head M has one of said piercers or work-supporting centers at one of its ends, as for instance $E^1$, $E^2$, $E^3$, $E^4$, $E^5$, &c and the work-supporting axle E of said head $M^{50}$ has one of said piercers or centers at one of its ends, as for instance $E^9$, $E^{12}$, $E^{14}$, $E^{16}$, &c. Said work-supporting heads M, $M^{50}$ are moved longitudinally in line with the axes of said piercers or work-supporting centers by means of pressure in the cylinders O and N (see for instance Fig. 15) or by any other equivalent means, toward or away from each other; or they may be moved together in either direction; or one of them may be retained in any position while the other is moved toward or away from the one so retained: or they may be otherwise moved, as the case may require. One of said work-supporting heads M, $M^{50}$, for instance the head $M^{50}$, is operatively connected with the piston-rod $O^3$ of the piston in cylinder O and is moved by the pressure in said cylinder. The other work-supporting head M is operatively connected with the piston-rod $N^3$ of the piston in cylinder N and is moved by the pressure in said cylinder.

In Fig. 15, O is the said pressure cylinder for the work-supporting head $M^{50}$ located at one side of the work-piece or at one side of the forming-die, for instance $W^1$; and, N is the pressure cylinder for the work-supporting head M located at the other side of the work-piece or at the other side of said forming-die $W^1$. Cylinder O has a piston with a piston-rod $O^3$ and a piston-rod $O^2$ passing through both the cylinder heads $O^{15}$ and $O^{16}$ (see Fig. 15) at both ends of cylinder O. The piston-rod $O^2$ is provided at its outer end with a long thread $O^{11}$ over which is fitted a threaded and adjustable nut $O^{12}$, as shown. This nut $O^{12}$ can be adjusted from one end to the other of said thread $O^{11}$. At the outer end of said thread the piston-rod $O^2$ is provided with a safety stop collar $O^{14}$ which indicates the limit of adjustment of said n $O^{12}$ toward the end of the piston-rod and nereby prevents the piston from coming against the cylinder head $O^{16}$. The piston-rod $O^3$ is firmly connected at its outer end with said work-supporting head $M^{50}$. From the outer end $M^{22}$ of said head $M^{50}$ the piston-rod $O^3$ is provided with a thread over which is fitted a threaded adjustable nut $O^7$, as shown. This nut $O^7$ can be adjusted from one end to the other of said thread, as may be required in adjusting the pull-back stroke of the piston with its rods $O^2$, $O^3$. Next to said nut $O^7$, the piston-rod $O^3$ is also provided with a sleeve or distance piece $O^9$, as shown (the purpose of this piece $O^9$ being described in my said original application). The details and description of the cylinder N and its connecting parts for the head M at the other side of the work-piece, are similar to those described above, and the characters of reference N to $N^{18}$ &c indicate the corresponding parts O to $O^{18}$ &c. In said Fig. 15, the piercers or work-supporting centers, with their work-supporting heads $M^{50}$ and M are operated by the pressures in said cylinders O and N acting against the pistons of said piston-rods $O^2$, $O^3$ and $N^2$, $N^3$.

In the illustrations shown in Figs. 17 and 18, said head $M^{50}$ with its axle E, piercer or center, for instance $E^9$, and the forming-die, for instance $W^{23}$, may be moved into the position for instance shown in Fig. 1 or 5, and therein said head $M^{50}$ and forming-die $W^{23}$ may be retained in a fixed position.

*Device for moving the piercer or center independent of the supporting head, or for moving the supporting head together with the piercer or center.*

Figs. 16 to 19 inclusive, illustrate on an enlarged scale the device for longitudinally moving or operating one of the supporting axles E, E and its piercer or center, for instance, $E^9$ independent of its supporting head $M^{50}$ which is required for some work, or for moving said supporting head $M^{50}$ together with said axle E and piercer or center $E^9$; fully shown and described in my application for patent filed October 9, 1917, Serial No. 195,637.

The supporting head M in Fig. 15 is provided at the outer end $M^{52}$ of is upper portion with an end plate $M^1$, and the parts connected therewith are as shown and described in my said original application, and, the supporting head $M^{50}$ in Figs. 15, 16 and 17 may be provided at the outer end $M^{52}$ of its upper portion with said end plate $M^1$, or said head $M^{50}$ may be provided at the outer end $M^{52}$ of its upper portion with the end plate $U^{31}$ (shown in Figs. 16 and 17) and the parts connected therewith as shown for instance in said Figs. 16 and 17. Said parts $M^{50}$ and $U^{31}$ also form the supports for the bearings for the axle E.

Fig. 16 is a side elevation of the supporting head $M^{50}$ shown connected with its pressure cylinder O, and shows the forming-die for instance $W^{23}$ in diametral section, and also shows die-supporting rollers, for instance $X^2$, $X^2$ formed and located as shown. The piston-rod $U^2$ of the cylinder U, hereinafter described with reference to Fig. 17, is shown disconnected from the cross-head $U^{30}$ of the axle E, and the axle E and piercer or center, for instance, $E^9$, and forming-die, for instance $W^{23}$, are longitudinally moved or operated together or in unison with the supporting head $M^{50}$, as and in the manner described with reference to Fig. 15.

It may here be noted that the forming-die, for instance $W^{23}$, is so formed on its inner or operating side that the web portion of the finished car wheel will be in dished position as for instance illustrated in Fig. 55 or 56; that is to say, in preferred form the inner face of the die is inclined or bulged inwardly from its peripheral edge toward its axis. In the present application this is also true of all forming-dies hereinafter referred to and in this respect, this application differs from my application filed October 9, 1917, Serial No. 195,637, in which the dishing is effected by means independent of the forming-die.

Fig. 17 is a similar side elevation of the supporting head $M^{50}$ with the parts connected therewith shown in Fig. 16, with the exception that in Fig. 17, the piston-rod $U^2$ of the cylinder U is shown connected with the cross-head $U^{30}$ of the axle E. In the operation, the supporting head $M^{50}$ with the forming-die, for instance $W^{23}$ and die-supporting rollers $X^2$, $X^2$ is longitudinally moved or adjusted into the position for instance shown in Figs. 1, 5 and other figures hereinafter shown and described, in which position said parts $M^{50}$, $W^{23}$ and $X^2$, $X^2$ may be retained during the operating process, while said axle E and piercer or center, for instance $E^9$, are longitudinally moved or operated by the pressure in cylinder U acting upon its piston and piston-rod $U^2$ operatively connected with said cross-head $U^{30}$ in the following manner:—Said piston-rod $U^2$ has a piston operating under pressure in the cylinder U and another piston-rod $U^1$. Said piston-rods $U^2$ and $U^1$ pass through the cylinder heads $U^4$ and $U^3$ at opposite ends of cylinder U. Next to said cross-head $U^{30}$, said piston-rod $U^2$ is provided with a long thread, as shown, over which is fitted a threaded and adjustable nut $U^{11}$, as shown. This nut $U^{11}$ can be adjusted from one end to the other of said thread, as may be required in adjusting the pull-back stroke of the piston with its rods $U^2$ and $U^1$. Said piston-rod $U^1$ is provided at its outer end with a long thread $U^5$ over which is fitted a threaded and adjustable nut $U^8$, as shown in Fig. 17. This nut $U^8$ can be adjusted from one end to the other of said thread $U^5$, as may be required in adjusting the forward stroke of the piston with its rods $U^2$ and $U^1$. At the outer end of said thread a safety top collar $U^9$ is provided which indicates the limit of adjustment of said nut $U^8$ toward the end of the piston-rod and thereby prevents the piston from coming against the cylinder head $U^4$. Next to said nut $U^{11}$, the piston-rod $U^2$ is also provided with a sleeve or distance piece $U^{10}$ as shown, which may be made any desired length. When operating said axle E with its piercer or center, for instance $E^9$ together with said head $M^{50}$, as above described with reference to Fig. 16, the sleeve $U^{10}$ and nut $U^{11}$, are then removed from the piston-rod $U^2$ to permit said piston-rods $U^2$ and $U^1$ to be entirely disconnected from said cross-head $U^{30}$ and be moved out of operative position, as above described with reference to Fig. 16, and all as more fully described in my application for patent filed October 9, Serial No. 195,637.

Fig. 18 shows a half cross section through line 18—18, Fig. 17 and Fig. 19 shows a sectional end view of the supporting head $M^{50}$ through line 19—19 Fig. 17.

The lower end of the casting forming said cylinders U and O is rigidly fastened to the bed-plate portion $B^2$, and said supporting head $M^{50}$ is slidably supported and guided in the guide $M^{31}$ which is fastened to said bed-plate portion $B^2$, as for instance shown in Figs. 16 and 17, as partly illustrated in Fig. 12, and as more fully shown and described in my said original application.

*Centering, or piercing, or penetrating and centering.*

By the words "centering, or piercing or penetrating and centering" used herein, I mean that, the ingot, bloom, blank or other work-piece is centered, or pierced or penetrated by the apparatus or mill, by forcing either one or both of said piercers or work-supporting centers, hereinafter more fully described, against or into the work-piece by their said pressure means (see Fig. 15), when the outer portion or periphery of said work-piece is brought coaxial, or approximately coaxial, with the piercers or work-supporting centers by means of said positioning, or raising, lowering and retaining device; or metal of the work-piece may be forced over or around any one of said piercers or centers, hereinafter more fully described, for instance with reference to Figs. 20 and 21, 23 and 24, or 26 and 27 or 39, &c.; and this means herein that said work-piece is centered, or pierced or penetrated and centered, because said piercing or penetrating at the same time also centers said work-piece, for the reason that at the beginning of said centering or piercing or penetrating and centering process, the outer portion or periphery of said work-piece is then coaxial, or approximately so, with said piercers or work-supporting centers and is central with the said forming-die; that is, said piercers or work-supporting centers are then in the center or approximately in the center of the outer portion or periphery of said work-piece.

*Centering, or piercing, or penetrating and rolling; and example.*

In Figs. 26 and 27, I have for instance illustrated in brief, one of the piercing or penetrating or centering processes or steps and one of the operations for rolling or forming a car wheel or other circular body including its central or hub portion such as I prefer to employ in carrying out the process of rolling or forming car wheels, &c.

In Fig. 26, the properly heated blank or work-piece F, shown in diametral section, may have a thickness which is either the same, or greater, or less than the length which the hub of the car wheel or other circular body is to have when rolled to finish. The work-piece F shown in Fig. 26 has been brought into the position shown by a positioning, or raising, lowering and retaining device, such for instance as shown and described in my said original application, in which position the outer portion or periphery of the work-piece is coaxial or approximately so with the piercers or work-supporting centers, for instance $E^1$, $E^9$, and central with the forming-die, for instance $W^1$, and in which position, the work-piece F is pierced or centered, for instance as described in the following: The supporting head $M^{50}$ with its piercer or center $E^9$ and forming-die $W^1$ and the die-supporting roll $G^{14}$ and the edging and die-supporting roll $J^{61}$ are moved and adjusted into the positions shown, in which positions the flange or shoulder $e^{37}$ of said piercer or center $E^9$ is against the shoulder formed in said forming-die $W^1$ and holds the same against or in contact with the supporting portions of said rolls $G^{14}$ and $J^{61}$ and, the supporting or edging portion $g^{137}$ of said roll $G^{14}$ is in contact with one of the sides of the peripheral face finishing roll H, which roll H is a certain radial distance from the axis of the piercers or centers $E^1$, $E^9$, as for instance shown and, the edging roll part $j^{29}$ of the edging and die-supporting roll $J^{61}$ is in contact with one of the sides of the face roll K, which roll is in contact with the peripheral edge of said forming-die $W^1$ at the commencement of the operation as shown. In these illustrations, the roll $G^{14}$, the roll $J^{61}$, and the forming-die $W^1$ are retained in said positions during the operating process, and during the actual piercing or penetrating or centering process illustrated in Figs. 26 and 27, the piercer or center $E^1$ is forced into one side of the work-piece F, while said edging and web rolling roll, for instance $J^{69}$, formed as shown, rotates or assists in rotating the work-piece together with its forming-die $W^1$ and is forced or rolled against and into said side of the work-piece, thus causing the work-piece at its other side to be forced over the other piercer or center $E^9$ and causing metal of said work-piece to be forced into the hub-forming cavity of the forming-die $W^1$, around said piercer or center $E^9$ and against and over the forming-die $W^1$ as shown in Fig. 27, thus forming the side of the work-piece next to said forming-die $W^1$. During said rolling or forming process, the end of the roll part $j^{43}$ of said roll $J^{69}$ is either in contact with the peripheral face of said piercer or center $E^1$, as for instance shown in Figs. 26 and 27, or comes against said peripheral face of said piercer or center $E^1$ during said rolling or forming process and thus rolls or forms the other side of the work-piece while the work-piece is forced against said forming-die and with the aid of the face roll K it is rolled or formed to the form shown in Fig. 27. During this process, the roll portion $j^{43}$ of said roll $J^{69}$ operates against the end face of the hub as shown and the edging roll portion $j^{29}$ of said roll $J^{69}$ operates against the portion of the side of the work-piece between the web rolling part $j^{28}$ of said roll $J^{69}$ and the periphery of the work-piece, as shown in Fig. 27. During this operation, the face roll K has been moved away from the forming-die $W^1$, while metal in the peripheral portion of the work-piece has been forced over the inclined peripheral face or edge $w^3$ of said forming-die $W^1$ and against the edging roll portion $j^{29}$ of said edging and die-supporting roll $J^{61}$, as shown in Fig. 27. Thus the work-piece is centrally pierced or penetrated or centered and rolled and formed to the form shown at $F^1$ in Fig. 27, and as hereinafter more fully described with reference to Figs. 26, 27 and 28. Said piercing or penetrating or centering may be done either before or during said hub-rolling or forming process, and said positioning, or raising, lowering and retaining device may be moved away from the work-piece either after or during the piercing or penetrating process. The side of the work-piece next to the forming-die may also be first pierced or penetrated before operation with the rolls, as illustrated for instance in Fig. 39, that is, when the work-piece is in proper position as shown by the portion of the work-piece F in Fig. 39, the piercer or center for instance $E^9$ is forced into the work-piece for instance the distance $x^7$ as shown by the dotted lines, while the forming-die $W^1$, and the rolls $G^{14}$, $J^{61}$, H and K are retained in the position shown in Fig. 39.

In case that all the rolls of the apparatus or mill, that is the rolls of the herein named roughing mill or roughing side of the apparatus or mill and the rolls of the herein named finishing mill or finishing side of the apparatus or mill, are used for rolling or forming a wheel or other article, as shown for instance in Fig. 15, the rolling or forming operation against the blank or work-piece having one side against the forming-die may begin with the herein named edging and web rolling roll formed as shown, the edging and die-supporting roll formed as shown, the tread or face rolling roll formed as shown, the forming-die formed as shown, the piercer or center of supporting head M formed as shown, and the piercer or center of supporting head $M^{50}$ formed as shown, and with these parts the blank or other work-piece may be rolled or formed to the form or shape $F^1$, such as shown for instance in the Fig. 30 &c., and with said rolls and forming-die in the position shown for instance in said Fig. 30, the herein named web finishing roll, for instance $G^1$, and the tread or face finishing roll H, may begin the finishing operation against the work-piece $F^1$, and roll or form the same to the form shown for instance in Fig. 31.

With the said work-piece supported on the piercers or work-supporting centers and on the forming-die, and with the hub or center portion of the work-piece automatically and firmly clamped laterally between said piercers or work-supporting centers, as for instance shown in Fig. 15, the piston-rod $N^3$ of the cylinder N with said work-supporting head M and its axle E and piercer or work-supporting center, for instance $E^6$, now under constant and continuous pressure from said cylinder N, causes said one piercer or work-supporting center $E^6$ to press automatically and continuously toward and against the hub or center portion of this one side of said work-piece, while the piston-rod $O^3$ of the cylinder O with the other work-supporting head $M^{50}$ and its axle E and piercer or work-supporting center, for instance $E^9$, now under constant and continuous pressure from cylinder O, causes said other piercer or work-supporting center $E^9$ to press automatically and continuously toward and against the hub or center portion of said work-piece at the other side of said work-piece, as shown in Fig. 15. It is to be noted that the center or hub portion of the work-piece or car wheel, during my rolling or forming process, is firmly held in said automatically clamped condition between said piercers or centers, for instance $E^6$, $E^9$, while said piercers or centers and said forming-die are rotating with the work-piece or wheel. Should it be required to axially move the work-piece while so supported the pressure in one of said cylinders N or O, for example the pressure in said cylinder N is gradually somewhat relieved or reduced, retaining therein however, the constant pressure required in said cylinder N to retain the aforesaid automatically axially clamped condition of the hub or center portion of the work-piece between said piercers or centers, for instance $E^6$, $E^9$; thereby causing the pressure or force from the cylinder O to overcome the resistance of the piston-rod $N^3$ and gradually move the pistons and the rods $O^2$, $N^2$ and $O^3$, $N^3$, with their said heads M, $M^{50}$, with the work-piece or wheel axially into the desired position.

Instead of so reducing the constant pressure in cylinder N, said axial movement of the work-piece or wheel can also be done in the same manner, by increasing the constant pressure in cylinder O so as to overcome the constant pressure in cylinder N. After the wheel or other article is completely finished, the rolls may be pulled back, as for instance shown in Fig. 29. The positioning member of said positioning, or raising, lowering and retaining device is then again raised from its said lower position away from the work-piece to the position adjacent the work-piece; the said piston-rod $O^3$, or said piston-rods $O^3$, $N^3$ with their said connected parts are then pulled back, thereby placing the finished wheel or other finished article onto the positioning member of the said raising, lowering and retaining device, and therewith it is then again raised to a position from where said finished wheel is taken away by any suitable means and another properly heated ingot, bloom, blank or other work-piece put in place of it and lowered and centered, or pierced or penetrated &c., as above described.

Referring to Fig. 20, the axle E of the supporting head $M^{50}$ is provided with a piercer or center, for instance $E^{14}$ having a cylindrical portion $e^{37}$ slidably fitted in the central bore of the forming-die $W^6$, a tapered portion $e^{39}$ on which the work-piece F with its central hole is adapted to be supported, and a cylindrical portion $e^{40}$ slidably fitted into the central hole or bore $e^{41}$ of the center $E^{13}$ of the other supporting head M, as shown. When the work-piece F in the Fig. 20 is put into the apparatus or mill, the supporting head $M^{50}$ together with its axle E and piercer or center $E^{14}$ will be moved longitudinally from its position shown in solid lines to the position thereof shown in dotted lines, that is, the distance for instance indicated by $x^8$. When the work-piece is brought into the position shown in Fig. 20, said piercer or center $E^{14}$ will again be moved forward the distance indicated by $x^8$ in Fig. 20, into the position shown in Fig. 20.

Referring to Fig. 23, the axle E of the supporting head M provided with a piercer or center for instance $E^{15}$ having adjacent its axle end a cylindrical or slightly tapered portion $e^{42}$ and next thereto a tapered portion $e^{39}$ on which the work-piece F with its central hole is adapted to be supported and, at the small diameter of said tapered portion $e^{39}$ said piercer or center is formed with a shoulder as shown. From said shoulder said piercer or center is formed with a cylindrical portion $e^{43}$ fitted into the central hole or bore $e^{44}$ of the center $E^{16}$ of the other supporting head $M^{50}$, and with its said shoulder said piercer or center $E^{15}$ is acting against or in contact with said other center $E^{16}$, as shown. When the work-piece F in Fig. 23 is put into the apparatus or mill, the supporting head M together with its axle E and piercer or center $E^{15}$ will be moved longitudinally from its position shown in solid lines to the position thereof shown in the dotted lines, that is, the distance for instance indicated by $x^9$. When the work-piece is then brought into the position shown in Fig. 23, said piercer or center $E^{15}$ will be moved forward again the distance indicated by $x^9$ in Fig. 23, into the position shown in Fig. 23. When the work-piece or wheel is ready to be removed, said supporting head M with its axle E and piercer or center $E^{15}$ will be pulled back into the position shown in dotted lines in said Fig. 23 and a new work-piece put into the apparatus or mill as and in the manner above described.

In Figs. 6 to 9 inclusive, the pressure cylinders O and N with their rods, shown in the Fig. 15 are omitted and only parts of the work-supporting heads M, $M^{50}$ are shown, with their axles E, E and piercers or work-supporting centers, for instance $E^6$, $E^9$ and the forming-die for instance $W^1$, with different arrangements and forms of rolls. In these figures, the operations for putting in the ingot, bloom, blank or other work-piece and removing the finished article and for centering or for piercing or penetrating and centering the ingot, bloom, blank or other work-piece are also similar to those described for instance in said Fig. 15. When it is desired to roll or form an article with only such rolls as are shown in the said Figs. 6 to 9 inclusive, then in such case, the rolls not shown in these Figs. 6 to 9 inclusive, will not be used, and therefore may be omitted; or an apparatus or mill may be made without them. For instance; a wheel or other article is to be rolled or formed with only the rolls shown in Fig. 6, in which is shown, for instance, a car wheel ingot, bloom, blank or work-piece centered or pierced or penetrated and centered as before described and rolled or formed on piercers or work-supporting centers, for instance $E^6$, $E^9$ and on a forming-die, for instance $W^1$, with the herein named edging and web rolling roll, for instance $J^1$, edging and die-supporting roll for instance $J^{61}$ and tread or face rolling roll K, to the shape $F^2$ shown in the Fig. 6. A wheel or other article may be rolled or formed, for instance, with only the rolls shown in Fig. 7, in which figure is shown for instance, a car wheel ingot, bloom, blank or work-piece centered or pierced or penetrated and centered as before described and rolled or formed on piercers or work-supporting centers for instance $E^6$, $E^9$, and on a forming-die, for instance $W^1$, with the herein named edging and web rolling roll, for instance $J^1$, edging and die-supporting roll, for instance $J^{61}$, tread or face rolling roll K, and the herein named tread or face finishing roll H, to the form or shape $F^2$ shown in the Fig. 7.

In Fig. 8, I have shown an ingot, bloom, blank or work-piece rolled or formed with only the use of the rolls shown, and in this case is shown, for instance, an ingot, bloom, blank or other work-piece having been centered or pierced or penetrated and centered as before described and rolled or formed on piercers or work-supporting centers, for instance $E^6$, $E^9$ and on the forming-die, for instance $W^1$, with only the herein named web finishing roll, for instance $G^1$, die-supporting roll, for instance $G^{14}$, and tread or face roll H, to the form or shape $F^2$ shown in said Fig. 8. A car wheel blank, ingot, bloom or work-piece is shown in Fig. 9 rolled or formed only at its rim, tread and flange and at part of the web next to the rim with only the use of the rolls shown in said Fig. 9, in which is shown for instance, a car wheel blank, ingot, bloom, or work-piece having been centered or pierced or penetrated and centered as before described and rolled or formed on piercers or work-supporting centers, for instance $E^6$, $E^9$ and on the forming-die, for instance $W^1$, with only the use of the herein named web finishing roll, for instance $G^1$, die-supporting roll, for instance $G^{14}$, tread or face finishing roll H, edging and web rolling roll, for instance $J^5$, having the shape as shown and edging and die-supporting roll for instance $J^{61}$, to the form or shape $F^2$ shown in said Fig. 9. In this case, such roll as $J^5$ may either be driven by its shaft J or it may be turning loosely on a bearing attached to the end of said shaft J, and the edging and die-supporting roll, for instance $J^{61}$, may either be wholly driven by its shaft or be partly driven by its shaft J and the other part or parts be in sections which are permitted to turn loose on a bearing or bearings provided therefor and which bearing or bearings are attached to the end of said shaft J.

In Fig. 10 is shown, an ingot, bloom, blank or work-piece rolled or formed only at its rim, tread and flange and at part of the web next to the rim with only the use of the rolls shown in Fig. 10; that is to say, Fig. 10 shows, for instance, a car wheel blank, ingot, bloom or work-piece having been centered or pierced or penetrated as before described and rolled or formed on piercers or centers, for instance $E^6$, $E^9$ and on the forming-die, for instance $W^{13}$ with only the use of the herein named web finishing roll, for instance, $G^{55}$, die-supporting roll, for instance, $G^{61}$, tread or face roll H having a peripheral rolling face $H^4$ and being formed, as shown, and tread or face roll K having a peripheral rolling face $K^{38}$ and being formed as shown, to the form or shape $F^2$ shown in Fig. 10. In Fig. 11 is shown a car wheel rolled or formed to the form shown in a similar manner and with similar operating parts as shown in Fig. 9.

From the foregoing it will now be observed that, the piercers or work-supporting centers, together with the forming-die, revolubly or rotatably support the work-piece and that with the constant pressures in said cylinders N and O being operatively connected with said piercers or work-supporting centers by the means before described, and also shown and described in my said original application, said piercers or work supporting centers are pressed or forced automatically by constant pressures in said cylinders toward and against each other or toward and against the opposite ends of the hub or against the opposite sides of the center portion of the work-piece, as and in the manner herein shown and described.

In this manner the work-piece or wheel, while so supported by said piercers or work-supporting centers at its hub or center portion, is also automatically put into clamped condition laterally or axially at said hub portion between said piercers or work-supporting centers. Said automatic and constant pressure also serves other purposes, as will appear from the matter hereinafter described. For instance, by constant pressures in said cylinders, the hub or center portion of the work-piece or wheel is also automatically and firmly clamped laterally or axially between said piercers or work-supporting centers, which is absolutely necessary in order to prevent said hub or center portion from being forced out of its true axial or central and desired lateral positions with respect to the remainder of the work-piece or wheel, during the rolling or forming, or operating process and this constant clamping force or constant clamping pressure automatically and continually remains during said operating process and automatically retains the hub or center portion of said work-piece in its true axial or central position during said operating process, or during any desired axial or lateral movement of the work-piece, or of the work-piece together with the forming-die. While the work-piece or wheel is so supported and is also so automatically and firmly clamped laterally or axially at its hub or center portion, said work-piece, or said work-piece together with the forming-die may be so automatically moved, or adjusted, axially together with its said piercers or work-supporting centers and to cause said automatic axial movement during the operation while the work-piece or wheel at its hub or center portion is in automatically clamped condition, it will only be required that either the constant pressure in only one of said cylinders N or O is gradually somewhat reduced so as to cause said automatic axial movement as desired; or, that the constant pressure in only one of said cylinders N or O is gradually somewhat increased so as to overcome the pressure in the other cylinder and thereby cause said automatic axial movement as desired. With reference to Figs. 12, 13 and 14 shown on an enlarged scale: Fig. 12 shows the work-piece rolled or formed as before described with reference, for instance to Fig. 15 and as hereinafter more fully shown and described. In this Fig. 12, the work-piece or wheel $F^2$ and forming-die $W^1$ are shown in diametral sections, and the opposite end parts of the alined supporting heads $M^{50}$, M are shown in side elevation, the end portions of the rolls $G^{14}$ and $G^1$ being also shown. Said parts $F^2$, $W^1$, $G^{14}$, $M^{50}$, $G^1$ and M in this Fig. 12 are shown in the positions they occupy at the end of the rolling or forming operation, the wheel $F^2$ being shown finished and ready to be removed. In said Fig. 12 are also shown parts of the alined guides $M^{31}$, $M^{31}$ for said supporting heads $M^{50}$, M and the portions of the bed-plate $B^2$, $B^2$ to which said guides $M^{31}$, $M^{31}$ are fixedly secured. The cooling medium enters through the elbows $M^{10}$, $M^{10}$ and passes into the cooling medium reservoirs $M^{11}$, $M^{11}$ of said heads $M^{50}$, M. $M^{17}$, $M^{17}$ designate the openings or outlets through which the cooling medium flows and from which it is directed over and in contact with the outer sides of said heads as and for the purpose more fully shown and described in my said original application. In Fig. 12 are also shown die-supporting rollers $X^{23}$, $X^{23}$ formed and located as shown.

Fig. 13 shows the end part of the supporting head $M^{50}$ with its axle E, piercer or center for instance $E^{12}$ formed as shown, forming-die for instance $W^1$ shown in diametral section, and die-supporting rollers $X^1$, $X^1$ formed and located as shown.

In Fig. 14 is shown an enlarged horizontal section of the end part of the water cooling or other cooling medium arranged for the work-supporting axle of one of my said work-supporting heads $M^{50}$, M; that is, of the supporting head M. The cooling medium enters the pipe $e^{11}$ at one end thereof (not shown herein, but fully shown and described in my said original application), passes through said pipe in the direction of arrow $e^{14}$ and out of said pipe into the annular space $e^8$ formed by said pipe $e^{11}$, thence into the inner bore of the axle E passing in the direction of the arrows $e^{15}$ and out of said first-mentioned end, not shown herein; thereby cooling the axle E during the operating process and also said piercers or centers, for instance $E^6$, or lowering the temperature thereof. Said piercers or centers, as for instance $E^6$, &c, are exchangeable for other formed piercers or centers or forming-dies, as hereinafter shown and described, and they are preferably fastened to the axle E in such a way that they may readily be exchanged for others, as for instance by the means of pins $e^1$, $e^1$, shown in Fig. 14, or by any other desirable means. Each of said axles E, E may have its end $E^7$ made to any length, such as may be required or desired and as will appear from the matter hereinafter described.

In the cooling arrangement provided for internally cooling the axles E, E for instance, of the supporting head $M^{50}$ in Figs. 16, 17 and 19, the cooling medium enters at $e^{14}$ and leaves at $e^{18}$, as more fully shown and described in my application for patent, filed October 9, 1917, Serial No. 195,637, or it may be similar to the cooling arrangement shown and described in my said original application. In the cooling arrangement for externally cooling the supporting heads M, $M^{50}$ in Figs. 12, 16, 17 and 19, the cooling medium enters through $M^{10}$ into a cooling medium reservoir $M^{11}$ and from there through the openings $M^{17}$ over and in contact with the outer sides of the supporting heads M, $M^{50}$, as more fully shown and described in my above said application, or in my said original application.

From the above it will be seen that, with the herein named edging and web rolling roll and the forming-die formed as herein shown and with the inner rolling or operating portion of the web reducing, or web rolling roll part $j^{28}$ of said edging and web rolling roll, for instance $J^1$, $J^{55}$ or $J^{56}$, &c., formed sufficiently conical in one direction, and with the peripheral forming portion or peripheral forming face of the forming-die adapted to form the inner peripheral face of the marginal or rim portion of the work-piece or wheel at its one side formed sufficiently conical in the other direction, as and for the purpose hereinafter fully described with reference for instance to the Figs. 61, 62, 64 and 65, an efficient rolling or forming action is obtained, which during the formation of the web part, causes the metal to flow in the proper directions: that is to say, toward the rim part, within the latter, and peripheral thereto. The lateral flow of metal is limited by the roll parts $j^{29}$, $j^{29}$ of the edging and web rolling roll and the edging and die-supporting roll, and when this lateral flow of the metal is thus arrested, the continued flow thereof will be peripheral to the rim. It will be observed that the radial flow of the metal is limited by the rolling surface of the tread or face rolling roll K, and when the radial flow is thus arrested, the continued flow of the metal will be peripheral to the rim, as for instance partly illustrated in Figs. 21, 24, 27, 61, 64 and 65. From this and from the matter described below with reference to Figs. 21, 24, 27, 61, 64 and 65 and with reference to other figures herein shown, it is to be observed that the metal, when being rolled or formed from the blank or other work-piece into a wheel or other article, is, especially in the tread and flange or rim portion, not expanded radially, and therefore does not produce incipient cracks in the tread and flange portions of the rim, but is truly rolled or formed and increases in density with increased working, thus giving to the metal both its due maximum strength and maximum resistance to wear. In other words, this method of rolling or forming produces the same effect in the metal of the rim portion as if the web portion of the wheel were not in existence and the rim portion rolled or formed its total width on its inner peripheral surface or surfaces as is done on its outer peripheral surface consisting of the tread and flange. In Fig. 27, for instance, is shown such edging and web rolling roll, for instance $J^{69}$, rolling or forming the hub part of the work-piece and the web and rim parts of the work-piece $F^1$ central with the hub part, as shown, and with the inner rolling or operating portion of the web reducing roll part $j^{28}$ of the edging and web rolling roll $J^{69}$ formed sufficiently conical and with the peripheral forming face $w^3$ of the forming-die $W^1$ also formed sufficiently conical, as for instance shown and as and for the purpose hereinafter more fully described, the centers of the pressures caused by the so conically formed inner rolling or operating portion of said web reducing roll part $j^{28}$ of said roll $J^{69}$ and by the so conically formed peripheral face $w^3$ of said forming-die $W^1$, are illustrated in the Figs. 61, 64 and 65 as acting at the centers of the lengths of said conically formed inner rolling or operating portions and at right angles thereto against the work-piece, as is indicated by the arrows $p$ and $p^1$ of said pressures, and the resultant pressure $r$ from said pressures $p$ and $p^1$ is therein indicated in the direction shown by the arrow for said resultant pressure $r$. The actual flow of the metal will, therefore, be in a lateral, radial and peripheral direction, that is, toward the roll $J^{69}$ in Fig. 27, toward the portion $w^3$ of the forming-die $W^1$ and toward the edging roll portion $j^{29}$ of the roll $J^{61}$ (see Fig. 27) and peripheral to the rim and in a radial and peripheral direction; that is, toward the periphery of the work-piece in the direction of the arrow $r$ (see Fig. 61, 64 or 65) and against the face rolling roll K, and from there the metal will flow peripheral to the rim. Said lateral flow of metal is limited by said edging roll parts $j^{29}$, $j^{29}$ of said rolls $J^{69}$ and $J^{61}$ (see Fig. 27) from where the metal will flow peripheral to the rim, and the said radial flow of metal is limited by the rolling surface of the said tread or face rolling roll K, from where the metal will flow peripheral to the rim.

Figs. 58 to 62 inclusive are sections of the rim portion of car wheels illustrating diagrammatically the flow of metal caused by various forms of rolls or other operating parts, and therein the pressures caused by the rolls or by the roll and forming-die against the surfaces of the metal in contact with the rolls or in contact with the roll and forming-die are assumed to be uniformly distributed from said surfaces, as indicated by the arrows pointing against said surfaces and the direction of the flow of metal from said arrows toward the inner region of the rim portion is indicated by the pressure lines of said arrows. The flow of metal illustrated by pressure lines parallel to each other indicate a uniform compression of metal. The flow of metal illustrated by diverging pressure lines indicate that said uniformly distributed pressures at said surfaces in contact with the rolls or other operating parts are becoming less toward the inner region and peripheral face of the rim portion, and therefore the metal in those portions of the rim having said diverging lines is not condensed to the same degree as is the metal in the portions having parallel pressure lines and which degree of condensing becomes less and less as the distances between said diverging lines become greater; and if the rim is not rolled at its outer peripheral face simultaneously with the rolling or forming of its inner peripheral faces, the metal will be extended instead of being compressed and thereby produce incipient cracks in the tread or outer peripheral face of the rim. The finished peripheral face of the car wheel is indicated by $f^{12}$ and the outline of each of said sections is shown in heavy lines. In the Figs. 58, 59 and 60 the center line of the rim and adjacent web portion is indicated by $y$, and said inner face or faces of the rim portion in contact with the rolls or other operating parts are indicated by $f^{16}$. In Fig. 58 the portions of the rim in which the metal is not properly condensed is indicated by the distances $d^1$, $d^2$ occupied by said diverging lines. In Fig. 59 the portions of the rim in which the metal is not properly condensed is indicated by the distances $d^3$, $d^4$ occupied by said diverging lines. The rolling or forming of the rim portion as and in the manner described with reference to Figs. 58 and 59 does not properly work the metal in the rim and therefore forms a rim which during the rolling process, has already been weakened where its strength is needed and of which the tread will wear out quickly and shorten the life of such wheel, all of which may be observed on present wheels in actual use. In Fig. 60 is illustrated a section of a tire having for instance no web, such as used for some tired car wheels. From this figure it can easily be observed that the metal in such objects having a straight inner face without a web as shown, can be rolled to practically uniform density, as indicated by the parallel pressure lines for the total pressure P, and the metal in the rim portion of car wheels and similar objects having each a web formed integral with the rim, can be rolled or formed in accordance with my invention to practically uniform and maximum density, as can be done with rims having no web portion.

Therefore and in order to produce said effects or results in the metal of the rim portion of the work-piece or car wheel as hereinbefore referred to with reference to Figs. 61, 62, 64 and 65, and to entirely avoid the improper working of the metal described with reference to Figs. 58 and 59, I form the inner rolling or operating portion of the web reducing part $j^{28}$ of said edging and web rolling roll for instance $J^1$ and the portion $w^3$ of the forming-die, for instance $W^1$ (see Fig. 61, 64 or 65), sufficiently conical, so that, during the operating process against the work-piece, the face of said conically formed portion of $j^{28}$ of said roll $J^1$ is sufficiently inclined from its lateral apex toward the inner end of the roll $J^1$ and the portion $w^3$ of said forming-die $W^1$ is sufficiently inclined toward the inner end of the roll $J^{61}$; that is to say, that when for instance, the web reducing part $j^{28}$ of said roll $J^1$ and the forming side of the forming-die $W^1$ are against the finished web, then said face of said conically formed portion of each of said parts $j^{28}$ and $w^3$ is sufficiently inclined from the web outwardly in the direction away from the axis of the work-piece, as for instance in Figs. 21, 27, 61, 64 and 65. Said inclination of each of said parts $j^{28}$ and $w^3$ I therefore form sufficiently large enough so as to roll or form the inner peripheral faces of the rim portion sufficiently inclined outwardly toward the peripheral face of the work-piece so that during the rolling or forming of the rim portion, for instance to the rudimentary form shown for instance in the Figs. 21, 27 and 61, the metal is caused to flow in the proper directions to assure compression of the metal in said rim portion to uniform or to practically uniform density, as is distinctly shown and diagrammatically illustrated in Fig. 61, 64 or 65. In Figs. 61 and 62 is diagramatically illustrated and distinctly shown the result of the rolling or forming of the rim of a car wheel in accordance with my invention hereinbefore and hereinafter described with reference to other figures.

Fig. 61 distinctly shows what is meant by the herein used words "sufficiently conical" or "sufficiently inclined" and therein is shown said rim portion rolled or formed for instance to the rudimentary form shown for instance in the Figs. 21, 24, 27 and other figures; and in Fig. 61 is also shown in dotted lines said rim portion rolled to finished form, and the center pressures $p$, $p^1$ are the same as before described with reference to Fig. 61, 64 or 65; the pressure lines for each of said pressures $p$, $p^1$ being parallel to each other in the directions of the arrows and at right angles to said inclined faces of said parts $j^{28}$ and $w^3$. The said pressures $p$, $p^1$ from said sufficiently inclined face of said roll part $j^{28}$ and from said sufficiently inclined face $w^3$ of the forming-die $W^1$ thus applied during the rolling or forming of said inner rim portion have rolled or formed said inner faces $f^{18}$, $f^{18}$ of the so rudimentarily formed rim portion sufficiently inclined, as distinctly shown by the pressure lines for each of said pressures $p$, $p^1$, which caused the metal during said rolling or forming of the rim portion to flow in the proper directions to be compressed to uniform density, as distinctly illustrated by said parallel pressure lines for each of said pressures $p$, $p^1$, while at the same time the pressures $p^5$, $p^6$ against the lateral sides of the rim from the edging roll parts $j^{29}$, $j^{29}$ of said rolls $J^1$ and $J^{61}$ have caused the metal to flow into the inner region of the rim in the direction of the arrow of the pressure lines for said pressures $p^5$, $p^6$ and have rolled the rim to desired lateral thickness and while at the same time the pressure $p^7$ against the peripheral face of the rim portion from the face beaking or face roughing roll K having its rolling face $K^7$ formed as shown, has caused the metal to flow also into the inner region of the rim in the directions of the arrows of the pressure lines for said pressure $p^7$ and has rolled said peripheral face to the beaked or rudimentary form $K^7$ as shown, thereby having rolled or formed said metal in the rim and adjacent web portion simultaneously on all its surfaces by rolls, with the exception of the one inner peripheral face of the rim formed with the inclined face $w^3$ of the forming-die $W^1$; all such rolls being situated in a plane passing laterally through said rim and adjacent web portion and having compressed said metal simultaneously on all its surfaces to uniform and maximum density, or practically so, while at the same time the rim portion has been rolled to said rudimentary form, shown for instance in the Figs. 21, 24, 27 and 61 and other figures. The so rudimentarily formed rim is then rolled or formed with rolls situated at another point of the rim portion to finished form whereby its metal is still further condensed, as diagrammatically illustrated in the Fig. 62. In Fig. 62, said so rudimentarily formed rim portion, rolled or formed in accordance with my invention, is shown in dotted lines, and the finished rim and adjacent web portion shown rolled or formed in accordance with my invention during the finishing rolling process to finished form, is shown in heavy lines, and during the finishing rolling process with the rolls $G^1$ and H operating against the rim portion at another point thereof, with the aid of the forming-die $W^1$, the web finishing roll $G^1$ with its web finishing roll part $g^{136}$ rolls the inclined face $f^{18}$ at one side of the workpiece to the finished form $f^{20}$, while the inclined face $f^{18}$ of the other side of the workpiece maintains its form $f^{18}$. Simultaneously therewith, the peripheral face finishing roll H is rolling said beaked or rudimentarily formed peripheral face $K^7$ to the finished form $f^{12}$ and the edging roll parts $j^{29}$, $j^{29}$ of said rolls $J^1$ and $J^{61}$ are still operating in contact with the sides $f^{22}$, $f^{23}$ of the rim at another point thereof and are limiting the lateral flow of metal and maintaining the lateral thickness in the rim to which the same has been rolled during the rolling described with reference to Fig. 61; the combined action of said forming-die $W^1$ and said rolls $J^1$, $J^{61}$, $G^1$, and the die-supporting roll, for instance $G^{14}$, and the face finishing roll H during said finishing rolling process, roll or form the rim and adjacent web portion to the finished form shown in Fig. 62. Said Figs. 61 and 62 distinctly show and diagrammatically illustrate that the metal in the whole rim portion, rolled or formed in accordance with my invention, is rolled or worked to uniform and maximum density, or practically so, especially in the tread, flange and root of the flange where the strength and resistance to wear is mostly needed. It is, of course, to be understood that in order to produce said results, the rim portion must be rolled or formed first, for instance, to rudimentary form, as and in the manner described with reference to Fig. 61, before the same is rolled to the finished form shown in the Fig. 62, and that the rolling of the said inclined face $f^{18}$ and the rolling of said beaked peripheral face $K^7$ to their finished forms during the finishing rolling process will not disturb the density of the metal to which it has been compressed during the process described with reference in Fig. 61, but will still more compress the metal, especially so in the tread, flange and root of the flange where the strength and resistance to wear is mostly needed, as can easily be seen from said Fig. 61.

From the foregoing it will now be observed that, in rolling or forming for instance car wheels with the edging and web rolling roll and the edging and die-supporting roll formed as herein shown and as and for the purpose described with reference to Figs. 61 and 62, and with the lateral thickness or width of said tread or face rolling roll K being the same as the lateral thickness or width which the rim portion of the car wheel is to have when finished, as is for instance shown in the Figs. 6, 7, 21, 24, 27, 30, 33, 36, 37 and 43, and diagrammatically illustrated in Figs. 61, 64 and 65, thereby, and with said roll K formed as shown and as and for the purpose herein described and diagrammatically illustrated in Figs. 61 and 62, and with the said edging and web rolling roll and said edging and die-supporting roll formed as for instance herein shown and as and for the purpose above described with reference to the Figs. 61 and 62, and with all said edging and web rolling roll and said edging and die-supporting roll and said face roll K and the operating portion $w^3$ of the forming-die situated in a plane passing laterally through the work-piece at one side of its axis, the metal in the peripheral face and the whole rim portion of the work-piece or car wheel is worked continually, during the rolling or forming of the rim to rudimentary form, upon all its surfaces simultaneously with said operating portion $w^3$ of the forming-die and said three rolls so formed and so situated as before set forth and as shown for instance in said Figs. 24, 27, 61 and other figures, and in then rolling the so rudimentarily formed rim to finished form, as and for the purpose for instance described with reference to Figs. 61 and 62 and, which to my knowledge together with the result obtained thereby, as for instance above described with reference to the Figs. 61 and 62 was never done or accomplished before in rolling or forming car wheels, whereby the metal in said peripheral face and in the whole rim portion is uniformly condensed to its maximum, or practically so, thereby giving the metal in said peripheral face and in the whole rim portion its due maximum and uniform strength and its due maximum and uniform resistance to wear; and, as any surplus of metal in the work-piece can be worked during the rolling or forming process, for instance, into the inner rim and adjacent web portions, the said peripheral face and the whole rim portion of the car wheel can also be rolled or formed, by my process, smooth on all its surfaces to the desired form without leaving a raised circular portion or fin, which would have to be removed afterward by turning or other costly means.

Figs. 63, 64 and 65 are similar diagrammatic illustrations as Figs. 61 and 62. Figs. 63 and 64 relate, for instance to the rim of a car wheel rolled or formed in accordance with my invention with only the use of a forming-die and the four rolls as described with reference for instance to Fig. 7; that is, with reference to Figs. 63 and 64 the rim is rolled or formed with the forming-die, for instance $W^1$, the herein named edging and web rolling roll, for instance $J^1$, the herein named edging and die supporting roll, for instance $J^{61}$, the face rolling roll K having its rolling face $K^1$ formed as shown, and the face finishing roll H. With such an arrangement, the rim portion is rolled or formed direct to finished form, with the exception that the outer corners of the tread and flange are rounded to proper form or shape with the finishing roll H situated at another point of the rim. Fig. 65 relates, for instance, to the rim portion of a gear wheel-blank, or of a disk-wheel or center such as used for some tired car wheels having a rim portion for instance similar to the one shown at $F^2$ in Fig. 43, and rolled or formed in accordance with my invention, with only the use of the forming-die and the three rolls as, for instance, described with reference to Figs. 6 and 43; that is, with reference to Fig. 65, the rim portion is rolled or formed with the forming-die, for instance $W^2$, the herein named edging and web rolling roll, for instance $J^1$, the herein named edging and die-supporting roll, for instance $J^{61}$, and the face rolling roll K having its rolling face $K^3$ formed as shown. With the arrangement shown in Fig. 65, the rim portion is rolled or formed direct to finished form, as shown. The pressure lines in said Figs. 64 and 65 and the result derived are similar to the ones described with reference to Fig. 61.

A car wheel or other circular article may also be rolled or formed as for instance described in the following with reference to Figs. 20 to 22 inclusive, in which I have, for instance, illustrated in brief, a rolling or forming process or steps according to my invention, such as I prefer to employ for completely rolling or forming the car wheel shown at $F^2$ in Fig. 22, from a blank or work-piece such as shown at F in Fig. 20 having, for instance, a conical central hole, as shown. In these figures the forming-die $W^6$ is formed at its one side with a long central hub portion, as shown. The axle E of the supporting head $M^{50}$ is provided with the piercer or center $E^{14}$. This piercer or center $E^{14}$ is formed with a cylindrical portion $e^{37}$ which is slidably fitted into the bore of the hub portion of said forming-die and centrally supports said forming-die. Said piercer or center $E^{14}$ is also formed with a tapered portion $e^{39}$ on which the work-piece is adapted to be supported and, with a cylindrical end portion $e^{40}$ which is slidably fitted into a central bore $e^{41}$ formed in the center $E^{13}$ of the other supporting head M, as shown. The axle E of the supporting head M is provided with the center $E^{13}$ which has at its outer end next to the work-piece a central bore $e^{41}$ slidably over the end portion $e^{40}$ of said piercer or center $E^{14}$, as shown. The outer end face of this center $E^{13}$ adjacent to the work-piece is formed straight and the diameter of said end face of said center is the same or is less than the smallest diameter which the hub at the side of the work-piece adjacent said center is to have when finished. The peripheral face of said center $E^{13}$ is preferably formed conical so as to permit the end face of the roll $J^{1}$, as shown, to properly come in contact with said peripheral face during the operating process for rolling or forming the hub. The forming-die $W^{6}$, the die-supporting roll $G^{14}$, and the edging and die-supporting roll $J^{61}$, are moved and adjusted into the proper positions, as for instance shown in Fig. 20, and therein they are rotatably retained during the operating process. In such positions, the roll $G^{14}$ is supporting the forming-die with its die-supporting portion $g^{139}$ in both radial and lateral or axial directions and, with its edging or supporting portion $g^{137}$ it is against or in contact with the face finishing roll H as shown, and the roll $J^{61}$ is supporting the forming-die with its die-supporting portion $j^{40}$, in both radial and lateral or axial directions and with its edging roll portion $j^{29}$ it is against or in contact with the face rolling roll K, as shown. Said die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

In the operation illustrated, in Fig. 20, the face roll H is moved a certain radial distance away from the periphery of the forming-die $W^{6}$, as shown, and the face roll K is against or in contact with the peripheral edge of the forming-die $W^{6}$, as shown. The supporting head $M^{50}$ with its axle E and piercer or center $E^{14}$ are moved, for instance, the distance indicated by $x^{8}$ by the means before described, into the positions shown by the dotted lines, after which the work-piece F is brought into the position shown and said parts $M^{50}$, E and $E^{14}$ are again moved, by the means before described, into the positions shown in Fig. 20, and in which positions said parts $M^{50}$, E and $E^{14}$ are retained during the operating process. The center $E^{13}$ of the axle E and supporting head M is then moved, by the said power or pressure means operatively connected with said head M, over said end part $e^{40}$ of said piercer or center $E^{14}$ and against one side of the work-piece F, while simultaneously therewith the roll $J^{1}$ is forced or rolled into said side of the work-piece and thus forces the metal of the work-piece at its other side into the hub-forming cavity of said forming-die $W^{6}$ and around the portion $e^{39}$ of said piercer or center $E^{14}$ and against and over said forming-die, and together with said face roll K forming the work-piece to the form shown in Fig. 21. During said operation, while the work-piece is increasing in diameter, the face roll K is continually operating upon the peripheral face of the work-piece and moves with the enlargement of said diameter, and while the work-piece is increasing in diameter, metal of the work-piece is forced over said inclined peripheral face $w^{3}$ of said forming-die $W^{6}$ and against the edging roll portion $j^{29}$ of said roll $J^{61}$, as shown in Fig. 21. In this manner the work-piece is rolled or formed to the form shown at $F^{1}$ in Fig. 21. During the entire process, the edging roll portion $j^{29}$ of roll $J^{1}$ is acting against or in contact with the portion of the work-piece between the web rolling part $j^{28}$ of said roll $J^{1}$ and the periphery of the work-piece at one side thereof, as shown, and the edging roll portion $j^{29}$ of roll $J^{61}$ is acting against or in contact with the other side of the marginal or rim portion of the work-piece, as shown.

Fig. 21 shows said work-piece F rotatably supported and so rolled or formed to the form $F^{1}$ shown, with the outer end face of roll $J^{1}$ in contact with or against the peripheral face of said center $E^{13}$, and also with the roll $J^{1}$ against one side of the thus formed work-piece in the position shown at the end of the rolling or forming process above described and with the other side of the work-piece against said forming-die $W^{6}$ and against the edging roll portion $j^{29}$ of roll $J^{61}$, as shown. During said operation the web of the work-piece has been formed as shown and has been reduced to its desired thickness and the inner peripheral face of the rim of the work-piece at one side thereof has been rolled or formed to the rudimentary form shown, while metal of the work-piece has been forced over said sufficiently inclined peripheral face $w^{3}$ of the forming-die $W^{6}$ and thereby having formed the inner peripheral face of the work-piece at the other side thereof to the sufficiently inclined rudimentary form shown, and as and for the purpose hereinbefore described with reference for instance to Figs. 61 and 62, while simultaneously with said operation of said roll $J^{1}$ against the work-piece, said face roll K is against or is operating against the peripheral face of the work-piece and rolls the same to the said beaked or rudimentary form, as shown for instance in Figs. 21 and 61. While the roll parts $j^{29}$, $j^{29}$ of said rolls $J^1$, $J^{61}$ are still operating in contact with the lateral sides of the rim portion, said finishing rolls $G^1$ and H, shown at the other side of the axis of the work-piece, begin operating against the so rudimentarily formed rim portion and roll with said roll $G^1$ the so rudimentarily rolled inner peripheral face of the rim of the work-piece at one side thereof to the finished form and roll with said roll H the so beaked or rudimentarily formed peripheral face of the work-piece to the finished form shown at $F^2$, in Fig. 22. During this action, the edging roll parts $j^{29}$, $j^{29}$ of said rolls $J^1$, $J^{61}$ are maintaining the lateral thickness of the rim to which the same has been rolled during the process. It is to be noted that the center or hub portion of the work-piece or wheel, during said rolling or forming process, is firmly held in said automatically clamped condition between said centers $E^{13}$, $E^{14}$, or between said center $E^{13}$ and said forming-die $W^6$ while said centers and said forming-die $W^6$ are rotating with the work-piece or wheel. The work-piece or wheel shown at $F^2$ in Fig. 22 is finished and may be removed by moving the rolls $J^1$, $G^1$, K and H into the positions shown for instance in Fig. 20 and by moving said supporting head $M^{50}$ with its axle E and piercer or center $E^{14}$ into the position shown in dotted lines in Fig. 20, when the work-piece or finished product may be taken out and replaced by another work-piece &c.

It is to be noted that during the entire rolling or forming process said centers $E^{13}$, $E^{14}$ are kept in line by the cylindrical end portion $e^{40}$ of said piercer or center $E^{14}$ being held by said central hole $e^{41}$ of said center $E^{13}$, and while so connected with each other, said centers $E^{13}$, $E^{14}$ are also forced against the opposite sides of the work-piece, as shown in Figs. 21 and 22, thereby forming one substantial supporting device which is absolutely required in cases where such long piercer or center is to be used.

In rolling for instance the peripheral face of car wheels or similar articles first to a beaked or rudimentary shape simultaneously with the rolling or forming of the rim portion to the rudimentary form shown for instance in Figs. 21, 27 and 61 and as and for the purpose hereinbefore described with reference to the Figs. 61 and 62, and then to the finished form, the tread or face rolling roll K with its peripheral face formed for instance as shown in Fig. 21, 27 or 61, &c., or a similar face, serves to beak the peripheral face of the work-piece or car wheel before rolling the same to finished form; that is, said roll K serves to preliminarily roll the peripheral face of the work-piece or wheel to beaked or rudimentary shape, for instance, to forms such as shown in the Fig. 66, 67, 68 or 69, or to other rudimentary forms; such preliminary actions being herein termed "beaking." During such beaking and rolling or forming process the metal in the whole rim portion of the work-piece or wheel is worked continually and simultaneously upon all its surfaces, which gives the metal forming the tread, flange, and the whole rim portion of the work-piece or wheel the required uniform strength and density absolutely necessary for maximum and uniform resistance to wear. After this beaking action is completed, the finishing roll or rolls are brought into action and roll said beaked or rudimentarily formed peripheral face to the finished shape of the tread and flange of the wheel and roll the same to its desired finished diameter as, for instance, shown by the dotted lines $f^{12}$ for said finished peripheral face in Figs. 66, 67, 68 and 69, and diagrammatically illustrated in the Figs. 61 and 62, whereby the metal in the tread and flange and the whole rim portion is still further condensed. The car wheel thus rolled or formed in accordance with my invention has its metal uniformly condensed to its maximum where it is subjected to greatest strain and wear, and at the point heretofore considered the weakest.

A car wheel or other circular article may also be rolled or formed, as for instance described in the following with reference to the Figs. 23 to 25, in which I have, for instance, illustrated in brief, a rolling or forming process or steps according to my invention, such as I prefer to employ for completely rolling or forming car wheels, &c., including the rolling or forming of the end face of the hub at one side of the work-piece, directly with the edging and web rolling roll $J^{69}$, from a blank or work-piece shown at F in Fig. 23 having, for instance, a conical central hole, as shown. In these figures the forming-die $W^{14}$ is formed at one side with a central hub having a bore of two diameters forming a shoulder. The axle E of the supporting head $M^{50}$ is provided with the center $E^{16}$. This center $E^{16}$ is formed with a cylindrical portion $e^{38}$ and an enlarged cylindrical portion or flange $e^{37}$, and at its outer straight-faced end adjacent the work-piece it has a central bore $e^{44}$, as shown. This center $E^{16}$ is fitted into said bore in the hub of said forming-die $W^{14}$, thus supporting or partly supporting said forming-die. The axle E of the supporting head M is provided with the piercer or center $E^{15}$. This piercer or center $E^{15}$ has adjacent its axle-end a cylindrical or slightly tapered portion $e^{42}$, the peripheral face of this portion $e^{42}$ being preferably formed conical so as to permit the end face of the roll $J^{69}$ to properly come against or in contact with said peripheral face during the operating process, and next to said slightly tapered portion said piercer or center has a tapered portion $e^{39}$ on which the work-piece F with its central hole is adapted to be supported. At the small diameter of said tapered portion $e^{39}$ said piercer or center is formed with a shoulder as shown, and from said shoulder said piercer or center is formed with a cylindrical portion $e^{43}$ having its end rounded off or formed as shown and which cylindrical portion $e^{43}$ is fitted into the central bore $e^{44}$ of said center $E^{16}$. During the operating process, said piercer or center $E^{15}$ with its shoulder at the small diameter of its tapered portion $e^{39}$ is pressing against the adjacent straight faced end of said center $E^{16}$ and, said centers $E^{15}$ and $E^{16}$ are so retained with each other during the operating process, as shown. The forming-die $W^{14}$, the die-supporting roll $G^{14}$, and the edging and die-supporting roll $J^{61}$ have been moved and adjusted into the proper positions, as for instance shown in Fig. 23, and they are rotatably retained in said positions during the operating process. When thus positioned, the roll $G^{14}$ with its die-supporting portion $g^{139}$ is supporting the forming-die in both radial and lateral or axial directions and with its edging or supporting portion $g^{137}$ it is against or in contact with the face finishing roll H as shown, and the roll $J^{61}$ with its die-supporting portion $j^{40}$ is supporting the forming-die in both radial and lateral or axial directions and with its edging roll portion $j^{29}$ it is against or in contact with the face rolling roll K, as shown. Said die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

At the commencement of the process illustrated in Fig. 23, the face roll H is moved a certain radial distance away from the periphery of the forming-die $W^{14}$, as shown, and the face roll K is against or in contact with the peripheral edge of the forming-die $W^{14}$, as shown. The supporting head M with its axle E and piercer or center $E^{15}$ are moved, by the means before described, into the positions shown by the dotted lines. The work-piece F is then brought into the position shown and said parts M, E and $E^{15}$ are again moved, by the means before described, into the positions shown in Fig. 23, in which positions said parts M, E and $E^{15}$ are retained during the rolling or forming process. In these figures, the edging and web rolling roll $J^{69}$ is preferably formed as shown; that is, the part $j^{43}$ of said roll $J^{69}$ is the roll part adapted to roll or operate, as shown, upon the end face of the hub at one side of the work-piece and, the part $j^{28}$ of said roll $J^{69}$ is said web reducing roll part, (which may however have any other desirable or suitable form or shape than herein shown), operating against the peripheral face of the hub, the web part, and the inner peripheral face of the rim part of the work-piece at one side thereof. The part $j^{29}$ of said roll $J^{69}$ is the edging roll part operating upon and maintaining the lateral thickness of the rim and limiting therein the lateral flow of metal between said web reducing roll part $j^{28}$ of said roll $J^{69}$ and the periphery of the work-piece at its one side. While the work-piece and said forming-die may be rotated by said roll $J^{69}$, or by said roll $J^{69}$ and said forming-die $W^{14}$, which forming die may be rotated by either or both said rolls $J^{61}$, $G^{14}$; said roll $J^{69}$ is forced or rolled into the side of the work-piece and thus forces the metal of the work-piece at its other side into the hub-forming cavity of said forming-die $W^{14}$ and around the portion $e^{39}$ of said piercer or center $E^{15}$ and against and over said forming-die, and together with said face roll K forming the work-piece to the form shown in Fig. 24. During said rolling or forming process the work-piece is increasing in diameter and the face roll K is continually operated upon the peripheral face of the work-piece and moves with the enlargement of said diameter. While the work-piece is increasing in diameter metal of the work-piece is forced, by the action of said roll $J^{69}$, over said inclined peripheral face $w^{3}$ of said forming-die $W^{14}$ and against the edging roll portion $j^{29}$ of said roll $J^{61}$, as shown in Fig. 24. The work-piece is thus rolled or formed to the form shown at $F^{1}$ in Fig. 24. During the entire process the edging roll portion $j^{29}$ of roll $J^{69}$ is adapted to act against or in contact with portion of the work-piece between the web rolling part $j^{28}$ of said roll $J^{69}$ and the periphery of the work-piece at one side thereof, as shown, and the edging roll portion $j^{29}$ of roll $J^{61}$ is acting against or in contact with the other side of the marginal or rim portion of the work-piece, as shown.

Fig. 24 shows said work-piece F so rolled or formed to the form $F^{1}$ shown, with the outer end face of roll $J^{69}$ in contact with or against the peripheral face of said piercer or center $E^{15}$, as shown, with the roll against one side of the thus formed work-piece in the position shown at the end of the rolling or forming process above described, and with the other side of the work-piece against said forming-die $W^{14}$ as shown. During said rolling or forming process the web of the work-piece has been formed as shown and has been reduced between the part $j^{28}$ of said roll $J^{69}$ and the forming-die $W^{14}$ to its desired thickness and the inner peripheral face of the rim of the work-piece at one side thereof has been rolled or formed to the rudimentary form shown, while metal of the work-piece at its other side has been forced over said sufficiently inclined peripheral face $w^3$ of the forming-die $W^{14}$ and thereby having formed the inner peripheral face of the work-piece at the other side thereof to the sufficiently inclined or rudimentary form shown, and as and for the purpose hereinbefore described with reference for instance to Figs. 61 and 62. Simultaneously with said operation of said roll $J^{69}$ against the work-piece, said face roll K is against or is operating against the peripheral face of the work-piece and rolls the same to the said beaked or rudimentary form, as shown for instance in Fig. 61. While the roll parts $j^{29}$, $j^{29}$ of said rolls $J^{69}$, $J^{61}$ are still operating in contact with the opposite sides of the rim portion of the work-piece, said finishing rolls $G^1$ and H, shown at the other side of the axis of the work-piece, begin operating against the so rudimentarily formed rim portion, and roll with said roll $G^1$ the so rudimentarily rolled inner peripheral face of the rim of the work-piece at one side thereof to the finished form and roll with said roll H the so beaked or rudimentarily formed peripheral face of the work-piece to the finished form shown at $F^2$ in Fig. 25. At the same time, the edging roll parts $j^{29}$, $j^{29}$ of said rolls $J^{69}$, $J^{61}$ are maintaining the lateral thickness of the rim to which the same has been rolled during the process. It is to be noted that the center or hub portion of the work-piece or wheel, during said rolling or forming process, is firmly held in said automatically clamped condition between said centers $E^{15}$, $E^{16}$, or between said center $E^{15}$ and said forming-die $W^{14}$ while said centers and said forming-die $W^{14}$ are rotating with the work-piece or wheel. The work-piece or wheel shown at $F^2$ in Fig. 25 is finished and may be removed by moving the rolls $J^{69}$, $G^1$, K and H into the position shown for instance in Fig. 23 and by moving said supporting head M with its axle T and piercer or center $E^{15}$ into the positions shown in dotted lines in Fig. 23, when the work-piece or finished product will be taken out and replaced by another work-piece, &c.

It is further to be noted that during the entire rolling or forming process, said piercer or center $E^{15}$, and the center $E^{16}$ are kept in line by said cylindrical end part $e^{43}$ of said piercer or center $E^{15}$ being held by said central hole $e^{44}$ of said center $E^{16}$, and while so connected with each other are also forced against each other, thereby forming one substantial supporting device which is absolutely required in cases where such long piercer or center is to be used.

A car wheel or other circular article may also be rolled or formed as for instance described in the following with reference to the Figs. 26 to 28, in which the roll $J^{69}$ may be the same and may be operated the same or similar to the roll $J^{69}$ described for instance, with reference to Figs. 23 to 25, and the roll $J^{61}$ may be the same and may be operated the same or similar to the roll $J^{61}$ described with reference to Figs. 20 to 25 inclusive, and the roll $G^1$ may be the same and may be operated the same or similar to the roll $G^1$ described for instance with reference to Figs. 20 to 25, and the roll $G^{14}$ may be the same and may be operated the same or similar to the roll $G^{14}$ described for instance with reference to Figs. 20 to 25. In these Figs. 26 to 28 inclusive, I have, for instance, illustrated in brief, a rolling or forming operation or steps, according to my invention, such as I prefer to employ for completely rolling or forming the car wheel shown at $F^2$ in Fig. 28, including the rolling of the entire end face of the hub of the work-piece at one side thereof and the piercing or penetrating or centering of the properly heated work-piece from a blank or work-piece, such as shown at F in Fig. 26, in which figure the work-piece F and the forming-die $W^1$ are shown in diametral section, and the work-piece may have a thickness which is either the same, or greater or less than the length which the hub of the car wheel is to have when rolled or formed to finish. The piercing or penetrating or centering of the work-piece is similar as hereinbefore described with reference to said Figs. 26 and 27. Fig. 26 shows said work-piece F brought into the position shown as and in the manner hereinbefore described with reference to said Figs. 26 and 27. In this case, said piercers or centers are formed as shown and the lengths of their penetrating portions $e^{39}$, $e^{39}$ are made to suit the location of the web portion of the car wheel, as shown; that is, the web portion of the wheel in this case will be formed in the center of the length of the hub of the wheel and said penetrating portions of said piercers or centers $E^1$, $E^9$ will both have the same length, which may reach to or near the center of the thickness of the finished web adjacent the hub portion of the wheel, as shown in Fig. 27. The forming-die $W^1$ is formed or shaped at its forming side to conform to the center or hub part, the web part, and the inner peripheral face of the rim of the finished car wheel at one side thereof, as shown. At its other side next to the rolls $G^{14}$, $G^{61}$ this forming-die is formed with a central hub having a bore of two diameters so as to form a shoulder and it is also formed with a circular track or groove $w^4$ as shown. The axle E of the supporting head $M^{50}$ is provided with the piercer or center $E^9$, which is formed with a cylindrical portion $e^{38}$ and an enlarged cylindrical portion or flange $e^{37}$ and at its outer end adjacent the work-piece it is provided with the piercing or penetrating or forming portion $e^{39}$. The portions $e^{37}$, $e^{38}$ of said piercer or center $E^9$ are slidably fitted in the bore of the hub of said forming-die $W^1$, thus supporting said forming-die. The axle E of the supporting head M is provided with a piercer or center $E^1$. This piercer or center $E^1$ is formed adjacent its piercing or penetrating or centering part $e^{39}$ with an extension $e^{42}$ having a straight or approximately straight peripheral face, the diameter at the adjoining portion of said extension and said piercing or penetrating or centering part being the same or substantially the same. The peripheral face of the extension $e^{42}$ of said piercer or center $E^1$ is formed cylindrical or slightly conical so as to permit the end face of the roll $J^{69}$ to properly come against or in contact therewith during the rolling or forming process. The forming-die $W^1$, the die-supporting roll $G^{14}$, and the edging and die-supporting roll $J^{61}$ have been moved and adjusted, by the means before described, into the proper positions shown in Fig. 26 and therein they are rotatably retained during the operating process. When thus positioned, the roll $G^{14}$ with its die-supporting portion $g^{139}$ is supporting the forming-die $W^1$ in both radial and lateral or axial directions and with its edging or supporting portion $g^{137}$ it is against or in contact with the face finishing roll H, as shown; the roll $J^{61}$ with its die-supporting portion $j^{40}$ is supporting the forming-die $W^1$ in both radial and lateral or axial directions and with its edging roll portion $j^{29}$ it is against or in contact with the face rolling roll K as shown. The die-supporting portion $j^{40}$ of said roll $J^{61}$, or the edging roll portion $J^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

At the commencement of the process illustrated in Fig. 26, the face roll H is moved to a certain radial distance away from the periphery of the forming-die $W^1$, as shown; the face roll K is against or in contact with the peripheral edge of the forming-die $W^1$, as shown; and the work-piece F is brought into the position shown. In this operating process, the edging and web rolling roll $J^{69}$ is preferably formed as shown; that is, the peripheral or operating face of the roll part $j^{43}$ of said roll $J^{69}$ is formed substantially straight as shown and is the roll part adapted to roll or operate, as shown, upon the end face of the hub of the work-piece at one side thereof. The part $j^{28}$ of said roll $J^{69}$ is the web reducing, or web rolling and forming part, which may however have any other suitable forms or shapes than herein shown and which operates as shown against the hub, the web, and the rim of the work-piece or wheel at one side thereof; that is, the web reducing roll part $j^{28}$ of said roll $J^{69}$ is operating against the work-piece at one side thereof and is forcing metal of the work-piece at its other side into the hub-forming cavity of said forming-die $W^1$ and around the penetrating or forming portion $e^{39}$ of said piercer or center $E^9$ and against and over said forming-die $W^1$ as shown in Fig. 27, and together with said face roll K forming or shaping the work-piece to the form shown in Fig. 27. During said rolling or forming process and while the work-piece is increasing in diameter, the face roll K is continually operating upon the peripheral face of the work-piece and moves with the enlargement of said diameter. While the work-piece is increasing in diameter, metal of the work-piece is forced by said roll $J^{69}$ over said inclined peripheral face $w^3$ of said forming-die $W^1$ and against the edging roll portion $j^{29}$ of said roll $J^{61}$ as shown in Fig. 27. During the rolling or forming process, the inner rolling or operating portion of the part $J^{28}$ of said roll $J^{69}$ is operating on the inner peripheral face of the rim of the work-piece at one side thereof and rolls or forms said inner peripheral face of said rim at one side of the work-piece to rudimentary form and sufficiently inclined toward the periphery of the work-piece, as shown, and also forces metal of the work-piece, at its other side, over said sufficiently inclined peripheral face $w^3$ of the forming-die $W^1$, thereby forming also the inner peripheral face of the work-piece at the other side thereof sufficiently inclined toward the periphery of the work-piece, as shown. The peripheral or operating faces of the edging roll parts $j^{29}$, $j^{29}$ of said rolls $J^{69}$, $J^{61}$ are formed substantially straight, as shown, and during the rolling or forming process come in contact with or against the opposite sides of the tread or face roll K, as shown. This edging roll part $j^{29}$ of roll $J^{69}$ is adapted to roll or limit the lateral flow of metal in the portion of the work-piece between the roll part $J^{28}$ of said roll $J^{69}$ and the periphery of the work-piece; or such rolls, as for instance, $J^{69}$ when used for other purposes may not have such web reducing roll part $j^{28}$, but be for instance wholly formed conical, as for instance shown at $J^5$ in Figs. 9 and 11, and as shown and described in my said original application.

Fig. 27 shows the work-piece so rolled or formed as above described with its rim portion rolled or formed to said rudimentary form and with the edging roll portions $j^{29}$, $j^{29}$ of the rolls $J^{69}$, $J^{61}$ against or in contact with the opposite sides of the face roll K; the lateral width or thickness of said face roll K being the same as the lateral width which the marginal or rim portion of the work-piece or wheel is to have when rolled or formed to finish, as shown in Figs. 27 and 28. With the roll $J^{69}$ thus positioned, as shown in Fig. 27 and with the work-piece with its one side against the forming-die $W^1$, as shown, and while the edging roll parts $j^{29}$, $j^{29}$ of said rolls $J^{69}$, $J^{61}$ are still operating in contact with the opposite sides of the rim portion of the work-piece, said finishing rolls $G^1$ and H, shown at the other side of the axis of the work-piece, begin operating against the so rudimentarily formed rim portion and, roll with said roll $G^1$ the so rudimentarily rolled inner peripheral face of the rim of the work-piece at one side thereof to the finished form while said roll H rolls the so beaked or rudimentarily formed peripheral face of the work-piece to the finished form shown at $F^2$ in Fig. 28. At the same time, the edging roll parts $j^{29}$, $j^{29}$ of said rolls $J^{69}$, $J^{61}$ are maintaining the lateral thickness of the rim to which the same has been rolled during the process. It is to be noted that the center or hub portion of the work-piece or wheel, during said rolling or forming process, is firmly held in said automatically clamped condition between said piercers or centers $E^1$, $E^9$, or between said center $E^1$ and said forming-die $W^1$ while said piercers or centers and said forming-die $W^1$ are rotating with the work-piece or wheel. The work-piece or wheel shown at $F^2$ in Fig. 28 is thus finished and may be removed by moving said rolls $J^{69}$, $G^1$, K and H and said supporting head M with its axle E and piercer or center $E^1$ into the positions shown for instance in Fig. 26, when the work-piece or finished product will be taken out and replaced by another work-piece, &c.

A car wheel or other circular article may also be rolled or formed as for instance illustrated in the Figs. 29, 30 and 31 in which I have shown a car wheel or similar body rolled or formed from a solid circular blank shown at F in Fig. 29. The piercing or penetrating or centering process is similar to the process hereinbefore described for instance with reference to Figs. 26 and 27, with the exception that in this case the piercer or center, for instance $E^6$ of the supporting head M, is provided with the flange or shoulder $e^{30}$, as shown; all other parts being similar to the corresponding parts shown in Figs. 26, 27 and 28, with the exception that in this case the hub end-face rolling portion $j^{43}$ of the roll $J^{69}$ is omitted on the roll $J^1$ shown in Fig. 29 since said flange or shoulder $e^{30}$ serves the same purpose as said rolling portion $j^{43}$. Otherwise the operation or steps illustrated in Figs. 29 to 31 inclusive may be the same or similar to the operation or steps for instance described with reference to Figs. 26 to 28 inclusive. Fig. 29 shows the work-piece and the operating parts in positions they occupy at or before commencement of operation. Fig. 30 shows the work-piece and the operating parts at the end of the hub, web and rim forming process. Fig. 31 shows the work-piece and the operating parts at the end of the rolling or forming of the work-piece to the finished form of the car wheel shown at $F^2$.

A car wheel or similar body may also be rolled or formed as, for instance, illustrated in the Figs. 32 to 34 inclusive. Therein the operating parts and the operating process may be the same or similar to the ones described, for instance, with reference to Figs. 23 to 25 inclusive, with the exception that in place of the roll $J^{69}$, a roll $J^{55}$ is used, which roll $J^{55}$ in Figs. 32, 33 and 34, is formed or shaped somewhat different. Fig. 32 shows the work-piece F and the operating parts in the positions they occupy at the commencement of operation. Fig. 33 shows the work-piece rolled or formed to the form $F^1$, as shown. At the side of the work-piece next to roll $J^{55}$, the hub with a portion only of the web, is shown rolled or formed, and the other portion of the web with the inner peripheral face of the rim portion, at said one side of work-piece, is rolled or formed during the finishing operation with the roll $G^1$, as indicated in Figs. 33 and 34. The work-piece or car wheel shown at $F^2$ in Fig. 34 is finished, and removed as before described.

In the Figs. 35 and 36, the work-piece F is similar to the work-piece F for instance in the Fig. 23, and the axle E and piercer or center $E^{15}$ with the supporting head M and the axle E and center $E^{17}$ with the supporting head $M^{50}$, with the exception of center $E^{17}$ which is somewhat longer, are similar to and may be operated in the same manner as before described with reference to Figs. 23 to 25 inclusive, and the roll $J^{69}$ is the same and may be operated in the same manner as before described with reference to Figs. 23 to 25. The roll $G^1$ is also the same and may be operated in the same manner as before described with reference to Figs. 20 to 25 and the roll $J^{74}$ and the die-supporting roll $G^{110}$ are in this case serving only to support the forming die $W^{20}$ and are shown formed with stepped portions, each step portion having its peripheral face formed straight, or approximately so, and the side of the forming-die next to said rolls $J^{74}$, $G^{110}$ is correspondingly shaped to fit said stepped portions of said rolls $J^{74}$, $G^{110}$, thereby supporting said forming-die $W^{20}$ in both lateral and opposite radial directions. In these Figs. 35 and 36, however, the forming-die $W^{20}$ is formed differently; that is, the circumferential face or periphery of the forming portion of this die $W^{20}$ reaches to a circle which, for instance, has a diameter equivalent to that portion of the finished side of the rim of the work-piece or wheel where the rounding off of the outer circumferential corner of the tread commences and at this circle the forming-die $W^{20}$ is formed with a circular off-set or shoulder $w^7$, and the tread or face finishing roll H has its peripheral or rolling face $H^1$ formed, as shown, with a circular flange $h^{17}$ provided with a fillet formed correspondingly with the rounded corner of said tread. When this face roll H is properly positioned at a certain radial distance from the axes of the piercer and center $E^{15}$ and the center $E^{17}$, the peripheral edge of said flange $h^{17}$ is in contact with said shoulder $w^7$ of said forming-die $W^{20}$, as shown in Figs. 35 and 36. The side of the rim of the work-piece or wheel next to the forming-die is therefore formed by the forming-die, and the peripheral face of the work-piece or wheel including its flange and the rounding off of the outer corner of the tread of the rim is rolled to finish with said roll H, as shown. The face beaking or face rolling roll K has its peripheral or rolling face $K^7$ formed as shown and at its side next to forming-die $W^{20}$ said roll K is formed or provided with the circular portion or extension $K^{17}$ as shown. At the commencement of operation, the roll K with its rolling face $K^7$ is moved against the peripheral portion $w^5$ of said die $W^{20}$ as shown in Fig. 35. When roll K is thus positioned the circular portion or extension $K^{17}$ of said roll K may be in contact with or be somewhat away from the shoulder $w^7$ of said die $W^{20}$, as shown in Fig. 35, thereby, during the operating process and while said roll K moves from the position thereof shown in Fig. 35 to the position thereof shown in Fig. 36, the one side of said roll K will be fully supported by said forming-die $W^{20}$, as shown. At the same time, the other side of said roll K will be against or in contact with the edging roll portion $j^{29}$ of said roll $J^{69}$ and thus one side of the rim portion of the work-piece or wheel is being formed by said forming-die while the other side of said rim portion is being rolled by the edging roll portion $j^{29}$ of said roll $J^{69}$, as shown in Fig. 36, which edging roll portion thus rolls said rim portion to desired width. In this process, said face roll H is positioned at the proper radial distance from the axes of said piercer or center $E^{15}$ and said center $E^{17}$ to suit the finished radius of the finished wheel and it is retained in said position during the rolling or forming operations. Otherwise the operating process or steps is similar to the operating process or steps before described with reference to Figs. 23 to 25.

In Figs. 37 and 38 is illustrated, for instance, a new or worn car wheel rolled, for instance, smaller in diameter. In this case the actual forming portion of the preferred forming-die reaches to the inner peripheral face of the rim of a car wheel at one side thereof when rolled or formed to its desired finished smaller diameter and it is shaped to conform to the dished web portion, the center or hub part, and the inner peripheral or inner circumferential face of the rim portion of the car wheel at one side thereof when rolled or formed to its desired finished smaller diameter. The piercing or penetrating or forming portion $w^1$ is formed integral with the forming-die $W^3$, as shown. Fig. 37 shows the work-piece $F^1$ placed onto the forming-die $W^3$ and the operating parts in the positions they assume at the beginning of operation against the rim portion of the work-piece $F^1$, and it also shows the center $w^1$ of the forming-die $W^3$, and the center $E^2$ of the axle E of the supporting head M forced or entered loosely into the central hole and over the peripheral face of the hub portion of the work-piece $F^1$; that is, the center $w^1$ of the forming die is either forced or entered loosely into the bore and at the same time the peripheral face of the hub of the work-piece at the side next to the forming-die is forced into the hub-forming cavity of the forming-die, and the center part $e^{36}$ of the center $E^2$ is either forced or entered loosely into the bore while the flange part $e^{35}$ thereof which surrounds said center part $e^{36}$ and is formed integral with said center $E^2$ is forced over the peripheral face of the hub portion of the work-piece at the other side thereof, thus making the hole in the work-piece, or a part or parts thereof, either larger or smaller in diameter, as may be desired, so the wheel when finished may be rebored to its original diameter or to a smaller or larger diameter. The space or distance between the inclined peripheral face $w^5$ of the forming-die $W^3$ and the inner peripheral face of the rim of the work-piece at one side thereof, indicated by $f^{25}$, will be filled up with metal of the rim and adjacent web portion during this process, as shown in Fig. 38. In this case, the rolling or operating part $K^1$ of the face roll K is shown formed to conform with peripheral face of the wheel when finished, with the exception that the outer corners of the tread and flange are not rounded with this roll K, but such rounding will be performed by the rolling or operating part $H^1$ of the face roll H, as shown in Figs. 37, 38 and also illustrated in Figs. 63 and 64. Said face rolls K and H may also be operated against the peripheral face of the work-piece, either together in unison, or independent of each other. In this case, said face rolls K and H are shown to be operated together in unison against the peripheral face of the work-piece; that is, each roll moves the same radial distance as the other. These face rolls K and H, in this case, are forced against the peripheral face of the work-piece at diametrically opposite points while the work-piece is rotating and thereby compress and enlarge the sectional volume of the metal in the rim portion of new or worn wheels while the same are rolled to smaller diameter, and thus form the rim of the wheel to smaller diameter. Fig. 38 shows said new or worn car wheel shown at $F^1$ in Fig. 37, so rolled or formed to the form shown at $F^2$, and shows the work-piece or wheel and the operating parts in their positions at the end of the rolling or operating process.

Fig. 39 shows the forming-die, for instance $W^1$, supported by the edging and die-supporting roll, for instance $J^{61}$, and by the die-supporting roll, for instance $G^{14}$, all being in the positions they occupy at the commencement of the operating process. In the position shown, the roll $G^{14}$ with its die-supporting part $g^{139}$ is supporting the forming-die in both radial and lateral directions, and with its edging or supporting portion $g^{137}$ is against or in contact with the face finishing roll H as shown. In some cases the supporting portion $g^{137}$ of said roll $G^{14}$ also serves as an edging roll portion, as for instance shown by the roll $G^{61}$, Fig. 10. Said roll may also be constructed so that part thereof serves as an edging roll portion, such as for instance shown by the roll $G^{111}$ in Fig. 41, or said roll or a part or parts thereof may also serve other purposes, as will be observed from the matter herein described. The face rolls H and K may be moved at right angles to the axis of a supported work-piece during the operating process, as may be desired, or they may be retained at any desired radial distance or distances from the axis of the supported work-piece, such as the case may require, or both face rolls H and K may be moved together or in unison, as hereinbefore described and as more fully described in my said original application. In the position shown in Fig. 39 said roll $J^{61}$ with its die-supporting portion $j^{40}$ is supporting the forming-die in both radial and lateral directions and with its edging roll portion $j^{29}$ is against or in contact with the face rolling roll K, as shown. Said edging and die-supporting roll may also be formed entirely different and may also be formed to serve other purposes than the one shown in Fig. 39. During the operating process against a work-piece, said face roll K, will operate upon the peripheral face of the work-piece continually and as the work-piece, for instance, increases in diameter, said face roll moves with the enlargement of said diameter, as for instance indicated by the distance $x^6$ away from the edge of forming-die $W^1$ until the desired diameter of the work-piece has been reached, when said movement of face roll K will be automatically stopped and the roll K retained, and during said movement of said face roll K away from the edge of forming-die $W^1$, the edging roll part $j^{29}$ of said roll $J^{61}$ will operate against or in contact with the side or edge of the marginal or rim portion of the work-piece, as for instance shown by roll $J^{61}$ in Fig. 27. In said Fig. 39, the edging roll part $j^{29}$ of roll $J^{61}$ may be driven by its shaft J, while the die-supporting portion $j^{40}$ of said roll $J^{61}$ may be rotatably fixed and permitted to turn loose, for instance on a journal provided on said shaft J, such loose roll portions are shown and described in my said original application for said edging and web rolling rolls.

In Fig. 39 is also illustrated, for instance, the operation of piercing or penetrating the side of the work-piece next to the forming-die before or during the operation with the rolls; that is, when the work-piece is in proper position, as shown by the portion of the work-piece F in Fig. 39, the piercer or center, for instance $E^9$, is forced into the work-piece, for instance, the distance $x^7$, as shown by the dotted lines, while the forming-die $W^1$ and the rolls $G^{14}$, $J^{61}$, H and K are retained in the position shown.

In Fig. 39 the forming-die $W^1$ is formed at the peripheral portion of its operating or forming side with the inclined peripheral face $w^3$ which is adapted to form the inner peripheral face of the marginal or rim portion of the side of the work-piece next to the forming-die to the inclined form $f^{18}$, shown for instance in Fig. 55. Said face $w^3$ is the same as and for the purpose hereinbefore described with reference to the Figs. 61, 62, 64 and 65.

In Fig. 41, the forming-die, for instance $W^{21}$, is positively driven from the shaft J by bevel gear $j^{49}$ meshing with the teeth $w^8$ of a bevel gear provided on said forming-die $W^{21}$. The work-piece and the other rolls are not shown in this figure. The said piercers or centers, for instance $E^{15}$ and $E^{17}$ are similar to the ones shown for instance in Fig. 23, with the exception that the center $E^{17}$ is longer than the center $E^{16}$ in said Fig. 23. Said forming-die $W^{21}$ is mainly supported laterally by the portion $g^{140}$ of the roll $G^{111}$ and by the portion $j^{48}$ of the roll $J^{75}$ and is mainly supported radially in opposite directions by the shoulder $g^{142}$ of the roll $G^{111}$ and by the shoulders $j^{42}$ and $j^{52}$ of the roll $J^{75}$, as shown. The parts shown in Fig. 41 are brought and retained in the positions shown and are ready to receive a work-piece and, when receiving the work-piece, said piercer or center $E^{15}$ with its supporting head M, (not shown in Fig. 41) is pulled back into the position for instance indicated by the dotted lines for the piercer or center $E^{15}$ in Fig. 23. In said Fig. 41, the face finishing roll H is retained during the operating process at a radial distance from the axes of said piercers or centers, for instance $E^{15}$, $E^{17}$, which distance equals the radius of the diameter of the finished wheel or other finished object. It is to be observed that the shoulder $g^{142}$ of the portion $g^{144}$ of the roll $G^{111}$ bears against or in contact with said forming-die $W^{21}$ and that the other shoulder $g^{143}$ of said portion $g^{144}$ bears against or in contact with the end collar or flange $h^{17}$ of the face roll H, as shown; thereby forming a continuous rolling surface extending outward from the periphery of said forming-die $W^{21}$ which is adapted to act against one side of the marginal or rim portion of the work-piece while said roll H acts against the total peripheral face of the work-piece or wheel, including the rounding of the outer corners of the tread and flange of the wheel. The beaking or roughing roll K in this figure, is adapted to commence operating against the peripheral face of the work-piece from its position against said forming-die $W^{21}$, as shown, and during the operating process against the work-piece said roll K will operate upon the peripheral face of the work-piece continually and as the work-piece increases in diameter, said face roll K moves with the enlargement of said diameter, as for instance, indicated by the distance $x^6$. In this figure the center for instance $E^{17}$ is firmly attached to axle E by the shoulder $e^2$ formed on said axle and by the pins $e^1$, as shown, or by any other suitable means. Feathers $e^{46}$, $e^{46}$ are provided on said center $E^{17}$, and the bore of said forming-die $W^{21}$ is provided with key-ways fitting slidably over said feathers, thus causing said piercer or center $E^{17}$ with its axle E to be rotated by said forming-die $W^{21}$, as shown in the Figs. 40 and 41.

In Fig. 42 the die-supporting portion of the rolls $J^{66}$ and $G^{48}$ are formed with stepped portions, each having its peripheral face formed straight, or approximately so, thereby forming shoulders which also support the forming-die $W^{11}$ radially in opposite directions as shown.

In Fig. 43 is shown, at $F^2$, a rolled or formed gear-wheel blank, or a disk wheel or center such as used for instance in some tired car wheels; the process for rolling or forming the same being similar to the process illustrated for instance in Fig. 6 for rolling or forming the car wheel therein shown; that is, the rolling and forming is performed with the use of only the forming-die $W^1$, rolls $J^{69}$, $J^{61}$, the roll K having its peripheral rolling face $K^3$ formed as shown, and the supporting heads M, $M^{50}$ and axles E, E with their respective piercers or centers, for instance $E^1$, $E^9$ as shown. The rim portion is similarly rolled or formed as per illustration Fig. 65, and as hereinbefore fully described.

Fig. 55 shows a diametral section of a finished rolled or formed car wheel taken on line 55—55, Fig. 57, the wheel being similar to the car wheel shown at $F^2$ in Fig. 31 and other figures and showing the inner peripheral face $f^{18}$ of the rim of the wheel at one side thereof formed with the forming-die portion $w^3$ by the action of the roll portions $j^{28}$, $j^{29}$ to said sufficiently inclined form, for instance $f^{18}$, as illustrated in Figs. 30, 31, 61 and 62. The inner peripheral face $f^{20}$ of the rim of the car wheel at the other side thereof is first rolled by the roll, for instance, $J^1$, to the form shown in Fig. 30 and is then rolled by the roll $G^1$ during the finishing process illustrated in Figs. 31 and 62 to the finished form, for instance $f^{20}$, as illustrated in Figs. 31 and 62. The car wheels in Figs. 55 and 56 are each shown with the hub bored.

Fig. 56 shows both said inner peripheral faces rolled or formed to the forms $f^{20}$, $f^{20}$ as shown.

The advantages of my invention are many and will be appreciated by those skilled in the art. Some of said advantages are for instance:

The porduction of car wheels and other circular objects by the use of a supporting head, a supporting axle rotatably supported on said supporting head, a piercer or center fastened to one of the ends of said supporting axle, and a forming-die supported on said piercer or center; the actual forming-slide or forming portion of said forming-die being shaped to conform to the form or shape of that portion of the car wheel or other body at one side thereof which reaches to a circle at the inner peripheral face of the marginal or rim portion of the wheel or other body when the same is rolled or formed to its finish; that is, the side of the work-piece next to the forming-die is pressed against, into, and over the forming-die and metal of the work-piece at the side thereof next to the forming-die is forced into the hub forming-cavity or cavities of the forming-die and against and over the forming-die inside of said circle by the action of a roll or rolls acting against the work-piece at the other side thereof. By this means, all surfaces of the work-piece or wheel, with the exception of that portion of the work-piece or wheel at one side thereof the work-piece so automatically and firmly clamped laterally between them, may be axially moved or adjusted for the purpose, for instance, to properly position the work-piece, or as may be desired, and with the aid of such indicating devices or with the aid of such adjustable stops shown and described in my said original application, car wheels or other circular bodies will be rolled or formed perfectly true, smooth and to balance and to the desired gage or gages, and when the tread and flange or peripheral face of the car wheel or other circular body being rolled reaches its desired finished diameter, said finished diameter will automatically be retained during any further operation against said car wheel or other body; or for instance, with the use of a face roll K having its peripheral or rolling face formed as and for the purpose hereinbefore described with reference to Figs. 66, 67, 68, 69, 61, 62 or 64 and 65 and having its lateral thickness or width the same as is the lateral thickness or width which the outer or rim portion of the car wheel or other article which is to be rolled from the work-piece is to have when finished and with the edging and web rolling rolls, for instance $J^1$, $J^{55}$, or $J^{56}$ &c., and the edging and die-supporting rolls for instance $J^{61}$, $J^{66}$ or $J^{75}$ &c., being formed as and for the purpose hereinbefore described for instance with reference to the Figs. 61, 62, 64 and 65 and as for instance shown in the Figs. 27, 28 or Figs. 30, and 31, &c., the metal in the peripheral face and the whole rim portion of a car wheel or other article is also rolled or worked continually during the rolling process upon all its surfaces simultaneously with the forming-die and said three rolls formed for instance as shown, and thereby the metal in the peripheral face and the whole rim portion of a car wheel or other article is also condensed uniformly to its maximum, or practically so, thus giving to said metal in said peripheral face and rim portion its due maximum and uniform strength and its due maximum and uniform resistance to wear and when the work-piece or wheel is finished by my finishing rolling or forming processes to its finished form or shape, as for instance shown at $F^2$ in the Fig. 28 or 31 &c., said peripheral face and the whole rim portion is also rolled smooth on all its surfaces to the desired forms or shapes without leaving a raised circular portion or fin which would have to be removed afterward by turning, or other costly means; or for instance, during the rolling or forming according to my invention, any surplus of metal in the heated work-piece may be forced during the rolling or forming process to flow either into the inner peripheral portion of the rim or into the web portion adjacent to the rim, or into both; or to flow into any other portion or portions of the wheel or other object, without leaving a raised circular portion or fin anywhere on the finished rolled or formed wheel or other finished rolled or formed object which would have to be removed afterward by turning or other costly means; or for instance, my forming-die herein shown and described in some of its various forms is, in most cases, slidably supported on the piercer or center of the supporting head $M^{50}$ and rotatable with said piercer or center; or for instance the reworking of a new or work car wheel, as for instance described with reference to Figs. 37 and 38; or for instance, the supporting head, for instance $M^{50}$, fitted with the operating parts as hereinbefore described with reference to Fig. 5; or for instance, the device with reference to Figs. 16 and 17, for longitudinally moving the axle E with its piercer or center together with the supporting head, for intance $M^{50}$, or for moving said axle E with its piercer or center independently of said supporting head $M^{50}$; said supporting head, for instance, $M^{50}$, may be moved into desired position and therein retained while its axle E with piercer or center may be longitudinally moved as desired; or for instance, the novel driving means and the arrangement thereof, as shown and described in my said original application, enables the main driving gears and their shafts to be located below the floor and out of the way and it also enables each set of the driving rolls to be run in either direction and at various speeds relative to the other set, and also that either set may be disconnected from the main driving shaft, all as fully shown and described in my said original application. Other advantages of my invention will appear from the matter hereinbefore shown and described.

My said preferred novel devices or means and my novel apparatus or mill wherein said devices or means are systematically arranged, as more fully shown and described in my said original application, may be operated in many ways different from those herein described and still be within the scope of my claims, and it is to be understood that I do not desire to limit myself to the operation of said devices or means as herein described, as such are only examples for the purpose of illustrating the manner or way by which my novel method and means for centering or piercing or penetrating properly heated ingots, blooms, blanks or other work-pieces and therefrom completely rolling or forming such bodies or articles, as herein described, or other similar bodies or articles, or any other desired article, such for instance as herein disclosed, or similar thereto; all of which may be carried out with my novel apparatus or mill.

While the apparatus or mill, in the manuinside of said circle, are acted upon directly by rolls, and the whole rim portion with the exception of the inner peripheral face of the rim portion next to the forming-die is rolled direct by rolls, and as soon as the metal at the peripheral face of the work-piece reaches the peripheral rolling face of the face roll K (see for instance Figs. 26 and 27), it will be rolled or worked continually until the work-piece or wheel has been rolled or formed to a desired diameter. When thus rolled, the finishing roll H operates against the peripheral face of the work-piece or wheel, whereby the metal in the whole rim portion of the work-piece or wheel is compressed or worked to its maximum and uniform density or practically so. The piercing, or penetrating, or centering and the complete rolling or forming of the whole car wheel or other body, including the removing of the work-supporting centers, may all be done by my novel method and novel devices or means with one heat and before the work-piece or finished car wheel or other finished body is removed from the apparatus or mill; and therewith, in rolling or forming, for intance, such articles as dished car wheels, the metal in the flange, tread and whole rim portion of the article may be worked to maximum density where the strength of the wheel is mostly needed, thereby giving to said parts the greatest possible strength and most efficient wearing surface, thus enormously reducing the cost of operation in the manufacture or the making of car wheels or other circular articles, cheapening the product and increasing the output; or for instance, any previously formed blank or work-piece formed by any method or means into any desired form or shape such for instance as herein disclosed or similar thereto and being properly heated and having the proper volume or weight for the desired finished article, may be taken into my apparatus or mill and therewith be rolled or formed, as may be desired, and finished to the desired form or shape of any of the bodies or articles as herein described or to the form or shape of any other desired article, such for instance as herein disclosed, or similar thereto, and such articles may be pierced or penetrated or centered, and be rolled or formed with either the use of all the rolls or with only the use of the herein named rolls of either of the herein named finishing side or of the herein named roughing side of my novel apparatus or mill; or for instance, all the various performances required in the making of such bodies or articles as herein described from properly heated ingots, blooms, blanks or other work-pieces may either be all performed with one heat and before the work-piece or finished product is taken out of my novel apparatus or mill, or each of such performances may be done singly or separately, as may be desired; or for instance, the rolling or forming of the inner peripheral faces of the marginal or rim portion of a work-piece or wheel sufficiently conical, or sufficiently inclined, as and for the purpose hereinbefore described for instance with reference to Figs. 61, 62, 64 and 65, and then rolling the metal, or part of the metal forming the so sufficiently conically rolled inner peripheral face of the rim portion of the work-piece or wheel at one side thereof into another portion of the work-piece or wheel, as and for the purpose hereinbefore described and diagrammatically illustrated with the Figs. 61 and 62; or for instance, the rolling of the total peripheral face of the work-piece or wheel, first to beaked or rudimentary form, as and for the purpose hereinbefore described with reference for instance to Figs. 27, 30, 66, 67, 68, 69, 61 and 62 and then the rolling of the so beaked or rudimentarily formed peripheral face to desired finished form, as and for the purpose hereinbefore described, for instance, with reference to Figs. 66, 67, 68 and 69 and diagrammatically illustrated in Figs. 61 and 62; or for instance, such bodies or articles as herein described or any other similar desired articles which were previously finished by any process, but which were not dished, may according to my invention, be rolled or formed to desired dished form, or such bodies or articles as herein described or any other similar desired articles which were previously finished by any process and which were either dished or not dished and which were either bored and fitted or forced to their axles or shafts or which were not bored, may, according to my invention, be rolled or formed true, or rolled or formed to a different form or size, and if bored, such bore may also be made smaller in diameter so that it may again be bored to its original diameter and be again fitted to the same place on its axle or shaft; or, ingots, blooms, blanks or other work-pieces which may have been previously centered or pierced and centered and which may also have or not have the hub portion formed by any process or which may also have or not have been formed into any of the aforesaid forms or shapes by any process, may according to my invention be rolled or formed to suitable form, as may be desired; or for instance, the piercers or work-supporting centers, by constant and continuous pressure means may also automatically clamp the hub or center portion of the work-piece firmly between them, and with the forming-die revolve with the blank or work-piece while the same is so automatically and firmly clamped laterally at its hub or center portion, and during the operation the said piercers or work-supporting centers with the hub or center portion of facture or making of such articles as herein described, or other similar articles, may mostly be used in rolling or forming such articles with the use of all the rolls and with the centering or piercing or penetrating and the rolling of forming devices and with the positioning, or raising, lowering and retaining device shown and more fully described in my said original application, and therewith may give best results, I do not desire to limit myself to such apparatus or mill having all the rolls and the other aforesaid devices, as efficient apparatuses or mills can be made for instance with only part of such rolls, and with or without the positioning, or raising, lowering and retaining device wherewith such articles as herein described or other articles may be satisfactorily made. For instance, in Fig. 6 is illustrated a car wheel which is rolled with only the use of the forming-die, for instance $W^1$, and the three rolls as shown; that is, with the herein named edging and web rolling roll, for instance $J^1$, the edging and die-supporting roll, for instance $J^{61}$, and the tread or face rolling roll K; or as for instance, in Fig. 7, is illustrated a car wheel which is rolled or formed with only the use of the four rolls as shown, that is,—with the forming-die, for instance $W^1$, the herein named edging and web rolling roll, for instance $J^1$, the die-supporting roll, for instance $J^{61}$, the tread or face rolling roll K and the face finishing roll H; or for instance, in Fig. 8 is illustrated a car wheel which is rolled or formed with only the use of the three rolls as shown, that is,—with the forming-die, for instance $W^1$, the herein named web finishing roll, for instance $G^1$, the die-supporting roll, for instance $G^{14}$, and the tread or face finishing roll H; or as for instance,—in Fig. 9 is illustrated a car wheel which is rolled or formed with only the use of the five rolls, as shown, that is,—with the forming-die, for instance $W^1$, the herein named web finishing roll, for instance $G^1$, the die-supporting roll, for instance $G^{14}$, the tread or face finishing roll H, the herein named edging and web rolling roll, for instance $J^5$ (which latter roll in this case may either be loose or driven), and the die-supporting roll, for instance $J^{61}$.

It is further to be understood that I also do not desire to limit myself to pressure cylinders as herein shown and described, as efficient apparatuses or mills can be made and be useful, wherein, instead of the herein shown and described double acting pressure cylinders for moving the rolls into and out of operative position with the work-piece and with their adjustable stops for limiting their strokes as desired, any other form of pressure cylinder or any other suitable means may be used.

It is also further to be understood that I do not desire to limit myself, as shown for instance in said Fig. 1, to the inclination or angle at which for instance the shafts J, J of said edging and web rolling roll, for instance $J^1$ and edging and die-supporting roll, for instance $J^{61}$, are disposed; nor the diameter of said rolls for instance $J^1$, $J^{61}$, shown for instance in said Fig. 1. Said inclination or angle, with respect to the side of the supported work-piece or with respect to a plane at right angles with the axis of the supported work-piece, may be much greater than herein shown, or for instance the axis of one or of each of said shafts, J, J, may be parallel or approximately parallel with the side of the supported work-piece during the operating process; or for instance one shaft J may be parallel or approximately parallel with the side of the supported work-piece, while the other shaft J may be inclined to the side of the supported work-piece, all as practice may determine and depending also on the thickness and shape of the article to be rolled or formed from the work-piece; therefore the axes of such shafts or rolls may be either parallel or inclined to the side of the supported work-piece and the diameter of the rolls, for instance $J^1$, $J^{61}$ or $J^1$, $X^4$, etc., may, for instance be smaller or larger, such as may be required for various purposes or as practice may determine.

This application distinguishes essentially from my co-pending application, Serial No. 195,637, filed October 9, 1917, in that the web of the work-piece or the finished article is rolled directly to dished form in contra-distinction to the dishing of the work-piece or finished article by means of longitudinal movement of the work-supporting axles, and for this reason the forming-die has its forming face bulged inwardly from its peripheral edge, or as it may be termed, said forming face is inclined or made to slope either inwardly or outwardly. Therefore, where in the specifications or claims, the words "bulged," "sloping" or "inclined" are used in this connection it is intended to mean that the forming face of the die deviates from a straight face arranged at a right angle to the axis of the die and that said face may slope or incline inwardly or outwardly and that said slope or incline may be straight lined, concaved, convexed, irregularly curved or otherwise formed, so long as it serves to offset the hub from the rim by means of a dished web formed on the finished article, which web trends at an angle to a plane passing circumferentially through the rim of the finished article, all of which falls fully within the scope of my invention, since the dishing of a car wheel is sometimes caused by a straight lined conical or inclined web and at other times the web is formed concave-convex or with a slight ogee curve.

Where in the specification and claims the word "coaxial" or "coaxially" is used with reference to the centering, or piercing or penetrating and centering, and to the positioning of a work-piece, &c., it is intended to mean "coaxial or approximately coaxial," &c.

Where in the specification and claims the word "ingot, bloom or blank" are used, it is intended to mean the work-piece to be operated upon, and the word work-piece is used herein in a broad sense and is intended to include an ingot, bloom, blank, car wheel or any other unfinished or completely finished circular, or approximately circular object adapted to be rolled or formed, rerolled, reworked or reformed either to entirely change its shape, or only partly change its shape or outline, or to change its dimensions in whole or part, as desired. In other words, "work-piece" means any circular, or approximately circular object to be operated upon.

Where in the specification and claims the words "sufficiently conical" or "sufficiently inclined" are used with reference to the said inner rolling or operating portion of the web reducing roll part $j^{28}$ of said edging and web rolling roll, for instance $J^1$, $J^{55}$ or $J^{56}$ &c., and to the inclined peripheral portion, for instance $w^3$ of the forming-die, for instance $W^6$ in Fig. 20 &c., or with reference to the inner peripheral face or faces of the marginal or rim portion of a work-piece or wheel or other object, it is intended to mean the inclination of said inner rolling or operating portions of said web reducing roll part $j^{28}$ and the inclination of the peripheral portion, for instance $w^3$ of the forming-die, for instance $W^6$ in Fig. 20 &c., being formed &c., so as to cause the metal, during the rolling or forming of said rim portion, to flow in the proper directions to assure compression of the metal in said rim portion to uniform or to practically uniform density, as distinctly illustrated in Figs. 61, 62, 64 and 65, and as hereinbefore fully described with reference to said Figs. 61, 62, 64 and 65.

The foregoing description clearly sets forth various piercing or penetrating or centering and rolling or forming processes or steps and operations, according to my invention, herein set forth, which I prefer to employ for carrying out my invention for centering or piercing or penetrating &c., and completely rolling or forming according to my invention, properly heated blanks or work-pieces into completely finished rolled or formed dished wheels or other circular dished bodies, in the same apparatus or mill, and while the means illustrated and described are designed to practically carry out the various steps of my invention, herein set forth, I do not wish to limit myself to the use of such means, as modifications thereof within the scope of the appended claims may be employed and my invention practised thereby without departing from my invention or sacrificing any of the advantages thereof.

The foregoing description and accompanying drawings further fully set forth my invention, together with portions of an apparatus or mill for carrying out my invention, and also illustrate and describe modifications in the arrangement and constructions of said portions of said apparatus or mill, which modifications may be employed for carrying out my invention, all embodying my invention. It is to be understood, however, that many modifications and changes in the construction and arrangement of the parts and in the steps and operation may still be made without departing from my invention, as defined in the claims.

The features of my invention herein described are not all claimed herein, but such features not herein claimed are covered by claims within applications filed by me and having the hereinbefore mentioned serial numbers and filing dates.

I claim as my invention:—

1. In an apparatus or mill of the kind described, combined die and roll-forging mechanism coöperating to form a blank or other work-piece into the form of a car wheel or other circular body having a hub, a rim and a dished web portion, the die portion of said mechanism being disposed to have the work-piece rolled thereagainst and the roll-forging portion of said mechanism being adapted to roll against all exposed surfaces of the work-piece not engaged by the die-forging portion of the said mechanism including opposite sides and the peripheral face of said rim.

2. In an apparatus or mill of the kind described, a pair of alined rotatable work-supporting axles between which a work-piece is to be positioned, a forming-die carried by one of said axles and adapted to be engaged by and rotate with said work-piece, a roll or rolls adapted to act against the work-piece to force the same against and into said forming-die and over the peripheral edge of the same, said roll or rolls and die being formed to provide the finished work-piece with a dished web, and peripheral face rolls adapted to roll the peripheral face of the work-piece first to beaked or rudimentary shape and then to finished shape.

3. In rolling mechanism, a rotatably supported forming die against which one side of the work-piece is to be forced, means for rolling the work-piece against and into said die and over the peripheral edge of the same and for rolling the exposed portions of the work-piece to desired form including the rolling of the opposite sides and outer peripheral face of the rim or marginal portion and the rolling of a web to dished form.

4. In rolling mechanism, a rotatably supported forming die against which one side of the work-piece is adapted to be forced, means for rolling the work-piece against and into said die and over the peripheral edge of the same and for rolling the exposed portions of the work-piece to desired form including the rolling of the opposite sides and outer peripheral face of the metal rolled over said peripheral edge and the rolling of a web to dished form.

5. In rolling mechanism for rolling a car wheel or similar circular object having a hub, a dished web and a rim, the combination of a rotatably supported forming-die having its forming face bulged inwardly from its peripheral edge toward its axis, and rolls adapted to act against the work-piece to force the same against and into said die and over the peripheral edge of the same, to form one side or a portion of one side of the work-piece or car wheel or other object to the shape of said die, and to roll the work-piece on all its surfaces out of contact with said forming die, including the rolling of the opposite sides and outer peripheral face of said rim.

6. In rolling mechanism, rotatable work-supporting means including a pair of alined rotatable axles between which a work-piece to be rolled or formed with a rim portion is adapted to be positioned, a forming-die carried by one of said axles and having its forming face bulged inwardly from its peripheral edge toward its axis and its peripheral edge adapted to form the inner peripheral face of said rim portion at one side of the work-piece and rolls adapted to roll in contact with said work-piece to cause the same to be shaped at said side to conform to said die and to roll the remaining surfaces of the work-piece to desired form including the rolling of the opposite sides and the outer peripheral face of the rim of the work-piece.

7. In rolling mechanism, combined die and roll forging means for forming or rolling a car-wheel or other circular object having a dished web and a flanged rim portion, the roll-forging portion of said means being so arranged relative to the die-forging portion thereof to roll the portion at one side of the work-piece inside of the rim portion and to roll the opposite sides and the outer peripheral face of the rim portion and to cause the work-piece at the other side thereof inside of the rim portion to be formed to the shape of said die-forging portion.

8. In rolling mechanism, a pair of alined work-supporting axles rotatably supported and adapted to support a work-piece therebetween, a forming-die carried by one of said axles and adapted to be engaged by one side of the work-piece and having its forming face bulged inwardly from its peripheral edge toward its axis, rolls adapted to act against the work-piece to cause said one side thereof to be formed to the shape of the forming face of said forming-die and to cause the work-piece to be enlarged in diameter so as to cause its marginal portion to extend beyond the peripheral edge of said forming-face and to roll the other side of the work-piece to desired shape, and a roll or rolls co-acting with said rolls to roll the extending marginal portion of the work-piece to desired lateral thickness and the outer peripheral face thereof to desired shape.

9. In an apparatus or mill of the kind described, a pair of alined work-supporting axles rotatably supported and having detachable piercers or centers secured to adjacent ends thereof to support or to partly support a work-piece therebetween, a forming-die supported on one of said piercers or centers and being formed to impart the desired dished shape to the portion of the work-piece between its central portion and its marginal portion, and rolling mechanism for causing the work-piece at one side thereof to be formed to the shape of said forming-die and to roll the remainder of the work-piece including the rolling of the marginal or rim portion of the work-piece to desired lateral thickness and the outer peripheral face thereof to desired shape.

10. In an apparatus or mill of the kind described, means for rolling or forming car-wheels or other circular objects having each a hub, a dished web and a rim, comprising alined work-supporting axles arranged at opposite sides of a work-piece and having piercers or centers secured to adjacent ends thereof and adapted to pierce or penetrate and support or partly support a work-piece therebetween, said piercers or centers having piercing or centering portions and opposing shoulders of larger diameter than said piercing or centering portions to gage the length of the hub to be formed, a forming-die on one of said piercers or centers and having its forming-face shaped to conform to the dished shape of the finished object inside of the inner peripheral face thereof at the side engaged by said die, and rolling mechanism for causing the work-piece at the side thereof not engaged by said die to be rolled to desired shape, for rolling or forming metal at said last-mentioned side around one of said piercers or centers and against the shoulder thereof, for forcing metal at the first-mentioned or die-side of the work-piece over and around the other piercer or center and against the shoulder thereof, and for rolling the remaining surfaces of the work-piece including the rolling of the marginal or rim portion of the work-piece to desired lateral thickness and the outer peripheral face thereof to desired shape.

11. In an apparatus or mill of the kind described, means for rolling or forming car-wheels or other circular objects having each a hub, a dished web and a rim, comprising a pair of alined work-supporting axles arranged at opposite sides of a work-piece and having piercers or centers secured to adjacent ends thereof, said piercers or centers having piercing or centering portions and shoulders of larger diameter than said piercing or centering portions to limit the extent of penetration of said piercers or centers into the work-piece, a forming-die on one of said piercers or centers and having its forming-face shaped to form the work-piece to dished form, said forming-die being arranged at one side of the work-piece, a side roll or rolls at the other side of the work-piece adapted to roll the work-piece against the forming-face of said forming-die so as to cause the first-mentioned or die-side of the work-piece to be formed to the shape of said die and to roll said other side of the work-piece to desired shape, and a peripheral face roll or rolls coacting with said side roll or rolls to roll the marginal or rim portion of the work-piece as desired.

12. Rolling mechanism comprising a forming-die having its forming-face shaped to form an annular depression in a work-piece and being centrally and rotatably supported, a side roll spaced from the forming face of said forming-die and being adapted to roll against one side of the work-piece and force the latter into and against said forming-die and over the peripheral edge of the same, an edging roll opposite a portion of said side roll, said side roll and said edging roll extending beyond the periphery of the work-piece, and a face roll positioned between the peripheral faces of the extended portions of said side roll and said edging roll and serving with said two last-mentioned rolls to roll the rim portion of the work-piece as desired.

13. In rolling mechanism, a forming-die having its forming-face bulged inwardly toward its axis and against which forming-face one side of a work-piece is adapted to be forced, opposite side rolls, and a face roll against opposite sides of which said side rolls rotate, one of said side rolls serving to rotate or assist in rotating said forming-die and the other side roll being adapted to roll in contact with the work-piece to cause the die-side thereof or the side thereof engaged by said forming-die to be formed to the shape of said forming-die and to roll the other side thereof not in contact with said forming-die to desired shape and cause the marginal portion of the work-piece to be extended beyond the peripheral edge of said forming-die, said first-mentioned side roll being adapted to roll in contact with said forming-die and with the extended marginal portion of the work-piece at said die-side thereof and to coact with said other side roll and with said face roll to roll the marginal portion of the work-piece as desired.

14. In rolling mechanism, a forming-die adapted to impart a dished shape to the work-piece, and rolls adapted to act against all surfaces of the work-piece out of contact with said forming-die, at least one of said rolls serving to roll the work-piece against and into said forming-die and beyond the peripheral edge of the latter to permit the remaining rolls to act against the peripheral face of the extended marginal portion and one side thereof for rolling said marginal portion to the desired lateral thickness and the outer peripheral face thereof to desired shape.

15. In an apparatus or mill of the kind described, a pair of alined longitudinally movable and rotatable work-supporting means between which a work-piece is to be positioned, a forming-die having its forming-face shaped to form the work-piece to dished form and being mounted or supported on one of said work-supporting means, said forming-die being adapted to be engaged by said work-piece and both being adapted to be rotated during the operating process, a side roll or rolls adapted to force or roll said work-piece against said die to cause one side of the work-piece to be formed to the shape of the forming-face of said die and to roll the other side of the work-piece to desired shape, and rolls coacting with said side roll or rolls for rolling the marginal portion of the work-piece to desired lateral thickness and the outer peripheral face thereof to desired shape, said side roll and at least one of said coacting rolls also acting to rotate both said forming-die and said work-piece.

16. In an apparatus or mill of the kind described, a pair of alined work-supporting axles between which a work-piece is to be supported, a forming-die at one side of the work-piece of smaller diameter than the article to be rolled is to be when finished and having its forming face formed to provide a dished web in the finished article, a side roll at the other side of the work-piece adapted to force the work-piece against said die and cause the work-piece at the side thereof engaged by said die to be formed to the shape of said die and to roll said other side to desired shape and cause the metal of the work-piece to be extended radially beyond the peripheral edge of said die, a second side roll at said side of the work-piece engaged by said die adapted to act against the extended marginal portion of the work-piece, and a face roll positioned between said side rolls and in contact with the peripheral faces of the latter and acting with said side rolls to roll the extended marginal portion of the work-piece to desired shape and the metal thereof to uniform density, or substantially so.

17. In an apparatus or mill of the kind described, a pair of longitudinally movable alined work-supporting axles having means or being formed at adjacent ends thereof to engage a work-piece and between which a work-piece is to be positioned, a forming-die carried by one of said axles and arranged at one side of said work-piece, said forming-die having parts of its forming face formed inclined to a plane arranged at right angles to the axis of said forming-die, and a roll or rolls arranged at the other side of said work-piece and adapted to act against the same and cause the work-piece to be forced against said die while being rolled so as to impart to said side engaged by said die the shape of said die.

18. An apparatus or mill of the kind described having means to engage and pierce or penetrate a work-piece at opposite sides thereof at the center of its outer portion or periphery and rotatably support, or partly support, the same, a forming-die at one side of said work-piece extending to the inner peripheral face of the rim of the work-piece at said one side thereof when finished and having its forming face formed to shape the work-piece to dished form, and rolls acting against all exposed surfaces of the work-piece to roll the rim of the work-piece to desired lateral thickness and the outer peripheral face thereof to desired shape, at least one of said rolls causing the work-piece to be formed to the shape of said forming-die.

19. In an apparatus or mill of the kind described, the combination of means for centrally and rotatably supporting a work-piece, a forming-die having a central hub-forming cavity and an inclined forming face extending from said cavity to its peripheral edge, a combined die-supporting and edge rolling roll co-acting with said forming die and adapted to roll the marginal or rim portion of the work-piece at the side thereof, an edging and web reducing roll adapted to work against the opposite side of the work-piece from its peripheral portion toward its center or hub portion to forcibly press the work-piece against said forming-die and into the hub-forming cavity thereof for causing the work-piece at the side thereof engaged by said die to be formed the shape of said die and for reducing the thickness of the work-piece and dishing the same within a certain circular region extending from its marginal portion toward its center or hub portion so as to cause metal to flow toward the axis or hub portion of the work-piece at the side thereof engaged by said edging and web reducing roll.

20. In an apparatus or mill of the kind described, the combination of means for centrally piercing or penetrating and supporting a work-piece and having piercers or centers provided with circumferential flanges spaced from the sides of the supported work-piece, a forming-die carried by one of said piercers or centers and having a hub-forming cavity and an inclined forming face extending outwardly from said cavity, a combined die-supporting and edge rolling roll co-acting with said forming-die and adapted to roll the marginal or rim portion of the work-piece at the side thereof engaged by said die, an edging and web reducing roll adapted to work against the opposite side of the work-piece from its peripheral portion toward its center or hub portion to forcibly press the work-piece into dished form against said forming-die and into the hub-forming cavity thereof and against the circumferential flange of the piercer or center carrying said forming-die and for causing metal of the work-piece to flow toward the axis or hub portion of the work-piece and laterally against the circumferential flange of the piercer or center on that side of the work-piece engaged by said edging and web reducing roll.

21. In rolling mechanism two coöperating members, one a forming-die arranged at one side of a work-piece and having its forming face in part formed inclined to a plane at a right angle to the axis thereof, said forming-die having its outer peripheral edge adapted to determine the location of the inner peripheral face of the rim of said work-piece when finished at the side thereof engaged by said die, and the other a rolling member arranged at the side of the work-piece not engaged by said die and adapted to roll said work-piece against said forming-die to form said first-mentioned side of the work-piece to the shape of said forming-die and to roll the side of the work-piece not engaged by said die to desired shape.

22. In rolling mechanism for rolling car wheels or other circular objects having each a hub, a dished web and a rim, three coöperating members, one a forming-die arranged at one side of a work-piece and having its forming face in part formed inclined to a plane at a right angle to the axis thereof, said forming-die having also an annular marginal forming surface in a plane passing circumferentially through said die and surrounding the inclined portion of said forming-face and adapted to form the side of the rim of said work-piece or of the rim of the car wheel or other article at the side thereof engaged by said die, the second a rolling member arranged at the other side of the work-piece and adapted to roll said work-piece against said forming-die to form said first-mentioned side of the work-piece to the shape of said forming-die and to roll said other side to desired form, and the third a face roll for rolling the peripheral face of the work-piece.

23. In an apparatus or mill of the kind described, means for centrally and rotatably supporting a work-piece, a forming-die at one side of the work-piece adapted to form said side of the work-piece from its rim inwardly only, said forming-die being shaped to form the web portion of the work-piece dished or conical as desired, and means for rolling all remaining exposed surfaces of the work-piece.

24. In an apparatus or mill of the kind described, combined die and roll forging mechanism coöperating to form a blank or other work-piece into the form of a car wheel or similar article having a hub, a dished web and a rim, and means for centrally and rotatably supporting said work-piece, said mechanism comprising a forming-die and rolls, said forming-die having a central hub-forming cavity and an inwardly bulging forming face and being provided with an inclined peripheral edge, said forming-die being positioned at one side of the work-piece, and said rolls being adapted to roll against the other side of the work-piece to force the work-piece against and into said forming-die and around the inclined peripheral edge of the latter and to roll said other side of the work-piece to desired shape including the rolling of the rim portion thereof to desired lateral thickness and the other peripheral face thereof to desired shape.

25. In an apparatus or mill of the kind described, a pair of alined axles having means or being formed at adjacent ends thereof to engage a work-piece and between which means or ends a work-piece is adapted to be positioned, a forming-die carried by one of said axles and having one face thereof provided with an inclined portion and its other face with a circular track, a rolling roll having a portion entering said track and a portion adapted to roll the work-piece outwardly from the peripheral edge of said forming-die, a rolling roll at the side of the work-piece not engaged by said die adapted to force the work-piece against said forming-die and over the peripheral edge thereof and to roll said side of the work-piece not engaged by said die to the form of a hub portion, a rim portion and a dished web portion, said rolls acting in opposition to each other to condense the metal in said rim portion, and a face roll between said rolls acting against the peripheral face of the work-piece to form the same to desired shape and to assist in condensing the metal in said rim portion.

26. In an apparatus or mill of the kind described, a pair of alined work-supporting axles having means or being formed at adjacent ends thereof to centrally engage, pierce or penetrate a work-piece at opposite sides thereof, an edging or web rolling roll operating against one side of the work-piece, an edging roll at the opposite side thereof, a face roll to roll the peripheral face of the work-piece, a forming-die at said opposite side of the work-piece having its forming face shaped to dish the work-piece and against which the work-piece is forced by said edging and web rolling roll, and means for moving said work-supporting axles and said forming-die together longitudinally.

27. In an apparatus or mill of the kind described, a pair of work-supporting axles adapted to rotatably support a work-piece, a forming-die supported by one of said axles, a roll or rolls adapted to rotate and press the work-piece against said forming-die and thus shape opposite sides of the work-piece at its central and at its marginal portion to desired form and at the annular intermediate portion to dished form, and a peripheral face roll or rolls adapted to operate against the peripheral face of the work-piece and coöperate with said first-mentioned roll or rolls and with the marginal portion of said die to work the metal in the marginal portion of the work-piece to uniform, or substantially uniform density.

28. In an apparatus or mill of the kind described, a pair of rotatable work-supporting axles adapted to rotatably support a work-piece, a forming-die carried by one of said axles and having its forming face shaped to form the work-piece to desired form, a pair of combined die-supporting and edging rolls engaging said forming-die at opposite sides of its axis, a side roll adapted to force one side of said work-piece against said forming-die to impart the form thereof to one side of said work-piece and to roll metal at the opposite side of the work-piece toward the axis thereof and also over the peripheral edge of said forming-die and against at least one of said combined die-supporting and edging rolls, and a peripheral face roll between said last-mentioned roll and said side roll and in contact therewith, said face roll being adapted to roll the peripheral face of the work-piece to desired form.

29. In an apparatus or mill of the kind described, the combination of a forming-die, rolling rolls including a peripheral face roll or rolls co-acting therewith to form or roll a work-piece into the form of a car wheel or other circular object having a dished web and a rolled outer peripheral face, and rotatable means supporting said forming-die and resisting both lateral and opposite radial movements thereof.

30. In an apparatus or mill of the kind described, a longitudinally movable work-supporting member with one end of which one side of a work-piece is to be pierced or centered, a forming-die at the same side of said work-piece having a central hub-forming cavity and having the trend of its forming face at an angle to a plane at right angles to the axis of said die, means for axially moving said work-supporting member in both directions independently of said die to form a rudimentary bore or a part thereof axially in said work-piece at the side thereof engaged by said die, and a rolling roll or rolls adapted to cause metal of the work-piece to enter said hub-forming cavity and roll the work-piece against said forming-die in dished form from said cavity outwardly.

31. In an apparatus or mill of the kind described, a work-supporting axle having a center or piercer, a forming-die between which and said center or piercer a work-piece is adapted to be positioned to be rolled into a car wheel or other circular object having a rim portion and a dished web portion, a pair of opposite side rolls, one of said rolls being adapted to force the work-piece against said forming-die and to extend the metal radially over and beyond the peripheral edge of said die, said roll being also adapted to reduce the metal inwardly from said extended portion and roll the same to dished form, the extended portion of the metal being adapted to be rolled at opposite sides by said pair of rolls, and a face roll having its axis parallel or substantially parallel with the axis of the work-piece and having a total width which determines the final width of said rim portion and against which said pair of rolls are adapted to rotate, said side rolls and said face roll co-acting to roll the entire rim portion to uniform density or practically so.

32. In an apparatus or mill of the kind described, a pair of alined rotatable supporting axles having means or being formed at adjacent ends thereof to engage a work-piece and between which means or ends a work-piece is adapted to be positioned, a forming-die carried by one of said axles and having a central hub-forming cavity, a web-forming portion inclined from said hub-forming cavity outwardly and an inner rim-face forming portion of greater inclination than said web-forming portion, combined die-supporting and edging rolls in contact with said forming-die and having their edging roll parts extending outward radially from the peripheral edge of said forming-die, an edging and web rolling roll opposite one of said die-supporting and edging rolls and adapted to roll in contact with the work-piece to force metal thereof into said hub-forming cavity and to force the work-piece against the web-forming portion and also to force metal radially beyond the peripheral edge of said forming die and roll the side of the work-piece engaged thereby to desired shape, and a face roll adapted to act against the peripheral face of the work-piece and against which said last-mentioned die-supporting and edging roll and said edging and web rolling roll rotate, said face roll having its axis parallel or approximately parallel with the axis of the work-piece, and all of said rolls co-acting to govern the thickness of said rim and to roll the entire rim portion to uniform density, or approximately so.

33. An apparatus or mill of the kind described, comprising a rotatable forming-die against which a work-piece is to be rolled, said die and work-piece having their axes coincident and said die having its forming face shaped to cause the work-piece to be formed as desired, a side roll adapted to roll the work-piece at the side thereof not engaged by said forming-die, and rolling means coöperating with said side roll and together they surround or partly surround the marginal portion of the work-piece to roll said marginal portion to desired lateral thickness and the outer peripheral face thereof to desired shape.

34. In an apparatus or mill of the kind described, the combination of a pair of alined axles having piercers or work-supporting centers at adjacent ends for supporting, or partly supporting, a work-piece to permit of its being rotated, a pair of side rolls at opposite sides of the work-piece at one side of its axis, a second pair of side rolls at opposite sides of the work-piece at the other side of its axis, a forming-die against which the work-piece is forced by one of each pair of said rolls and which is also rotatably supported by the other of each pair of said rolls, said forming-die having a portion of its forming face shaped to form the work-piece to dished form, one roll of one of said pairs of rolls being adapted to act against the side of the work-piece not engaged by the forming-die to roll the work-piece with a hub, a dished web and a rim portion extending beyond the peripheral edge of said forming-die, the mating roll co-acting with said last-mentioned roll being adapted to roll against the rim portion of the work-piece opposite said last-mentioned roll, and a face roll adapted to act against the peripheral face of the work-piece and being positioned between said two last-mentioned rolls.

35. In an apparatus or mill of the kind described, a rotatable forming-die, a side roll between which and said forming-die a work-piece is to be rolled or formed, means for rolling the peripheral face of the work-piece to desired shape, and means for rolling the side of the marginal portion of the work-piece opposite said side roll, said forming-die and side roll having their opposing faces formed to roll or form the portion of the work-piece between the central and marginal portion to desired or dished form.

36. In an apparatus or mill of the kind described, a rotatable forming-die having a central hub-forming cavity and a forming face extending from said cavity to the peripheral edge of the die shaped to form the work-piece to desired form, a pair of rolls adapted to support said forming-die and to act with said die to form one side of said work-piece, a roll at the opposite side of the work-piece co-acting with said forming-die and said pair of rolls to roll the work-piece with a dished web and a marginal portion having opposite lateral extensions, and a face roll coacting with all of the aforesaid rolls and when in normal position having its axis parallel with the axis of the work-piece, or approximately so.

37. Rolling mechanism, comprising a forming-die having its peripheral edge formed conical and having that portion of its forming face extending inwardly from said peripheral edge formed at an angle to a plane at a right angle to the axis of the work-piece, a die-supporting and edge rolling roll having its axis parallel with or inclined to the side of the work-piece, and an edging and web rolling roll opposed to said forming-die and said die-supporting and edge rolling roll, said edging and web rolling roll having a web rolling part whose inner rolling or operating portion is formed sufficiently conical to roll the inner circumferential face of the rim of the work-piece with the aid of said forming-die and said die-supporting and edge rolling roll sufficiently inclined outwardly toward the peripheral face of the work-piece to cause metal in the rim to flow in the proper direction to assure compression of the metal to uniform or approximately uniform density, substantially as described.

38. In an apparatus or mill of the kind described, the combination of a forming-die, a rolling roll between which and said die a work-piece is to be rolled, said die and roll having each portions inclined to a plane at right angles to the axis of said die, a combined die-supporting and edging roll co-operating with said rolling roll to jointly roll opposite sides of the marginal portion of the work-piece, and rolling means for rolling the peripheral face of the work-piece to desired form.

39. In an apparatus or mill of the kind described, the combination of a forming-die having its forming face shaped to dish the work-piece, or to form the work-piece to desired form, a pair of rolls rolling in contact with said forming-die to support the same, at least one of said rolls being a positively driven roll and at least one of said rolls being adapted to roll against the side of the rim portion of the work-piece at the side thereof engaged by said die, a pair of rolls at the other side of the work-piece, at least one of said last-mentioned rolls being adapted to roll said work-piece against said forming-die and to act against the other side of said rim portion, and a pair of face rolls acting against the peripheral face of the work-piece at different points thereof and adapted to co-act with said two pairs of rolls to roll the rim portion of the work-piece to desired form.

40. Rolling mechanism for rolling or forming car wheels or similar objects having each a dished web and a rim extending laterally from opposite sides of said web, comprising a forming-die having its forming face bulged inwardly from its peripheral edge and against which a work-piece is adapted to be rolled to cause said work-piece to be dished, a pair of rolls rolling in contact with said forming-die and at least one of said rolls being a positively driven roll and adapted to roll against the side of the marginal portion of said work-piece at the side thereof engaged by said die, a pair of rolls rolling against the work-piece in opposition to said die and to said first-mentioned pair of rolls and each having a portion shaped to correspond with the forming face of said die, at least one of said last-mentioned rolls being a positively driven roll, and a pair of face rolls between opposed rolls of said two pairs of rolls.

41. Rolling mechanism for rolling or forming a car wheel or similar object having a dished web and a rim extending laterally from opposite sides of said web, comprising a forming die having its forming face shaped to cause dishing of the work-piece, or to cause forming of the work-piece to desired form, a pair of die-supporting rolls rolling in contact with the face of said die opposite said forming face, at least one of said supporting rolls being a positively driven roll, said die and supporting rolls being arranged at one side of the work-piece and at least one of said supporting rolls having an edge rolling part, said supporting rolls being positioned at opposite sides of the axis of said die, a positively driven edging and web rolling roll opposite the die-supporting roll provided with an edge rolling part and being adapted to roll the work-piece against said forming-die to cause one side thereof to be formed to the shape of said die and to roll the corresponding portion of the work-piece at the other side thereof to desired shape, a positively driven edging and web finishing roll opposite the other die-supporting roll adapted to roll the inner-rim-face and adjacent web portion of said other side, a peripheral face rolling roll between said edging and web rolling roll and the opposite die-supporting roll, and a face finishing roll between said edging and web finishing roll and the other die-supporting roll.

42. In an apparatus or mill for rolling car wheels or other circular bodies, the combination of a forming-die having a portion of its forming face trending to a plane at a right angle to the axis of said die and against which a work-piece is to be rolled, a support having a supporting portion on which said die is mounted, a pair of loosely mounted rolls carried by said support and adapted to act against the outer face of said die at opposite sides of its axis, a pair of side rolls arranged at the side of the work-piece not engaged by said forming-die and being positioned at opposite sides of the axis or extended axis of the work-piece or forming die, one of said side rolls being adapted to extend metal of the work-piece outwardly over and beyond the peripheral edge of said forming-die, and a pair of peripheral face rolls acting together or independently of each other to roll the outer peripheral face of the extended or marginal portion of the work-piece.

43. An apparatus or mill for rolling or forming car wheels or other circular bodies comprising a pair of alined work-supporting axles having means or being formed at adjacent ends thereof to engage a work-piece and between which means or ends a work-piece is adapted to be positioned, a forming-die carried by one of said axles and having a central hub-forming cavity and a forming face extending outwardly from said cavity and arranged at an incline to a plane at a right angle to the axis of said die, a die-supporting roll engaging the outer face of said die at one side of its axis and having an edging roll part extending over the peripheral edge of said die, a side roll opposite said die-supporting roll adapted to work metal of the work-piece into said hub-forming cavity, roll the work-piece against the remaining portion of the die and force metal thereof outwardly over and beyond the peripheral edge of said die and in contact with the edging roll part of said die-supporting roll, a face rolling roll between said edging roll part of said die-supporting roll and said side roll adapted to act against the peripheral face of the work-piece to roll said face to beaked or rudimentary form and being in contact with the opposite peripheral faces of said edging roll parts of said die-supporting roll and said side roll, and a face finishing roll engaging the peripheral face of the rim portion when so rudimentarily formed by said side roll, said face rolling roll and said edging roll part, said face finishing roll rolling said rim portion to finish.

44. An apparatus or mill for rolling or forming car wheels or other circular bodies comprising a pair of alined work-supporting axles between which a work-piece is adapted to be supported, a forming-die carried by one of said axles and having a conical forming portion at its peripheral edge and adjacent thereto having a forming face adapted to cause dishing or forming of a portion of the work-piece, a die-supporting roll rolling in contact with said die at one side of its axle and extending beyond the peripheral edge of said die, a rolling roll opposite said die-supporting roll adapted to roll the work-piece against said die to cause one face thereof to be formed to the shape of said die and to cause metal of the work-piece to be rolled outwardly over and beyond the peripheral edge of said die, and a peripheral face rolling roll acting against the peripheral edge of the work-piece, said rolls acting together to force the metal in the rim toward each other and toward the conical portion of said die so as to compress the metal in said rim to uniform or practically uniform density substantially as described.

45. An apparatus or mill for rolling or forming car wheels or other circular bodies comprising a rotatably supported forming-die shaped to form a central extension or hub-portion, a laterally extending rim portion and a depressed inclined intermediate portion at one side of a work-piece, an edging and die-supporting roll, and a side roll spaced from said die, said die and side roll being relatively movable to approach one another and being adapted to have a work-piece positioned therebetween, said side roll being adapted to roll or force the work-piece against said die and against the edging roll portion of said edging and die-supporting roll and to roll a central extension or hub portion, a laterally extending rim portion and a depressed inclined intermediate portion at the other side of the work-piece.

46. In an apparatus or mill for rolling or forming car wheels or other circular bodies, a rotatably mounted forming-die, a forming-roll having a peripheral forming face co-acting with said die to roll a work-piece between said die and roll with a dished web and a laterally extended rim, and means for rolling the opposite sides of the rim of said work-piece.

47. In an apparatus or mill of the kind described, a rotatable forming-die, a forming roll having a peripheral forming face coacting with said die to roll a work-piece between said die and forming roll with a dished web and with a rim, and rolls co-acting with said forming roll to roll said rim to desired lateral thickness and to force metal of said rim against the peripheral edge of said die.

48. In an apparatus or mill of the kind described, a rotatable forming-die, a forming roll having a portion of its peripheral face co-acting with said die to roll a work-piece between said die and forming roll to dished form and to extend metal of the work-piece radially over the peripheral edge of said die, said forming roll having a second portion of its peripheral face shaped to roll the side of said extended rim portion at the side of the work-piece, engaged by said forming-roll, an edging roll adapted to roll the side of said extended rim portion at the side of the work-piece rolled over the peripheral edge of said die, and a face roll rolling in contact with the peripheral face of the work-piece.

49. An apparatus or mill of the kind described comprising a forming-die over which a portion of one side of a work-piece is adapted to be formed to dished shape, and rolls arranged in a plane extending laterally through the work-piece and co-acting to roll the remainder of said side, the peripheral face and the opposite side of the work-piece to desired shape, at least one of said rolls being adapted to roll the work-piece against the peripheral portion of said die.

50. An apparatus or mill of the kind described comprising a forming-die having a central hub-forming cavity and a forming face inclined from said cavity to the peripheral edge of said forming-die, said forming die being adapted to have a work-piece rolled against and into the same and also over the peripheral edge thereof so as to form one side of the work-piece with a hub portion and a dished web portion and also to form the inner peripheral face of the rim portion at said side of the work-piece, and a plurality of rolls arranged in a plane passing laterally through the work-piece and adapted to surround the remainder of said rim portion, at least one of said rolls being adapted to act against the opposite side of the work-piece to roll the same from its outer peripheral face inwardly toward its axis.

51. An apparatus or mill of the kind described comprising means for centrally and rotatably supporting a work-piece, a plurality of rolls arranged in a plane passing laterally through the work-piece and adapted to completely roll one side of the work-piece, the side of the rim portion at the opposite side of the work-piece and the peripheral edge or peripheral face of the work-piece, and a forming-die co-axial with said supporting means and having its forming surface co-acting with one of said rolls to form the remainder of said opposite side, said last-mentioned roll rolling the region of the work-piece between its central and rim portions to dished form.

52. In rolling mechanism, a forming-die, a side roll coöperating with and spaced from said die and between which and said die a work-piece is to be rolled, and a straight peripheral faced edging roll extending outwardly from the peripheral edge of said die, said edging roll and a portion of said side roll co-acting to roll opposite sides of the rim portion of the work-piece in planes at right angles to the axis of the same, a second portion of said side roll and the forming face of said die co-acting to roll or form the portion of the work-piece adjacent said rim portion at an angle to the opposite sides of said rim portion.

53. In rolling mechanism, the combination of a forming-die having a central hub-forming cavity and a forming face sloping from said cavity toward the peripheral edge of said die, said forming-die being adapted to have a portion of one side of a work-piece rolled thereagainst, and a plurality of rolls arranged in a plane extending laterally through the work-piece and having their peripheral rolling faces in contact with the work-piece to roll the remainder of said side, the peripheral face or edge and the opposite side of the work-piece to desired shape, including a dished web.

54. An apparatus or mill of the kind described, comprising a forming-die having a central hub-forming cavity and a sloping forming face extending from said cavity toward the peripheral edge of said die, means for rotatably supporting, or partly supporting, a work-piece in contact with said die, a pair of side rolls spaced from said die and arranged at opposite sides of the axis or extended axis of said die, one of said side rolls serving to force metal of the work-piece into said hub-forming cavity and acting to form a hub portion on the work-piece at the side of the work-piece engaged thereby and to form the inner region of the web portion and also roll metal of the work-piece outwardly over and beyond the peripheral edge of said die, the other side roll acting to roll the outer region or the remainder of the web portion at the side of the work-piece engaged thereby, and a face roll or rolls adapted to roll in contact with the outer peripheral face or edge of said rim portion.

55. An apparatus or mill of the kind described, comprising a forming-die, a pair of longitudinally adjustable side rolls spaced from said die and between which and said die a work-piece is to be rolled, each of said side rolls being adapted to roll a different radial portion of the work-piece, and a face roll adapted to roll the outer peripheral face of the work-piece.

56. An apparatus or mill of the kind described, comprising means for centrally and rotatably supporting a work-piece, a forming-die rotatable with said supporting means, a pair of side rolls arranged at opposite sides of said supporting means, one of said side rolls being adapted to roll or form a hub and the adjacent web portion of the work-piece and the other being adapted to roll or form the web portion of the work-piece adjacent to the rim, and a pair of face rolls adapted to roll the peripheral face of the work-piece first to beaked or rudimentary form and then to finished form.

57. An apparatus or mill of the kind described, comprising a pair of alined rotatable work-supporting axles having means or being formed at adjacent ends thereof for centrally and rotatably supporting or partly supporting a work-piece, a forming-die carried by one of said axles and having a central hub-forming cavity, a pair of die-supporting rolls at opposite sides of the axis of said die, at least one of said die-supporting rolls having an edging roll part extending outwardly from the peripheral edge of said die, a pair of side rolls adjustable radially with respect to the work-piece and arranged at opposite sides of the axis of the work-piece, a peripheral face roll arranged between one of said side rolls and the edging roll part of said last-mentioned die-supporting roll, one of said side rolls being adapted to roll or force metal of the work-piece into said hub-forming cavity and to roll the inner web portion and the hub portion at the side of the work-piece engaged thereby and also force metal of the work-piece outwardly beyond the peripheral edge of said forming-die against said peripheral face roll and against the edging roll part of said die-supporting roll, the other side roll acting with said forming-die to roll the outer portion of the web and the adjacent inner peripheral face of the rim to desired shape.

58. An apparatus or mill of the kind described, comprising a pair of alined rotatable work-supporting axles for rotatably supporting a work-piece, a forming-die carried by one of said axles, a pair of die-supporting rolls, a pair of peripheral face rolls, and a pair of side rolls, all of said rolls being arranged in a plane passing laterally through the work-piece and forming-die and the rolls of each pair being at opposite sides of the axis or extended axis or at opposite sides of the central portion of the work-piece, at least one of said die-supporting rolls having an edging roll part between which and the opposite side roll one of said face rolls is positioned, the other face roll being positioned between the other side roll and the opposite die-supporting roll, one of said side rolls being adjusted to roll the web and to form a hub and also roll metal of the work-piece outwardly over and beyond the peripheral edge of said die, against the edging roll part of one of said die-supporting rolls and against one of said face rolls, the other side roll co-acting with said die and the other face roll and the other die-supporting roll to roll the inner peripheral face of the rim and adjacent web portion and the outer peripheral face of the rim to finished form.

59. An apparatus or mill of the kind described, comprising a pair of alined rotatable work-supporting axles for centrally and rotatably supporting a work-piece, a forming-die carried by one of said axles and having a central hub-forming cavity and a forming face sloping from said cavity toward the peripheral edge of said die, a pair of die-supporting rolls in contact with said die at opposite sides of its axis, a pair of side rolls at opposite sides of the axis of the work-piece between which and said die the work-piece is to be rolled, at least one of said die-supporting rolls having an edging roll part extending outwardly from the peripheral edge of said die, a peripheral face forming or peripheral face rolling roll between and in contact with the edging roll parts of one of said die-supporting rolls and one of said side rolls, said last mentioned side roll being adapted to force metal of the work-piece into said hub-forming cavity, to roll the hub portion at the side of the work-piece engaged thereby, to roll the inner portion adjacent said hub portion including the rolling or forming of the web portion and to roll metal of the work-piece outwardly over and beyond the peripheral edge of said die against said edging roll part of said die-supporting roll and against said face forming or face rolling roll, and with the aid of said edging roll part roll the rim so formed to desired lateral thickness, a peripheral face finishing roll between and in contact with the sides of the other side roll and the opposite die-supporting roll, said second side roll being adapted to roll the inner peripheral face of the rim and adjacent web portion to finish and with said face finishing roll roll the peripheral face of the work-piece to finished form.

60. An apparatus or mill of the kind described, comprising a forming-die having a central hub-forming cavity and against and into which metal of a work-piece is to be rolled or forced, and a pair of side rolls between which and said die the work-piece is to be positioned, one of said side rolls being adapted to roll or form the central portion, the web, and lateral side of the rim of the work-piece, and the other side roll being adapted to roll the inner peripheral face of the rim and adjacent web portion to finished form.

61. An apparatus or mill of the kind described, comprising a forming-die having a sloping forming face, and a pair of side rolls spaced from said forming-die and between which and said die a work-piece is to be rolled or formed, said side rolls being arranged at opposite sides of the axis of the work-piece and having inclined rolling portions which when in final operating positions corresponding to the slope of the forming-face of said die so as to roll the web of the work-piece to dished form, one of said side rolls having an edging roll portion adjacent its web rolling portion and being adapted to roll the inner region of the work-piece including the hub and the adjacent web portion and the portion of the work-piece between said web rolling portion and the periphery of the work-piece, and the other being adapted to roll the inner peripheral face of the rim portion and the remainder of the web portion to finished form.

62. An apparatus or mill of the kind described, comprising a forming-die having a sloping forming-face, an edging roll extending outwardly from the peripheral edge of said die and with said die serving to form one side of a work-piece, a side roll arranged radially with respect to said die at the side of the work-piece not engaged by said die and, when in final operating position extending outwardly beyond the peripheral edge of said die a distance equaling or approximately equaling the length of said edging roll, said side roll having an inclined or conical rolling portion whose peripheral face when in final operating position corresponds or approximately corresponds with the slope of the forming-face of said die at one side of its axis, and a peripheral face roll against opposite sides of which said side roll and said edging roll rotate, all combined to roll the work-piece with a hub, a dished web and a rim.

63. An apparatus or mill of the kind described, comprising a forming-die having a sloping forming face, and a side roll between which and said die a work-piece is to be rolled, said side roll having an edging roll part, a hub end face rolling part and an intermediate conical part having a peripheral face whose inclination when in final operating position corresponds with that of the forming face or with a part thereof of said die.

64. An apparatus or mill of the kind described, comprising a pair of alined longitudinally movable rotatable work-supporting axles having means or being formed at adjacent ends thereof to engage a work-piece, a forming-die mounted on one of said axles to permit relative axial movement of said axle and die, said die having a sloping forming face, means for causing relative axial movement of said axle and die, and a side roll movable toward and from said die and between which and said die a work-piece is to be rolled, all being combined to permit said roll to force the work-piece against said die and over the end means or end of the axle supporting said die or to cause the end means or end of said axle to penetrate the work-piece by moving said axle axially independent of said die.

65. An apparatus or mill of the kind described, comprising a pair of alined longitudinally movable rotatable work-supporting axles, a forming-die having a hub-forming cavity and a sloping forming face extending outwardly from said cavity, said forming-die being mounted on one of said axles, means for causing relative axial movement of said axles whereby a work-piece is axially pierced or penetrated to desired depth from the side thereof next to said die, and a side roll movable toward and from said die and between which and said die the work-piece is to be rolled, said side roll having a conical rolling portion whose peripheral face when in final operating position corresponds with the slope of the forming face of said die whereby the web of the work-piece is caused to be rolled to dished form.

66. In an apparatus or mill for rolling or forming car wheels or other circular bodies, a pair of side rolls having their axes parallel with or inclined to a plane passing circumferentially through the work-piece at one side of its axis, a peripheral face beaking or peripheral face rolling roll arranged between said side rolls, and a forming-die, one of said side rolls being formed with a die-supporting portion adapted to laterally support said forming die at one side thereof and with an edging roll portion adapted to operate against the portion of the work-piece which extends over the peripheral edge of said die at the side of the work-piece next to said die, the other side roll being adapted to operate against the other side of the work-piece and being formed with a hub end rolling portion adapted to operate against the end portion of the hub at said last-mentioned side and with a web rolling or forming portion which is adapted to reduce, or roll, or form the web to desired form or shape and to desired thickness and an edging roll portion which is adapted to operate against the portion of the work-piece between the said web rolling or forming portion of said last-mentioned roll and the periphery of the work-piece, said peripheral face beaking or peripheral face rolling roll being adapted to operate against the peripheral face of the work-piece and the marginal portion of said face beaking or face rolling roll having a lateral thickness or total width which is the same as is the lateral thickness or width which the marginal or rim portion of the object which is to be rolled from said work piece is to have.

67. In an apparatus or mill for rolling or forming car wheels or other circular bodies, the combination of a roll or rolls, a rotatably supported forming-die adapted to form the central part of the work-piece at one side thereof by the action of a roll or rolls, a roll or rolls having a portion or portions thereof formed so as to support or partly support said die at one side thereof, the actual forming portion of said forming die reaching only to the inner peripheral face of the rim of the car wheel or other body at one side thereof when finished and being shaped to conform to the center or hub part, the rudimentary bore or a part thereof, the dished web part and the inner circumferential face of the rim portion of the finished rolled or formed dished car wheel or other circular dished body at one side thereof.

68. In an apparatus or mill for rolling or forming car wheels or other circular bodies, a pair of opposite side rolls, a rotatable forming-die arranged together with the work-piece between said side rolls, said side rolls extending beyond the periphery of said forming-die and over the opposite sides of the marginal or rim portion of the work-piece extending over the periphery of said forming-die during the operating process.

69. In an apparatus or mill for rolling or forming car wheels or other circular objects, an edging and web rolling roll which consists of an edging roll portion and a web rolling or forming or reducing portion and a hub end face rolling portion, said hub end face rolling portion being adapted to roll or form the hub of the work-piece to its desired finished length and said edging roll portion being adapted to roll or form the rim of the work-piece to its desired finished lateral width and said web rolling portion being adapted to roll or form the web portion to its desired thickness and form, and a face roll adapted to act against the peripheral face of the work-piece and against part of one of the opposite sides of which said edging and web rolling roll is adapted to rotate.

70. In an apparatus or mill for rolling or forming car wheels or other circular objects, a forming die, an edging and die-supporting roll consisting of an edging roll portion and a die-supporting portion, said edging roll portion being adapted to roll or form one side of the rim of the work-piece and said die-supporting portion being adapted to laterally support one side of said forming die.

71. In an apparatus or mill for rolling or forming car wheels or other circular bodies, a rotatable forming die adapted to form the central portion at one side of the work-piece, and a face beaking or face rolling roll adapted to operate against the peripheral face of the work-piece, the marginal portion of said face roll having a lateral thickness or total width between its outer end faces which is the same as the lateral thickness or width which the marginal or rim portion of the car wheel or other object is to have when rolled to finish.

72. In an apparatus or mill for rolling or forming car wheels or other circular objects, a peripheral face beaking or face rolling roll adapted to act against the peripheral face of the work-piece, an edging and web rolling roll adapted to completely roll or form one side of the car wheel or other circular object and which consists of an edging roll portion, a web rolling and forming or reducing portion and a hub end-face rolling portion; combined with means between which and said edging and web rolling roll the work-piece is to be rolled or formed, said edging and web rolling roll being adapted to roll one side of the work-piece completely with the inner peripheral face of the rim rolled to desired rudimentary or to finished form, and said face beaking or face rolling roll being adapted to roll the peripheral face of the work-piece to rudimentary or to finished form.

73. In an apparatus or mill for rolling or forming car wheels or other circular objects, an edging and web rolling roll adapted to completely roll or form one side of the car wheel or other circular object and which consists of a hub end-face rolling portion, an edging roll portion and a web rolling and forming or reducing portion and between said hub end-face rolling portion and said edging roll portion being formed to roll the outer peripheral face of the hub and the entire web portion to finished form and the inner peripheral face of the rim portion to rudimentary or to finished form, and a face roll adapted to roll against the peripheral face of the work-piece and in contact with the edging roll portion of said edging and web rolling roll.

74. In an apparatus or mill for rolling or forming car wheels or other circular objects, an edging and web rolling roll adapted to completely roll or form one side of the car wheel or other circular object and which consists of a hub end-face rolling portion, an edging roll portion and a web rolling and forming or reducing portion, between said hub end-face rolling portion and said edging roll portion it is formed adjacent said edging roll portion so as to roll the inner peripheral face of the rim portion sufficiently conical to compress the metal in said rim portion to uniform or practically uniform density, and a face roll adapted to act against the peripheral face of the work-piece and in contact with the edging roll portion of said edging and web rolling roll.

75. In an apparatus or mill for rolling or forming car wheels or other circular objects, an edging and web rolling roll adapted to roll or form one side of the work-piece or car wheel or other object and having a portion thereof formed to roll the inner peripheral face of the rim portion at said side sufficiently conical so as to compress the metal in said rim portion during the operating process to uniform or practically uniform density substantially as described.

76. In an apparatus or mill for rolling or forming car wheels or other circular objects, an edging and web rolling roll having a web rolling and forming or reducing portion and an edging roll portion extending beyond the peripheral face of the work-piece, said web rolling and forming or reducing portion being formed to roll the side of the work-piece engaged thereby with an inclined inner peripheral rim face and with a sloping web portion terminating at said inclined rim face, and a face roll adapted to roll in contact with the peripheral face of the work-piece and against which said edging roll portion of said edging and web rolling roll rotates, said face roll being adapted to roll the peripheral face of the work-piece to rudimentary form and with said edging and web rolling roll act to compress the metal in the rim portion to uniform or to practically uniform density.

77. In an apparatus or mill for rolling or forming car wheels or other circular objects, a pair of side rolls arranged at opposite sides of the axis of the work-piece combined with means between which and said rolls the work-piece is to be rolled or formed, one of said side rolls being adapted to roll the work-piece at one side with a dished web-face and with a rudimentarily formed inner rim face, the other side roll being adapted to roll said inner rim face and the adjacent portion of the web face to finished form.

78. In an apparatus or mill for rolling or forming car wheels or other circular objects, the combination of a pair of side rolls arranged at one side of the work-piece and at opposite sides of the axis thereof and means between which and said side rolls the work-piece is to be rolled or formed, one of said side rolls being adapted to roll the work-piece at one side thereof with a dished web face and an inner rim face sufficiently inclined outwardly toward the peripheral face of the work-piece so as to cause the metal in the rim portion thereof during the operating process to flow in the proper direction to be compressed to uniform or practically uniform density, substantially as described, the other side roll being adapted to lengthen said web face and roll said inner rim face to finished form.

79. In an apparatus or mill for rolling or forming car wheels or other circular objects, the combination of a pair of side rolls arranged at one side of the work-piece and at opposite sides of the axis thereof, means between which and said side rolls the work-piece is to be rolled or formed, and peripheral face rolls adapted to roll in contact with or against the peripheral face of the work-piece at different points thereof, one of said side rolls being adapted for rolling or forming the web of the work-piece or car wheel or other circular object to dished form or similar form and with the aid of said means and one of said peripheral face rolls being adapted to roll the rim portion to rudimentary form, the other side roll being adapted with the aid of said means and the other peripheral face roll to roll said rim portion to finished form.

80. In an apparatus or mill for rolling or forming car wheels or other circular objects, a forming-die having its outer peripheral portion formed sufficiently conical so as to form the inner peripheral face of the rim of a work-piece sufficiently inclined outwardly toward the peripheral face of the work-piece to cause the metal in said rim portion during the operating process to flow in the proper direction so as to be compressed to uniform density or practically so, substantially as described.

81. In an apparatus or mill for rolling or forming car wheels or other circular objects, a forming-die and a rolling roll combining to roll or form a work-piece to dished form and to roll or form the inner peripheral faces of the rim portion of the work-piece or car wheel or other object sufficiently inclined to cause metal in said rim portion during the operating process to flow in the proper directions so as to be compressed to uniform density or practically so, substantially as described.

82. In an apparatus or mill for rolling or forming car wheels or other circular objects, a forming-die, a side roll between which and said forming-die a work-piece is to be rolled or formed, and a peripheral face roll, all combined to roll or face the work-piece with a dished web portion and opposite laterally extending rim portions having their inner peripheral faces rolled or formed sufficiently inclined outwardly toward the peripheral face of the work-piece to cause the metal in the rim thereof during the operating process to flow in the proper directions so as to be compressed to uniform or to practically uniform density, substantially as described.

83. In an apparatus or mill for rolling or forming car wheels or other circular objects, a forming-die having a web forming face shaped to form the web of the work-piece to dished form and having a conical marginal portion adapted to form the inner peripheral face of the rim at one side of the work-piece sufficiently inclined to cause the metal in the rim during the operating process to flow in the proper direction so as to be compressed to uniform or to practically uniform density, substantially as described.

84. In an apparatus or mill for rolling or forming car wheels or other circular objects, a combined die-supporting and edging roll having a die-supporting part and an edging roll part, said die-supporting and edging roll parts being rotatable independently of each other.

85. In an apparatus or mill for rolling or forming car wheels or other circular objects, a forming-die and a die-supporting roll having a rolling portion extending outwardly from the peripheral edge of said die.

86. In an apparatus or mill for rolling or forming car wheels or other circular objects, a forming-die and a die-supporting roll having a rolling portion extending outwardly from the peripheral edge of said die and determining the position of one of the side faces of the rim of the work-piece during the rolling operation.

87. In an apparatus or mill for rolling or forming car wheels or other circular objects, a forming-die having a forming face adapted to form the web of the work-piece to desired shape and having its marginal portion extending from said web forming face to the peripheral edge of the die formed conical to form the inner peripheral face of said rim of the work-piece at the side thereof engaged by said die, and a side-roll extending outwardly from the peripheral edge of said die and adapted to roll the side of said rim adjacent said inner peripheral face.

88. In an apparatus or mill for rolling or forming car wheels or other circular objects, a forming-die and a die-supporting roll co-acting with said die to support the same at the marginal portion of its outer side against lateral and radial movements.

89. In an apparatus or mill for rolling or forming car wheels or other circular objects, a forming-die and a die-supporting roll co-acting with said die to support the same at the marginal portion of its outer side against lateral and opposite radial movements.

90. In an apparatus or mill for rolling or forming car wheels or other circular objects, a forming-die having a circular track and a die-supporting roll having a peripheral enlargement entered in said track to support said die against lateral and opposite radial movements.

91. In an apparatus or mill for rolling or forming car wheels or other circular objects, a forming-die, means for centrally and rotatably supporting said die, and a die-supporting roll at one side of the axis of said die for laterally supporting the same.

92. In an apparatus or mill for rolling or forming car wheels or other circular objects, a forming-die and a combined die-supporting and edge rolling roll having an enlarged edge rolling portion providing a shoulder adapted to engage the peripheral edge of said die, and which rolling portion extending outwardly from the peripheral edge of said die.

93. In an apparatus or mill for rolling or forming car wheels or other circular objects, a forming-die, a combined die-supporting and edge rolling roll having its edge rolling portion extending outwardly from the peripheral edge of said die, and a peripheral face roll against which said edge rolling portion rotates, all combined and formed to roll the metal in the rim portion of the work-piece.

94. In an apparatus or mill for rolling or forming car wheels or other circular objects, two side rolls, means between which and said side rolls a work-piece is to be formed or rolled into a car wheel or other circular object having a hub, a dished web and a rim, one of said side rolls being adjusted at a fixed radial distance from the axis of the work-piece at one side of the work-piece and serving to roll or form the work-piece with a hub, a dished web and a rudimentarily formed rim having the inner peripheral face of the rim at said side of the work-piece rolled sufficiently inclined outwardly toward the peripheral face of the work-piece to cause the metal in the rim during the operating process to flow in the proper direction so as to be compressed to uniform or to practically uniform density, substantially as described, the other side roll being adjusted to a fixed but greater radial distance from said axis at another point of the work-piece at the same side thereof and being adapted to lengthen the web face at said side of the work-piece and somewhat reduce the inclination of said inner peripheral face of the rim.

95. In an apparatus or mill for rolling or forming car wheels or other circular objects, two side rolls and a forming-die having an inclined marginal portion and between which and said side rolls a work-piece is to be rolled or formed, one of said side rolls being adapted to roll the workpiece over said forming-die to shape one side of the work-piece with a hub portion, a web portion, and a rim portion having an inclined inner peripheral face formed to finished shape and to roll the other side of the work-piece with a hub portion, a rim portion having its inner peripheral face rolled to rudimentary form and with a web portion, the other side roll being adapted to extend the face of the so rolled web portion at said last-mentioned side of the work-piece and roll said last-mentioned inner rudimentarily formed peripheral face of the rim and adjacent web portion to finished form.

96. In an apparatus or mill for rolling or forming car wheels or other circular objects, a forming-die and die-supporting rolls engaging said forming-die at the outer side thereof and supporting said die against lateral and radial movements.

97. In an apparatus or mill for rolling or forming car wheels or other circular objects, a forming-die and die-supporting rolls engaging said die at the outer side thereof and supporting said die against lateral and opposite radial movements.

98. In an apparatus or mill for rolling or forming car wheels or other circular objects, a forming-die having a circular groove and a pair of die-supporting rolls at opposite sides of the axis of said die, each of said rolls having a peripheral enlargement entered in said groove.

99. In an apparatus or mill for rolling or forming car wheels or other circular objects, a forming-die having a circular groove and a pair of die-supporting rolls at opposite sides of the axis of said die, each of said rolls having spaced peripheral enlargements, one of which is entered in said groove and the other having its end in contact with the peripheral edge of said die.

100. In an apparatus or mill for rolling or forming car wheels or other circular objects, a forming-die having the face opposite its forming face stepped outwardly toward its peripheral edge and a die-supporting roll or rolls correspondingly stepped and in rolling contact with the stepped portion of said die.

101. In an apparatus or mill for rolling or forming car wheels or other circular objects, a forming-die reduced in thickness outwardly to provide outwardly facing shoulders and a die-supporting roll or rolls provided with inwardly facing shoulders engaging the shoulders of said die.

102. In an apparatus or mill for rolling or forming car wheels or other circular objects, a forming-die having a face opposite its forming face stepped and a die-supporting roll correspondingly stepped and in rolling contact with the stepped portion of said die.

103. In an apparatus or mill for rolling or forming car wheels or other circular objects, a forming-die, and a die-supporting member having means to positively drive said die and having also a die-supporting portion and an edging roll portion extending outwardly from the peripheral face of said die.

104. In an apparatus or mill for rolling or forming car wheels or other circular objects, a forming-die having an annular gear, and a rotatable member having a gear wheel engaging the gear of said die and a die-supporting portion in rolling contact with the marginal portion of said die, and an edging roll part extending outwardly from the peripheral edge of said die.

105. In an apparatus or mill for rolling or forming car wheels or other circular objects, a forming-die having a bevel gear, a rotatable member having a bevel gear wheel in mesh with said bevel gear, a stepped die-supporting portion engaging said die at its marginal portion and an edging roll portion extending outwardly from the peripheral edge of said die.

106. In an apparatus or mill for rolling or forming car wheels or other circular objects, a forming-die against which a work-piece is to be rolled or formed and having tapered exterior provided with an annular gear rack, a rotatable supporting member having its axis parallel with or inclined to a plane passing circumferentially through said die and having a bevel gear engaging said gear rack, a die-supporting portion having portions of its peripheral face at different angles and an edging roll portion extending outwardly from the peripheral edge of said forming-die.

107. In an apparatus or mill for rolling or forming car wheels or other circular objects, a forming-die having its forming face shaped to form a work-piece to dished shape when rolled there-against and a positively driven die-supporting roll provided with means to positively rotate said die.

108. In an apparatus or mill for rolling or forming car wheels or other circular objects, a forming-die having a sloping forming face to cause dishing of a work-piece rolled thereagainst and a positively driven combined die-supporting and edging roll adapted to positively rotate said die.

109. In an apparatus or mill for rolling or forming car wheels or other circular objects, a forming-die and a pair of combined die-supporting and edging rolls arranged at opposite sides of the axis of said die, one of said rolls having means to positively rotate said die, a die-supporting portion engaging the marginal portion of said die at the side thereof opposite the forming face and an edging roll part extending outwardly from the peripheral edge of said die, the other roll having a die-supporting portion engaging the marginal portion of said die at the side thereof opposite the forming face and an edging roll part extending outwardly from the peripheral edge of said die.

110. An apparatus or mill for rolling or forming car wheels or other circular objects, comprising a forming-die, a side roll or rolls between which and said forming-die a work-piece is to be rolled or formed, a beaking roll formed substantially as described and adapted to act against the peripheral face of the work-piece at one point to roll said face to beaked or rudimentary form, and a face shaping or a face finishing roll adapted to act against the so beaked peripheral face of said work-piece at another point.

111. An apparatus or mill for rolling or forming car wheels or other circular objects, comprising a forming-die, a side roll or rolls between which and said forming-die a work-piece is to be rolled or formed with a dished web and with opposite lateral rim portions, a beaking roll adapted to act against the peripheral face of said work-piece at one point and formed so as to roll said face partly cylindrical and partly concave or conical, and a peripheral face shaping or a peripheral face finishing roll adapted to act against the so beaked peripheral face of said work-piece at another point and to roll said face to finished form.

112. An apparatus or mill for rolling or forming car wheels or other circular objects, comprising a forming-die having a sloping forming face and a conical marginal portion extending from said forming face to its peripheral edge and respectively forming the web to dished form and the adjacent inner peripheral face of the rim to inclined form, a roll or rolls adapted to act against the side of the work-piece not engaged by said forming-die to roll said side of the work-piece to desired form, a beaking roll arranged to act against the peripheral face of the work-piece at one point to roll said face to beaked form, and a face shaping or face finishing roll adapted to act against the so beaked peripheral face of said work-piece at another point.

113. An apparatus or mill for rolling or forming car wheels or other circular objects, comprising a forming-die and a side roll both shaped to roll a work-piece therebetween to the form of a dished web and a rim, a beaking roll adapted to act against the peripheral face of the work-piece and formed so as to roll said face partly cylindrical and partly concave or conical, and a face shaping or a face fininshing roll adapted to act against said so beaked rolled peripheral face and formed so as to roll said face to desired finished form or shape.

114. An apparatus or mill for rolling or forming car wheels or other similar objects, comprising a forming-die and a side roll or rolls adapted to roll the work-piece against said forming-die and over and beyond the peripheral edge of the same to form a web and a rim, a beaking roll arranged at one side of the axis of the work-piece and adapted to act against the peripheral face of the metal rolled over and beyond the peripheral edge of said die and formed so as to roll the portion of said face where the flange of the car wheel is to be formed straight or approximately straight and of larger diameter than the other portion or portions of said face and the portion of said face adjacent said straight or approximately straight portion concave or conical or approximately so, and a face shaping or face finishing roll arranged at another side of said axis and adapted to act against said so beaked rolled peripheral face of the work-piece and formed so as to roll said face to desired finished form or shape.

115. An apparatus or mill for rolling or forming car wheels or other circular objects, comprising means to rotatably support and roll or form to dished form the web of a car wheel blank or work-piece, and a beaking roll adapted to act against the peripheral face of said car wheel blank or work-piece and being formed so as to roll the portion of said face at one end thereof straight or cylindrical or approximately so and the portion of said face at its other end straight or approximately so and of larger diameter than said first-mentioned end portion and the portion of said face between said two end portions concave or conical, and a face shaping or a face finishing roll adapted to act against said so beaked rolled peripheral face and formed so as to roll said face into the flanged tread of a car wheel.

116. An apparatus or mill for rolling or forming car wheels or other circular bodies, comprising means to rotatably support a car wheel blank or work-piece, a forming-die having a forming-face formed and adapted to shape one side of said blank to desired form, a roll or rolls adapted to act against the other side of said blank to roll the same against said die and form the web of said blank to desired form, a beaking roll adapted to act against the peripheral face of said blank and formed so as to roll said face with opposite straight or approximately straight portions of different diameters at opposite ends and the portion of said face between said end portions to concave or conical form, and a face shaping or a face finishing roll adapted to act against the so rolled peripheral face and roll said face into the flanged tread of a car-wheel.

117. In an apparatus or mill for rolling or forming car wheels or other circular objects, two oppositely arranged side rolls, a peripheral face roll, and a rotatable forming-die between which and said side rolls a work-piece is placed to be formed, each of said side rolls having an edging roll portion extending over the peripheral edge of said forming-die and over and in contact with portions of opposite sides of the marginal portion of said peripheral face rolling roll, said side rolls and said peripheral face roll surrounding or partly surrounding the marginal and peripheral portions of the work-piece in a transverse plane and being adapted to roll said marginal and peripheral portions to desired shape.

118. In an apparatus or mill for rolling or forming car wheels or other circular objects, two oppositely arranged side rolls, a peripheral face rolling roll, and a rotatable forming-die between which and said side rolls a work-piece is placed to be rolled or formed, each of said side rolls having an edging roll portion extending over the peripheral edge of said forming-die and over and in contact with portions of opposite sides of the marginal portion of said peripheral face rolling roll, said rolls being formed so as to surround or partly surround the marginal portion of the work-piece in a transverse plane and roll the marginal portion or the marginal and peripheral portions of the work-piece to desired form.

119. In an apparatus or mill for rolling or forming car wheels or other circular bodies, comprising means to rotatably support a work-piece including a rotatable forming-die adapted to form one side or a portion of one side of the work-piece, an edging and web rolling roll and an edging and die-supporting roll at opposite sides of said work-piece and said forming-die and positioned in a plane passing transversely through the work-piece at one side of a plane passing centrally through the work-piece, said edging and die-supporting roll being adapted to act with its edging roll portion against the side of the marginal or rim portion of the work-piece next to said forming-die and which marginal or rim portion extends over or being extended over the peripheral forming edge of the forming-die during the operating process and with its die-supporting portion it is adapted to laterally support said forming-die, said edging and web rolling roll being adapted to act with its edging roll portion against the portion of the work-piece between the web rolling portion of said roll and the periphery of the work-piece and with its web rolling portion being adapted to roll the web portion of the work-piece to desired form and to desired thickness and thereby force the work-piece at its other side against and over said die and thus form the other side of the work-piece to the form of said die and thereby also roll or form the inner circumferential faces of the marginal or rim portion of the work-piece at both sides thereof sufficiently inclined outwardly toward the peripheral face of the work-piece so as to cause the metal to flow in the proper direction to assure compression of the metal in the marginal or rim portion of the work-piece to uniform or to practically uniform density substantially as described, means for positively driving one of or both said edging and web rolling roll and said edging and die-supporting roll, a shaping or finishing side roll at the side of the work-piece operated upon by said edging and web rolling roll at another point of the work-piece and adapted to roll said inner circumferential face and adjacent web portion at said side of the work-piece to desired finished form.

120. In an apparatus or mill for rolling or forming car wheels or other circular bodies, comprising means to rotatably support a work-piece including a rotatable forming-die adapted to form one side or a portion of one side of the work-piece, an edging and web rolling roll and an edging and die-supporting roll at opposite sides of said work-piece and said forming-die and positioned in a plane passing transversely through the work-piece at one side of a plane passing centrally through the work-piece, said edging and die-supporting roll being adapted to act with its edging roll portion against the side of the marginal or rim portion of the work-piece next to said forming-die and which marginal or rim portion extends over or being extended over the peripheral forming edge of the forming-die during the operating process and with its die-supporting portion it is adapted to laterally support said forming die, said edging web rolling roll being adapted to act with its edging roll portion against the portion of the work-piece between the web rolling portion of said roll and the periphery of the work-piece and with its web rolling portion being adapted to roll the web portion of the work-piece to desired form and to desired thickness and thereby force the work-piece at its other side against and over said die and thus form the other side of the work-piece to the form of said die and thereby also roll or form the inner circumferential faces of the marginal or rim portion of the work-piece at both sides thereof to sufficiently inclined form substantially as described, means for positively driving one of or both said rolls, a shaping or finishing roll at the side of the work-piece operated upon by said edging and web rolling roll at another point of the work-piece and adapted to roll said inner circumferential face and adjacent web portion at said side of the work-piece to desired finished form.

121. In an apparatus or mill for rolling or forming car wheels or other circular objects, means to centrally and rotatably support a work-piece including a rotatable forming-die adapted to form one side or a portion of one side of the work-piece, three rolls with their axes situated in a plane passing transversely through the work-piece and forming-die at one side of a plane passing centrally through the work-piece and forming-die, one of said three rolls being a face roll adapted to act against the peripheral face of the work-piece, said face roll having its peripheral face extending across the total width or lateral thickness of its marginal portion and which total width or lateral thickness is the same as is the lateral thickness or width which the marginal or rim portion of the car wheel or similar object which is to be rolled from said work-piece is to have, the remaining rolls being a pair of oppositely arranged side rolls having said face roll positioned between them, said side rolls having edging roll parts which extend across the side faces of the marginal or rim portion of the work-piece, wheel or other object and also over and against or in contact with part of the opposite sides of said face roll, and means for positively driving at least one of said side rolls.

122. The method of rolling or forming car wheels or other circular bodies from heated ingots, blooms, blanks or other work-pieces, which consists in subjecting the work-piece to combined rolling and die-forging pressures between co-acting forming faces inclined to a plane at a right angle to the axes of the work-piece, in thereby forcing metal of the work-piece outward beyond the peripheral edge of the forming face of the die-forging element and in rolling said outwardly forced metal to desired lateral thickness and the outer peripheral face thereof to desired shape.

123. The method of rolling or forming car wheels or other circular bodies from heated ingots, blooms, blanks or other work-pieces, which consists in subjecting the work-piece to combined die and roll forging pressures at opposite sides of the work-piece, in applying such pressures at an angle to the sides of the work-piece, and in subjecting opposite sides and the peripheral face of the marginal or rim portion of the work-piece to rolling pressures applied from different directions.

124. The method of rolling or forming car-wheels or other circular bodies from heated ingots, blanks or other work-pieces, which consists in positioning a work-piece against a forming-die having an inclined forming-face and a straight faced annular marginal portion surrounding said inclined forming-face and which inclined forming-face has a diameter corresponding with that which the inner peripheral face of the rim of the car-wheel or other body is to have at the side thereof engaged by said die, in subjecting the work-piece at the side thereof not engaged by said forming-die to the action of a roll or rolls for forcing the work-piece against said forming-die and over and beyond the inclined forming-face of the same and against said marginal portion of said die, and in subjecting the peripheral face of the work-piece to the action of another roll while rolling the marginal or rim portion of the work-piece from said last-mentioned side with said first-mentioned roll to desired lateral thickness.

125. The method of rolling or forming car wheels or other circular objects from heated ingots, blooms, blanks or other work-pieces, which consists in subjecting opposite sides of the work-piece to combined die and roll forging pressures applied at an angle or angles to the sides of the work-piece, thereby reducing the thickness of a portion of the work-piece and dishing such reduced portion and also forcing metal of the work-piece radially outward, and in applying rolling pressures to the opposite sides and the outer peripheral face of the metal thus forced radially outward.

126. The method of rolling or forming car wheels or other circular objects from heated ingots, blooms, blanks or other work-pieces, which consists in applying the work-piece against a forming face having a portion inclined to a plane at a right angle to the axis of the work-piece and in applying rolling pressures to the side of said work-piece not engaged by said forming face and to the sides of the marginal or rim portion of the said work-piece at the side thereof engaged by said forming face and to the peripheral face of the work-piece.

127. The method of rolling or forming car-wheels or other circular objects from heated ingots, blooms, blanks or other work-pieces, which consists in subjecting the work-piece to pressures between a rotatable forming-die, a rotatable forming-roll or rolls, a rotatable edging roll and a peripheral face beaking or peripheral face rolling roll to reduce the thickness of the web portion of the work-piece to desired thickness, to form said web portion to dished form, to roll against the opposite sides of the rim to form the same to desired lateral thickness and to roll against the peripheral face of the work-piece to roll said face to desired shape.

128. The method of rolling or forming car-wheels or other circular objects from heated ingots, blooms, blanks or other work-pieces, which consists in rolling the work-piece against a forming-die having a portion of its forming-face inclined to its axis or extended axis by means of a roll arranged at the side of the work-piece not engaged by said die and having a portion of its peripheral rolling face similarly inclined and a portion thereof formed straight and of smaller diameter than its said inclined portion, in extending metal of the work-piece radially beyond and over the peripheral edge of said die by means of said roll, in rolling the opposite sides of said extended metal by means of said straight peripheral faced portion of said roll and by means of another roll arranged at the side of said extended metal at the side of the work-piece engaged by said die, and in rolling the peripheral face of said extended metal by means of a peripheral face beaking or peripheral face rolling roll.

129. The method of dishing a heated work-piece, which consists in rolling the work-piece against a forming-die having a sloping forming-face by means of a roll having its peripheral rolling face or a portion of its peripheral rolling face correspondingly shaped and whose axis is changeable from a position parallel with to a position inclined to the side of the work-piece.

130. The method of rolling or forming car wheels or other circular bodies having laterally extending rim or marginal portions from heated ingots, blooms, blanks or other work-pieces, which consists in positioning a work-piece against a forming-die having a sloping forming face whose diameter equals that which the inner peripheral face of the rim or marginal portion of the work-piece is to have at one side thereof next to said forming-die, in applying rolling pressure or pressures to the side of the work-piece not in contact with said forming-die at right angles to the sloping forming face of said die, thereby forcing the work-piece against the latter so as to cause the side thereof next to said forming-die to be formed to the shape of said forming-die and also reducing the web portion of the work-piece to the desired thickness of the web and extending metal of the work-piece radially over the peripheral edge of said die and with the aid of the edging roll portion of an edging and die-supporting roll forming the rim portion of the work-piece to its desired lateral thickness, and in subjecting the peripheral face of said rim portions to the action of a face beaking or face rolling roll which rolls the peripheral face of the work-piece to desired form.

131. The method of rolling or forming car wheels or other similar bodies from heated ingots, blooms, blanks or other work-pieces, which consists in positioning the work-piece against a forming-die having an inclined forming face and a central hub forming cavity and having a diameter equaling that which the inner peripheral face of the rim of the work-piece is to have at the side thereof engaged by said die, in subjecting the work-piece to rolling pressure applied at an angle to the side of the work-piece not in contact with said die for forcing metal of the work-piece into said hub forming cavity to form a hub portion and over and beyond the peripheral edge of said die to form a rim portion and for rolling the side of the work-piece not in contact with said die with a hub portion, a rim portion and a depressed inclined intermediate portion, in subjecting opposite sides of the rim portion thus formed to rolling pressures whereby the rim is rolled to desired lateral thickness, and in subjecting the outer peripheral face of said rim to rolling pressure for rolling said face to desired form.

132. The method of dishing a heated work-piece, which consists in subjecting the work-piece to pressure between a forming-die having a forming face shaped to conform with the desired dished shape of the work-piece and a rotatable or positively driven roll tapered toward the axis or extended axis of said forming-die and otherwise shaped to conform with the outer side of the finished object rolled and formed from said work-piece, and in applying simultaneously therewith rolling pressures to the marginal portion of the work-piece to roll said marginal portion to desired lateral thickness and the outer peripheral face thereof to desired shape.

133. The method of rolling or forming car wheels or other circular objects having each a dished web from heated ingots, blooms, blanks or other work-pieces, which consists in positioning a work-piece against a forming-die having an inclined forming face adapted to form a portion of one side of the work-piece of car wheel or other object, and in subjecting the remainder of the work-piece including the peripheral face thereof to rolling pressures.

134. The method of rolling or forming car wheels or other circular objects having each a dished web from heated ingots, blooms, blanks or other work-pieces, which consists in positioning and forcing a work-piece against a forming-die having its forming face or a portion thereof inclined to a plane at a right angle to the axis of said forming-die and being adapted to form one side of the work-piece or car wheel or other object from its rim inwardly, and in subjecting the remainder of the work-piece or car wheel or other object including the peripheral face thereof to rolling pressures applied from different angles.

135. The method of rolling or forming car wheels or other circular objects from heated ingots, blooms, blanks or other work-pieces, which consists in positioning a work-piece against an inclined forming face of a forming-die having a hub forming cavity and a conical peripheral forming edge of a diameter equaling that which the inner peripheral face of the rim of the work-piece or car wheel or other object is to have at the side thereof engaged by said die, in subjecting the work-piece to the action of a side roll to roll and form a dished web portion and to force metal of the work-piece into said hub forming cavity and over the conical peripheral forming edge of said forming-die, and in subjecting the metal forced over said peripheral forming edge to the action of rolling pressures oppositely applied and to the action of rolling pressure applied at an angle or angles to such opposite pressures to roll said metal so forced over said peripheral forming-edge to desired lateral thickness and the outer peripheral face thereof to desired shape.

136. The method of rolling or forming car wheels or other circular objects from heated ingots, blooms, blanks or other work-pieces, which consists in subjecting the work-piece to the action of axially alined work-supporting axles, in rolling the work-piece over a forming-die having a sloping forming face whereby a portion of one side of the work-piece or car wheel or other circular object is formed including a hub portion, the inner peripheral face of the rim at one side thereof formed to sufficiently inclined form and an intermediate depressed or web portion inclined to the side of the work-piece and whereby the other side of the work-piece or car wheel or other circular object is rolled with a web portion, a rim portion and an intermediate depressed or hub portion having an inclination corresponding or approximately corresponding with that of the depressed portion at the first-mentioned or die side of the work-piece, in subjecting the opposite sides of said rim portion to rolling pressures applied from opposite sides, and in subjecting the peripheral face of the entire rim to rolling pressure or pressures conjointly with the pressures applied to opposite sides of said rim portion.

137. The method of rolling or forming car wheels or other circular objects from heated ingots, blooms, blanks or other work-pieces, which consists in subjecting the work-piece axially from opposite sides thereof to piercing or penetrating pressures whereby the work-piece is provided at opposite sides with parts of an axial preliminary bore, in rolling the work-piece against a forming-die having a forming face trending in an inclined direction with reference to the sides of the work-piece to cause one side thereof to be formed to the shape of said forming-die and the other side thereof to be rolled to desired shape including the rolling of the marginal or rim portion of the work-piece to desired lateral thickness, and in rolling the peripheral face of the work-piece to the form of a flanged tread or other desirable shape.

138. The method of rolling or forming car wheels or other circular objects from heated ingots, blooms, blanks or other work-pieces, which consists in positioning the work-piece against a forming-die adapted to form the hub portion, the dished web portion and the inner peripheral face of the rim at one side of the work-piece or car wheel or other object, and in subjecting the remainder of the workpiece or car wheel or other object including the outer peripheral face thereof to rolling pressures.

139. The method of rolling or forming car wheels or other circular objects from heated ingots, blooms, blanks or other work-pieces, which consists in axially and rotatably supporting the work-piece, in positioning the work-piece against a forming-die shaped to form a portion of the hub, a dished web portion and the inner peripheral face of the rim at one side of the work-piece, and in subjecting the remainder of the work-piece to rolling pressures whereby said work-piece is rolled against the side and peripheral edge of said forming-die and whereby its marginal or rim portion is rolled to desired lateral thickness and the outer peripheral face thereof is rolled.

140. The method of rolling, rerolling, reworking or reforming new or worn heated car-wheels or other similar circular bodies or work-pieces, which consists in centrally supporting, piercing or penetrating the work-piece and positioning the work-piece against a forming-die having a central hub-forming cavity provided with an outwardly flaring wall and a forming-face properly shaped to conform with the shape of the new wheel or other body, in rolling the work-piece at the side thereof not engaged by said die to cause the central or hub-portion of the work-piece at the other or die-side thereof to be formed to the shape of said hub-forming cavity, in rolling the peripheral face of the hub-portion at the side of the work-piece not engaged by said die, and in rolling, rerolling, reworking or reforming the remainder of the work-piece to the desired new form or shape of the new wheel or other body including the rolling of the outer peripheral face thereof.

141. The method of rolling or forming car wheels or other similar bodies having each a dished web from heated ingots, blooms, blanks or other work-pieces, which consists in subjecting the work-piece to the action of piercers or centers and to the action of a forming-die having a forming face bulging inward from its peripheral edge and rolls exerting pressures toward said forming face and said peripheral edge, whereby the work-piece is centrally pierced or penetrated at opposite sides to desired depth or depths and rotatably supported from opposite sides and while so supported is also axially clamped and also whereby the work-piece is rolled or formed to a finished car wheel or other similar body with a dished web including the rolling of the outer peripheral face thereof.

142. The method of rolling or forming car wheels or other similar bodies from heated ingots, blooms, blanks or other work-pieces, which consists in positioning the work-piece against a forming-die having its forming face inclined to a plane at right angles to the axis of said die, in axially supporting the work-piece, in supporting or partly supporting said forming-die with a die-supporting roll having an edging roll part extending beyond the peripheral edge of said die, in applying a side roll to the side of the work-piece not engaged by said die to form a portion of one side of the work-piece to the shape of said die, to roll metal of the work-piece over the peripheral edge of said die and against the edging roll part of said die supporting roll and to roll the side of the work-piece not engaged by said die to desired shape, in applying a face roll to the peripheral face of the work-piece and rolling said side roll and the edging roll part of said die-supporting roll against opposite sides of said face roll, thereby compressing the metal in the rim portion of the work-piece between said forming-die, said edging roll part, said side roll and said face roll.

143. The method of rolling or forming car wheels or other circular objects having each a dished web from heated ingots, blooms, blanks or other work-pieces, which consists in axially and rotatably supporting the work-piece and positioning the work-piece against a forming-die having a forming face trending in an inclined direction with reference to the sides of the work-piece, in applying a side roll to the side of the work-piece not engaged by said forming-die whereby the work-piece is rolled against said die to form a portion of one side of the work-piece to the shape of said die, whereby the work-piece is formed with a hub at said side thereof not engaged by said die and metal of the work-piece reduced in thickness where desired and also metal of the work-piece extended radially and forced laterally over the peripheral edge of said die and laterally in the opposite direction to form the rim of the work-piece, in rolling the side of said rim at the side of the work-piece not engaged by said die with said side roll, and rolling the opposite side of said rim with a roll working in opposition to said side roll, and in applying a face roll to the peripheral face of said rim and with said other rolls operating to compress the metal in the rim to uniform or practically uniform density.

144. The method of rolling or forming car-wheels or other circular objects having each a dished web from heated ingots, blooms, blanks or other work-pieces, which consists in axially and rotatably supporting the work-piece and positioning the work-piece against a forming-die having a central hub-forming cavity, a conical peripheral edge or marginal portion and an inclined forming-face between said cavity and said peripheral edge or marginal portion trending in an inclined direction with respect to a plane passing circumferentially through said die, in applying a side roll having a rolling face which when in final operating position corresponds or approximately corresponds with the inclined forming-face of said die and which side roll is positioned at one side of the axis of the work-piece and at the side of the work-piece not engaged by said forming-die whereby the work-piece is rolled against said die and metal thereof rolled into said hub-forming cavity, whereby the side of the work-piece not engaged by said die is rolled with a hub portion and an inclined depressed or web portion and whereby the work-piece is extended radially and metal thereof forced outward and laterally over the peripheral edge of said die and also laterally in an opposite direction to form an embryonic rim having its inner peripheral faces sufficiently inclined substantially as described, and in simultaneously therewith subjecting the rim at the side thereof rolled over the peripheral edge of said die to the action of an edging roll, in rolling the outer peripheral face of said rim in coaction with said side roll and said edging roll so as to roll said rim to desired lateral thickness and the outer peripheral face thereof to desired shape and thereby causing the metal in the rim to be compressed to uniform or to practically uniform density, substantially as described, and in subjecting the so rolled outer peripheral face and one of the so formed inner peripheral faces of the rim at another point of the work-piece to rolling pressures whereby said so rolled outer peripheral face and said last-mentioned inner peripheral face are rolled finished and the metal in said rim compressed to maximum or approximately maximum density, substantially as described, while maintaining said lateral thickness of the rim by said side roll and said edging roll.

145. The method of rolling or forming car wheels or other circular objects having each a dished web from heated ingots, blooms, blanks or other work-pieces while the work-piece is centrally and rotatably supported from opposite sides thereof, which consists in rolling or forming the so supported work-piece between a dishing die and a dishing roll located for operation at opposite sides of the work-piece, and in subjecting the marginal or rim portion of the work-piece while so supported to rolling pressures from one inner peripheral face of the marginal or rim portion of the work-piece to the other.

146. The method of rolling or forming car wheels or other circular bodies from heated ingots, blooms, blanks or other work-pieces while the work-piece is centrally or rotatably supported, which consists in rolling or forming the so supported work-piece between a forming-die having a sloping forming face and an outer diameter which is less than that which the work-piece is to have when finished and a roll or rolls spaced from said die, and in subjecting the work-piece to rolling pressures around the marginal or rim portion of the work-piece and thereby rolling said marginal or rim portion to desired lateral thickness and the outer peripheral face thereof to desired shape.

147. The method of rolling or forming car wheels or other circular bodies having each a dished web from heated ingots, blooms, blanks or other work-pieces while the work-piece is centrally and rotatably supported, which consists in rolling or forming the so supported work-piece between a forming-die having a sloping forming face and an outer diameter which is less than that which the work-piece is to have when finished and a roll extending from a point near the axis of the work-piece to a point beyond the outer peripheral face of the work-piece when finished, and in subjecting the work-piece to rolling pressures at the side of the marginal or rim portion opposite said roll and at the peripheral face of said marginal or rim portion.

148. The method of rerolling or reforming car wheels or other circular objects, which consists in heating the car wheel or other object, in centrally and rotatably supporting the same, in rerolling or reforming the so supported work-piece between a dishing forming die and a dishing forming roll located for operation at opposite sides of the work-piece, and in subjecting the work-piece to the action of rolls including said forming-roll and therewith roll the marginal or rim portion of the work-piece to desired lateral thickness and the outer peripheral face thereof to desired shape.

149. The method of rolling or forming car-wheels or other circular bodies from axially supported heated work-pieces to be rolled or operated upon while so supported, which consists in rolling the work-piece against a forming-die adapted to form a portion of one side of the work-piece including the hub, and inclined web surface and the inner peripheral face of the rim at said side, and in simultaneously therewith rolling the entire opposite side of the work-piece to desired shape, the outer peripheral face to desired shape and the side of the rim at the side of the work-piece engaged by said die.

150. The method of rolling or forming car-wheels or other circular objects from heated ingots, blooms, blanks or other work-pieces which consists in positioning the work-piece against a forming-die having a sloping forming face, and in subjecting the side of the work-piece not engaged by said die to the action of rolling pressure applied by a rolling roll formed to roll also the marginal portion of the work-piece over the peripheral edge of said die, and in rolling the metal rolled over said peripheral edge to desired lateral thickness and the outer peripheral face thereof to desired shape.

151. The method of rolling or forming car-wheels or other circular objects having each a dished web from heated ingots, blooms, blanks or other work-pieces, which consists in positioning one side of the work-piece against a forming-die having a sloping face and axially supporting or partly supporting the work-piece from opposite sides thereof with a pair of alined longitudinally independently movable rotatable piercers or centers, and in rotating the work-piece and said die by means of rolls operating against the work-piece to roll the same to desired form and including a forming roll provided with a rolling portion whose peripheral face is tapered and when adjacent said die conforms or approximately conforms to the sloping face of said die and with a second and third rolling portion having each a straight peripheral face which is at a right angle to the axis of the work-piece when in final operation against said work-piece.

152. The method of rolling or forming car-wheels or similar objects from heated ingots, blooms, blanks or other work-pieces, which consists in positioning the work-piece against a forming-die having a central hub-forming cavity, a sloping web-forming face extending outwardly from said cavity and a straight rim-side forming face, in subjecting the side of the work-piece not in contact with said die to the action of rolling pressures applied by a rolling roll having its axis parallel or approximately parallel with said rim-side forming-face, and in subjecting the peripheral face of said rim to the action of a face roll having one of its sides in contact with the peripheral face of said rolling roll and the other side in contact with said straight rim-side forming-face of said die.

153. The method of rolling or forming car wheels or other circular objects having each a dished web from heated ingots, blooms, blanks or other work-pieces, which consists in positioning the work-piece against a forming-die having a central hub-forming cavity, an outer rim-side forming-face arranged at a right angle to the axis or extended axis of said die and an annular intermediate inclined web-forming face terminating at its outer edge in a shoulder, in applying a side roll against the side of the work-piece not in contact with said die provided with a tapered rolling portion the taper of whose peripheral face when adjacent said die corresponds or approximately corresponds with the incline of said web forming-face and with straight peripheral faced rolling portions at opposite ends of said tapered rolling portion to roll metal of the work-piece into said hub-forming cavity, over the shoulder at the outer edge of said web forming-face and against said outer rimside forming-face, and in applying rolling pressures to the peripheral face of the work-piece.

154. The method of rolling or forming car wheels or other circular objects having each a dished web from heated ingots, blooms, blanks or other work-pieces, which consists in positioning one side of the work-piece against a forming-die of larger diameter than said work-piece and having a sloping forming face, in subjecting the side of the work-piece not in contact with said die to rolling pressure for extending the work-piece outwardly and rolling the same over the peripheral edge of said die whereby a portion of one side of the work-piece is formed to the shape of said die and the corresponding portion at the other side rolled to a desired shape, and in subjecting all exposed faces of the metal extended over said peripheral edge to the action of rolls which roll said extended metal to desired lateral thickness and the outer peripheral face thereof first to beaked or rudimentary shape and then to finished shape.

155. The method of rolling or forming car wheels or other circular objects having each a dished web from heated ingots, blooms, blanks or other work-pieces, which consists in rolling or forming the work-piece between a forming-die having a forming face trending at an angle inclined to a plane passing circumferentially through said die and a forming roll applying pressure at a right-angle to the inclined trend of said forming face whereby the work-piece is reduced in thickness where desired and dished from a central portion outwardly and whereby metal of the work-piece is extended outwardly beyond the peripheral edge of said forming face, and in simultaneously therewith applying rolls including said forming rolls to the rim or marginal portion of the work-piece and with said rolls roll said rim or marginal portion to desired lateral thickness and the outer peripheral face thereof to desired shape.

156. The method of rolling or forming car-wheels or other circular objects having each a dished web from heated ingots, blooms, blanks or other work-pieces, which consists in centrally and rotatably supporting the work-piece positioned with one side against a forming-die having a sloping forming face whose peripheral edge determines the inner diameter of the rim of the finished work-piece or car wheel or other object at one side thereof, in applying a side roll to the other side of the work-piece to form the hub of the work-piece or car wheel or other object, the web thereof dished to the slope of said forming face, or approximately so, to extend the work-piece outwardly beyond the peripheral edge of said forming face against a rim-forming member extending outwardly from said peripheral edge and against a peripheral face roll self-adjustable radially with respect to the work-piece and to form the inner peripheral face or the rim at said other side of the work-piece.

157. The method of rolling or forming car-wheels or other circular objects having each a dished web from heated ingots, blooms, blanks or other work-pieces, which consists in rolling or forming the work-piece having parallel or substantially parallel sides between a forming-die and a forming-roll each having forming-faces inclined to the sides of said work-piece whereby the work-piece is forced against the inclined forming-face of said die and is reduced in thickness between its central and marginal portions and metal of the work-piece extended outwardly beyond said forming-faces, and in applying rolls including said forming-roll to the outwardly extended metal and with said rolls roll said outwardly extended metal to desired lateral thickness and the outer peripheral face thereof to desired shape.

158. The method of dishing and rolling a rim portion on a heated work-piece, which consists in rotatably and axially supporting the work-piece and positioning the work-piece against a forming-die having a sloping forming face and being of smaller diameter than the work-piece is to be when finished, and in subjecting the work-piece to rolling pressures at the side thereof engaged by said die from the peripheral edge of said die outwardly, at the entire exposed surface at the opposite side of the work-piece, and at the peripheral face of the work-piece, 159. The method of rolling or forming a dished car wheel which consists in axially and rotatably supporting a work-piece and positioning one side of the work-piece against a forming-die having a hub-forming cavity, a sloping web-forming face and an inclined inner rim-face forming portion, and in applying rolling pressures from all sides toward said forming face and forming portion for rolling the work-piece with a hub, a dished web and a rim extended laterally in opposite directions including the rolling of said rim to desired lateral thickness and the outer peripheral face thereof to desired shape.

160. The method of forming or reforming dished car-wheels or other circular objects, which consists in rotatably and axially supporting the work-piece and applying one side of the work-piece to a forming-die having a hub-receiving or hub-forming cavity and a sloping web-forming face, in applying rolling pressure to the work-piece from a roll situated at one side of the axis of the work-piece and at the side of the work-piece not in contact with said die whereby the hub and the dished web are formed and also the rudimentary inner peripheral face of the rim portion at said one or die-side of the work-piece, in applying rolling pressure to the other side of said rim portion from a roll situated opposite said first-mentioned roll to determine the width of said rim portion, in applying a face forming roll to the outer peripheral face of said rim portion in the lateral plane of said rolls to roll said peripheral face to rudimentary form, in applying a roll situated at the other or at another side of the axis of the work-piece against the side of the work-piece not in contact with said die to roll the inner peripheral face of the rim and adjacent web portion at said side of the work-piece to finished form and a face finishing roll to the rudimentarily formed peripheral face of the work-piece to roll said face to finished form while maintaining the width of said rim portion with said two first-mentioned rolls.

161. In rolling mechanism for rolling or forming car-wheels or other similar circular bodies, the combination of a pair of longitudinally-movable axially-alined work-supporting elements adapted to engage or center or pierce or penetrate or enter a work-piece, means for rolling or forming the work-piece to desired shape, and means for moving said work-supporting elements toward and from each other to respectively engage or pierce or penetrate or center or enter the work-piece from opposite sides and to withdraw said work-supporting elements from the work-piece or finished product.

162. An apparatus or mill for rolling or forming car-wheels or other similar circular bodies, comprising a plurality of coöperating elements by means of which and between which a work-piece is adapted to be rolled or formed to desired shape, a pair of longitudinally-movable axially-alined elements adapted to engage or center or penetrate or pierce or enter the work-piece from opposite sides thereof, and means for moving said axially-alined elements to cause the same to be withdrawn from the work-piece or finished product and permit the removal of the work-piece or finished product from the apparatus or mill.

163. An apparatus or mill for rolling or forming car-wheels or other similar circular bodies, comprising a plurality of coöperating elements by means of which and between which a work-piece is adapted to be rolled or formed to desired shape, a longitudinally-movable element adapted to axially engage or center or pierce or penetrate or enter the work-piece from one side thereof, and means for moving said longitudinally-movable element in either direction to cause the same to engage or center or pierce or penetrate or enter the work-piece from one side thereof or to cause the same to be withdrawn from the work-piece or finished product and permit the removal of the work-piece or finished product from the apparatus or mill.

164. An apparatus or mill for rolling or forming car-wheels or other similar circular bodies, comprising a pair of alined and axially movable work-supporting axles having means or being formed at adjacent ends thereof to engage or center or penetrate or pierce or enter a work-piece from opposite sides thereof, a forming-die supported by one of said axles and against which the work-piece is to be rolled, rolling means coöperating with said forming-die to roll or form the work-piece to desired shape, and means for moving said work-supporting axles axially in either direction to cause said engaging means or ends of said axles to engage or center or penetrate or pierce or enter the work-piece or to withdraw said engaging means or ends of said axles from the work-piece or finished product to permit the latter to be removed from the apparatus or mill.

165. An apparatus or mill for rolling or forming car-wheels or other circular bodies, comprising a rotatable and axially movable work-supporting axle having means or being formed at its end to engage or center or penetrate or pierce or enter a work-piece from one side thereof, a forming-die rotatably supported and against which the work-piece is adapted to be rolled, rolling means coöperating with said forming-die to roll or form the work-piece to desired shape, and means for moving said work-supporting axle axially in either direction to cause said engaging means or end of said axle to engage or center or penetrate or pierce or enter the work-piece from one side thereof or to withdraw said engaging means or end of said axle from the work-piece or finished product to permit the same to be removed from the apparatus or mill.

166. An apparatus or mill for rolling or forming car-wheels or other circular bodies, comprising a pair of alined and axially movable work-supporting axles having means or being formed at adjacent ends thereof to engage a work-piece from opposite sides thereof during the operating process, a forming-die supported by one of said axles and against which the work-piece is to be rolled, the engaging means or end of the other axle being adapted to centrally engage or center or pierce or penetrate or enter the work-piece from one side thereof, rolling means coöperating with said forming-die to roll the work-piece against said die and to roll or form the work-piece to desired shape, means for moving said other axle axially in either direction to cause said engaging means or end thereof to engage or center or pierce or penetrate or enter the work-piece from one side thereof or to withdraw said engaging means or end of said other axle from the work-piece or finished product, and means for moving said axle supporting said forming-die independently of said die to withdraw the work-piece or finished product from said forming-die so as to permit the work-piece or finished product to be removed from the apparatus or mill.

167. An apparatus or mill for rolling or forming car-wheels or other circular bodies, comprising an axially movable work-supporting element adapted to engage or center or penetrate or pierce or enter a work-piece from one side thereof, a forming-die rotatably supported and against which the work-piece is to be rolled, means coöperating with said forming-die to roll or form the work-piece to desired shape, means for moving said work-supporting element axially in either direction to cause said element to engage or center or penetrate or pierce or enter the work-piece from one side thereof and to withdraw said element from the work-piece or finished product, and means movable axially with respect to and independently of said forming-die to withdraw or remove the work-piece or finished product from said forming-die so as to permit the work-piece or finished product to be removed from the apparatus or mill.

168. An apparatus or mill for rolling or forming car-wheels or other circular bodies, comprising axially movable work-supporting means, rolling or forming mechanism, and means for axially moving said work-supporting means in either direction, the whole being arranged to axially engage a work-piece from opposite sides thereof, to roll or form the work-piece to desired shape while so engaged and to withdraw said work-supporting means from the work-piece or finished product.

169. An apparatus or mill for rolling or forming car-wheels or other circular bodies, comprising axially movable work-supporting means, rolling or forming mechanism including a forming-die, and means for axially moving said work-supporting means in either direction, the whole being arranged to axially engage a work-piece from opposite sides thereof, to roll or form the work-piece to desired shape, and to withdraw said work-supporting means from the work-piece or finished product and to withdraw the work-piece or finished product from said forming-die.

In testimony whereof, I have hereunto set my hand.

LOUIS F. DIETER.

Witnesses:
ERNESTINE L. LADD,
FRANCIS T. HOULIHAN.